US006742245B2

(12) United States Patent
Glenn

(10) Patent No.: US 6,742,245 B2
(45) Date of Patent: Jun. 1, 2004

(54) APPARATUS FOR ASSEMBLY OF ROOF PANEL STRUCTURES

(76) Inventor: Joseph K. Glenn, 19816 150th Ave. East, Graham, WA (US) 98338

( * ) Notice: Subject to any disclaimer, the term of this patent is extended or adjusted under 35 U.S.C. 154(b) by 0 days.

(21) Appl. No.: 10/097,660

(22) Filed: Mar. 13, 2002

(65) Prior Publication Data

US 2003/0172524 A1 Sep. 18, 2003

(51) Int. Cl.[7] .................................................. B23P 21/00

(52) U.S. Cl. ............................ 29/787; 29/771; 29/798; 29/897.3; 29/897.32; 29/281.3; 269/910; 227/40; 227/48; 227/100

(58) Field of Search .......................... 29/798, 787, 771, 29/281.3, 897.3, 897.312, 897.32; 269/910, 9; 227/119, 40, 48, 100; 52/92.2, 478

(56) References Cited

U.S. PATENT DOCUMENTS

| | | | | | |
|---|---|---|---|---|---|
| 2,574,163 | A | * | 11/1951 | Bamford, Sr. | 52/79.1 |
| 2,656,057 | A | | 10/1953 | Felderman et al. | |
| 2,935,214 | A | | 5/1960 | Fly | |
| 3,090,961 | A | | 5/1963 | McRae et al. | |
| 3,109,640 | A | | 11/1963 | Schneckloth | |
| 3,367,010 | A | | 2/1968 | Lytle et al. | |
| 3,489,328 | A | | 1/1970 | Martin | |
| 3,533,881 | A | * | 10/1970 | Beckman et al. | 156/351 |
| 3,624,889 | A | | 12/1971 | Greenhalgh | |
| 3,629,931 | A | | 12/1971 | Stanley | |
| 3,693,542 | A | * | 9/1972 | Moehlenpah | 100/231 |
| 3,743,160 | A | * | 7/1973 | Bowers, Jr. | 227/100 |
| 3,765,587 | A | * | 10/1973 | Davis | 227/100 |
| 3,804,316 | A | * | 4/1974 | Kay | 227/40 |
| 3,897,620 | A | * | 8/1975 | Wright | 29/430 |
| 4,039,112 | A | | 8/1977 | Schultz | |
| 4,187,652 | A | | 2/1980 | Bobrovnikov et al. | |
| 4,403,388 | A | * | 9/1983 | Belcher | 29/429 |
| 4,453,705 | A | | 6/1984 | McDonald | |
| 4,489,874 | A | * | 12/1984 | Worst et al. | 227/7 |
| 4,757,605 | A | * | 7/1988 | Richardelli | 29/709 |
| 4,793,540 | A | * | 12/1988 | Mangan et al. | 227/7 |
| 4,796,350 | A | | 1/1989 | French | |
| 4,829,651 | A | * | 5/1989 | Shirai | 29/430 |
| 4,876,787 | A | * | 10/1989 | Ditty et al. | 29/430 |
| 5,067,299 | A | | 11/1991 | French | |
| 5,073,077 | A | | 12/1991 | Altman | |
| 5,249,352 | A | * | 10/1993 | Landers | 29/432 |
| 5,274,967 | A | | 1/1994 | Mladichek | |

(List continued on next page.)

OTHER PUBLICATIONS

Copy of International Search Report from the EPO (Aug. 27, 2003).

American Wood Systems, "Glulams: Product and Application Guide", *Form No. EWS Q455A*, pp. 3–22 (Jun. 1994).

APA—The Engineered Wood Association, "Glulam Purlins for Panelized Roofs", *Technical Notes, Form No. EWS R485C*, 2 pgs. (Oct. 2000).

Glenn, Joseph K., "Applicant's P3 Apparatus", 3 pgs. (prior to Mar. 12, 2001).

*Primary Examiner*—Essama Omgba
(74) *Attorney, Agent, or Firm*—Leydig, Voit & Mayer, Ltd.

(57) ABSTRACT

A portable roof panel structure assembly mechanism that may be transported to a construction site and that is used to automatically assemble roof panel structures at the site. The assembly mechanism includes a purlin feeder, subpurlin clamping mechanisms and feeders, and a diaphragm feeder. The purlin feeder lifts a purlin into position, and advances the purlin into an assembly station. The subpurlin feeders insert a subpurlin into each of a plurality of subpurlin clamping mechanisms, and the clamping mechanisms advance into the assembly station and hold the subpurlins against the section of the purlin that has been advanced. The diaphragm feeder places a diaphragm onto the subpurlins and the purlin at the assembly station. The components are attached by automatic nailers.

24 Claims, 53 Drawing Sheets

U.S. PATENT DOCUMENTS 5,343,606 A * 9/1994 Girouard et al. ............ 29/33 K
5,528,807 A * 6/1996 Girouard et al. ............ 29/33 K
5,553,375 A * 9/1996 Powers ........................ 29/798
5,555,617 A * 9/1996 Pope ........................... 29/772
5,850,686 A 12/1998 Mertes
6,058,601 A * 5/2000 DeKoning ................... 29/798
6,131,272 A * 10/2000 Girouard et al. .............. 29/714
6,134,775 A * 10/2000 Castillo ....................... 29/798
6,176,009 B1 * 1/2001 Inman ......................... 29/772
RE37,797 E * 7/2002 Haase ..................... 29/897.31

* cited by examiner 100
102
104
106
108
110
112
120
122
124
126
128
130
132
168
174
180
184
190
192
196
200
202
220
259

FIG. 11
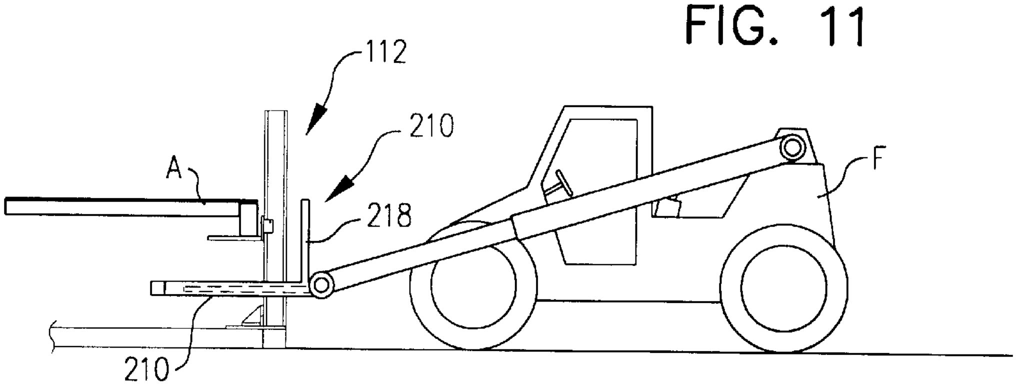
FIG. 12
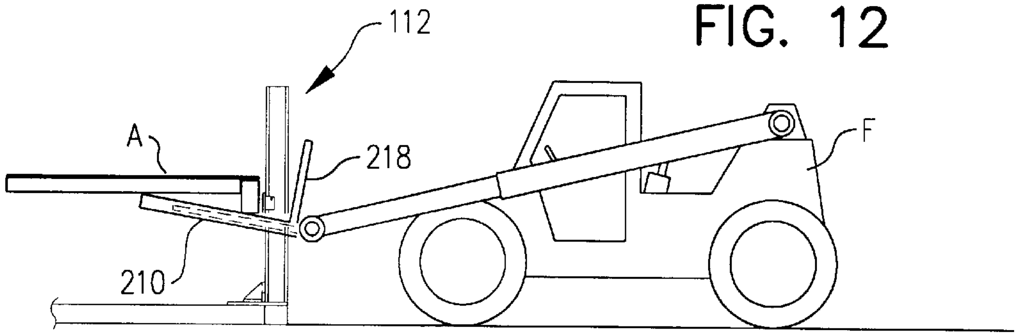
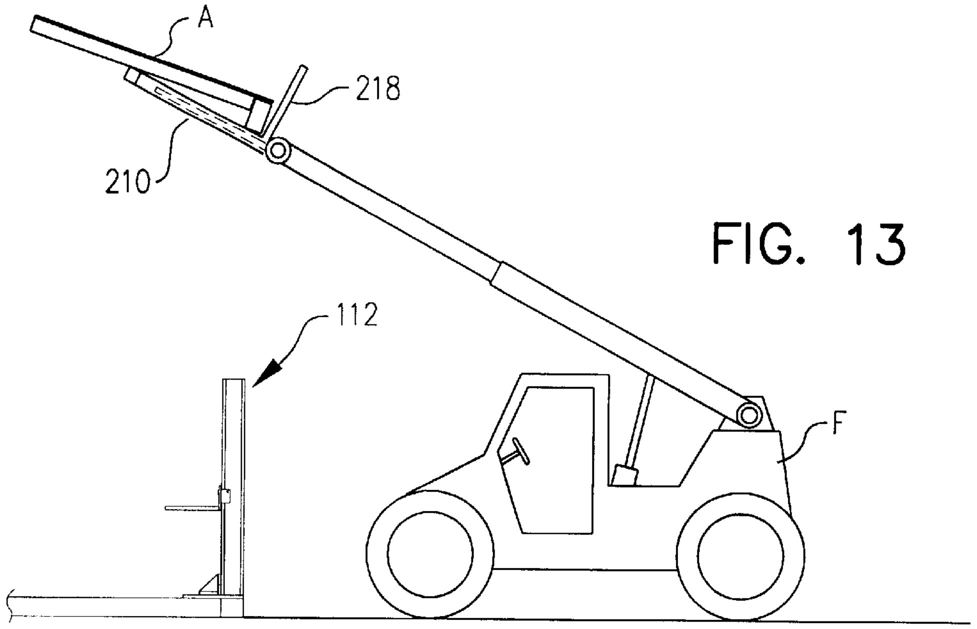
FIG. 13

APPARATUS FOR ASSEMBLY OF ROOF PANEL STRUCTURES

REFERENCE TO RELATED APPLICATIONS

The present invention is related to U.S. patent applications entitled "APPARATUS FOR AND METHOD OF CONSTRUCTING PANELIZED ROOF STRUCTURES" (Attorney Docket No. 29003-11010) and "METHODS FOR AUTOMATED ASSEMBLY OF ROOF PANEL STRUCTURES" (Attorney Docket No. 29003-11020), having a common inventor, filed concurrently herewith, and hereby incorporated by reference in their entireties.

FIELD OF THE INVENTION

The present invention relates generally to roof structures, and more particularly to the fabrication of panelized roof structures.

BACKGROUND OF THE INVENTION

Roofs for contemporary buildings, particularly light industrial buildings having rectangular-shaped roofing, typically are formed from roof panel structures that are attached to main supporting beams. In general, a roof panel structure includes a purlin (i.e., a major beam) that, when installed, is attached orthogonally to the main supporting beams of the structure, subpurlins (i.e., minor beams such as lumber stiffeners) that are attached orthogonally to the purlin, and diaphragms (e.g., wood structural panels) that are nailed to the subpurlins and the purlin for structural and shear support. Completed roof panel structures may be 25 to 80 feet in length or even longer, and are often lifted to and placed on the main supporting beams by a crane or forklift. Once in place, the roof panel structures are typically nailed to the main supporting beams and adjacent roof panel structures.

In practice, each of the components of the roof panel structures is brought to a site and the roof panel structures are assembled by hand. Some manufacturers preassemble the subpurlins and the diaphragms offsite (typically in four-foot segments, but sometimes in eight-foot segments), and use the preassembled subpurlins and diaphragms at the site to form the roof panel structures. Even if the preassemblies are used, however, many carpenters and other construction workers are required in the roofing area to complete assembly and/or installation of the roof panel structures. Thus, although present roof panel structures work well for their intended purpose, their assembly can be time consuming and expensive. Moreover, the amount of labor involved may introduce errors into assembly, which may cause additional expenses of time, labor, and materials. In addition, the labor involved may be somewhat dangerous and/or strenuous, and very often requires young, attentive workers.

SUMMARY OF THE INVENTION

The present invention provides a portable roof panel structure assembly mechanism that may be transported to a construction site and that is used to automatically assemble roof panel structures at the site. The roof panel structure assembly mechanism includes a purlin feeder, subpurlin clamping mechanisms and feeders, and a diaphragm feeder. The purlin feeder advances a purlin into an assembly station. The subpurlin feeders insert a subpurlin into each of a plurality of subpurlin clamping mechanisms, and the clamping mechanisms advance into the assembly station and hold the subpurlins against the section of the purlin that has been already advanced into the assembly station. The diaphragm feeder places a diaphragm onto the subpurlins and the purlin at the assembly station. The components are then ready for attachment.

In accordance with one aspect of the present invention, one or more automatic nailers (e.g., nailing guns) may be used to attach the diaphragm, the subpurlins, and the purlin at the assembly station. The automatic nailers may be provided, for example, on a nailing carriage that moves with a lifting carriage that is used to deliver and place the diaphragm over the subpurlin and the purlin. If multiple nailing guns are used, particular guns may be fired according to the position of the gun and the length and/or width of the diaphragm. In accordance with an aspect of the present invention, once the subpurlins, purlin, and diaphragm are in place, the nailing of the components together occurs automatically.

In accordance with another aspect of the present invention, the purlin feeder includes a height adjustment mechanism that permits the top level of a purlin on the feeder to be adjusted to a preselected height, regardless of the height of the purlin. After the purlin has been raised or lowered to the preselected height, the purlin is advanced into the assembly station. Subpurlins and a diaphragm are moved against the purlin in the assembly station, and are attached to the purlin, such as by the automatic nailers on the nailing carriage. The purlin is then indexed the width of the diaphragm, and the next subpurlins and diaphragm are placed against the new section of the purlin, and may be attached to the purlin at the assembly station (e.g., by the nailing carriage).

The end of the purlin having subpurlins and diaphragm(s) attached thereto advances into an exit station. The exit station includes a support for the purlin, which is adjustable for height similar to, or the same as, the lifting mechanism for the purlin feeder. A second support is provided for the side of the assembled roof panel structure having the subpurlins and diaphragms (i.e., opposite the purlin). In accordance with another aspect of the present invention, a fork lift is provided with tines that are specially configured to lift the roof panel structure from the exit station.

In accordance with still another aspect of the present invention, the subpurlin clamping mechanisms are mounted on a carriage that advances the clamping mechanisms and the subpurlins into the assembly station. The carriage may, for example, include a clamping mechanism for each subpurlin. Feeders are provided to supply subpurlins to the clamping mechanisms. According to one aspect of the present invention, a separate subpurlin feeder is provided for each subpurlin clamping mechanism. The subpurlin feeders may be, for example, vertical magazines or indexing units that drop a bottom subpurlin into a subpurlin clamping mechanism while a penultimate subpurlin is supported.

The subpurlin clamping mechanisms may include clamps or pinchers that close on opposite sides of the subpurlin and thereby position a subpurlin in a subpurlin clamping mechanism. The clamps may include sensors for determining or confirming the thickness of a subpurlin in a subpurlin clamping mechanism.

A rod or other device may be used to press a subpurlin against the purlin after the carriage has advanced the subpurlins into the assembly station. A sensor may be used to determine the length of the stroke of the rod so that the subpurlin length may be detected or confirmed.

If the subpurlin includes brackets that are configured to extend over the purlin, in accordance with an aspect of the present invention, the carriage, the subpurlins, or the clamping mechanisms may be lifted as the brackets and subpurlins approach the purlin, so that the brackets are raised above a top edge of the purlin. This feature assures that the brackets clear the top edge of the purlin, instead of hitting the purlin as the brackets are advanced. The subpurlins, clamping mechanisms, or carriage may then be lowered, so that the brackets rest on top of the purlin.

In accordance with one aspect of the present invention, the diaphragm feeder includes a diaphragm carriage. In one embodiment, the diaphragm carriage includes the nailing carriage and a lifting carriage for lifting and placing the diaphragm onto the subpurlin and/or purlin. This lifting carriage may include some form of device for grasping a diaphragm, for example, suction cups.

The lifting carriage may lift the diaphragm from a pile of diaphragms. In accordance with another aspect of the present invention, the pile of diaphragms may be provided on a lift designed such that a top diaphragm stays at substantially the same height as diaphragms are removed.

In accordance with an aspect of the present invention, the lifting carriage is movable relative to the diaphragm carriage, and may, for example, be mounted on a diaphragm carriage for rotational and three dimensional movement. Sensors may be provided for aiding in proper alignment of a diaphragm held by the lifting carriage before the diaphragm is placed on the subpurlins and purlin.

The nailing carriage may be separate from the diaphragm carriage, or may be mounted thereon, for example, on a lower portion of the diaphragm carriage. In accordance with one aspect of the present invention, a diaphragm is lowered into place in the assembly station by the lifting carriage, and the automatic nailers nail the diaphragm to the purlin and/or subpurlin before the holding device releases the diaphragm. The holding mechanism is then released and the lifting carriage is retracted. The nailing carriage may then index so that the automatic nailers may nail the diaphragm at other locations. This process may be continued until nailing is complete. The nailing process may require turning some automatic nailers on in some locations, and off in others, depending upon the configuration of the roof panel structure and the location of the automatic nailers. To aid in aligning the automatic nailers in the proper location, the diaphragm carriage is configured to provide lateral movement of the nailing carriage, such as in the x- and y-directions.

The system may include a computer that permits the lengths and/or widths of the purlin, subpurlin, and diaphragms to be entered, so that the entire process is automatic once started. The sensors ensure that the appropriate size of subpurlins and diaphragms are in place and properly aligned, and serve as checks on the automated assembly.

The roof panel structure assembly mechanism of the present invention may be operated by a minimal number of workers, but yet generates multiple roof panel structures in a fraction of the time of conventional, manual assembly. In addition, workers that are less mobile, and that are not capable of strenuous activity may be used to operate the roof panel structure assembly mechanism. The roof panel structure assembly mechanism is fully portable, so it may be delivered to a site where assembly is needed.

Other advantages will become apparent from the following detailed description when taken in conjunction with the drawings, in which:

BRIEF DESCRIPTION OF THE DRAWINGS

FIGS. 11–13 are side views showing various stages of a forklift removing the roof panel structure of FIG. 10 from the exit station;

DETAILED DESCRIPTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details. Furthermore, well-known features may be omitted or simplified in order to not obscure the present invention.

Roof Panel Structures

Figure 1:
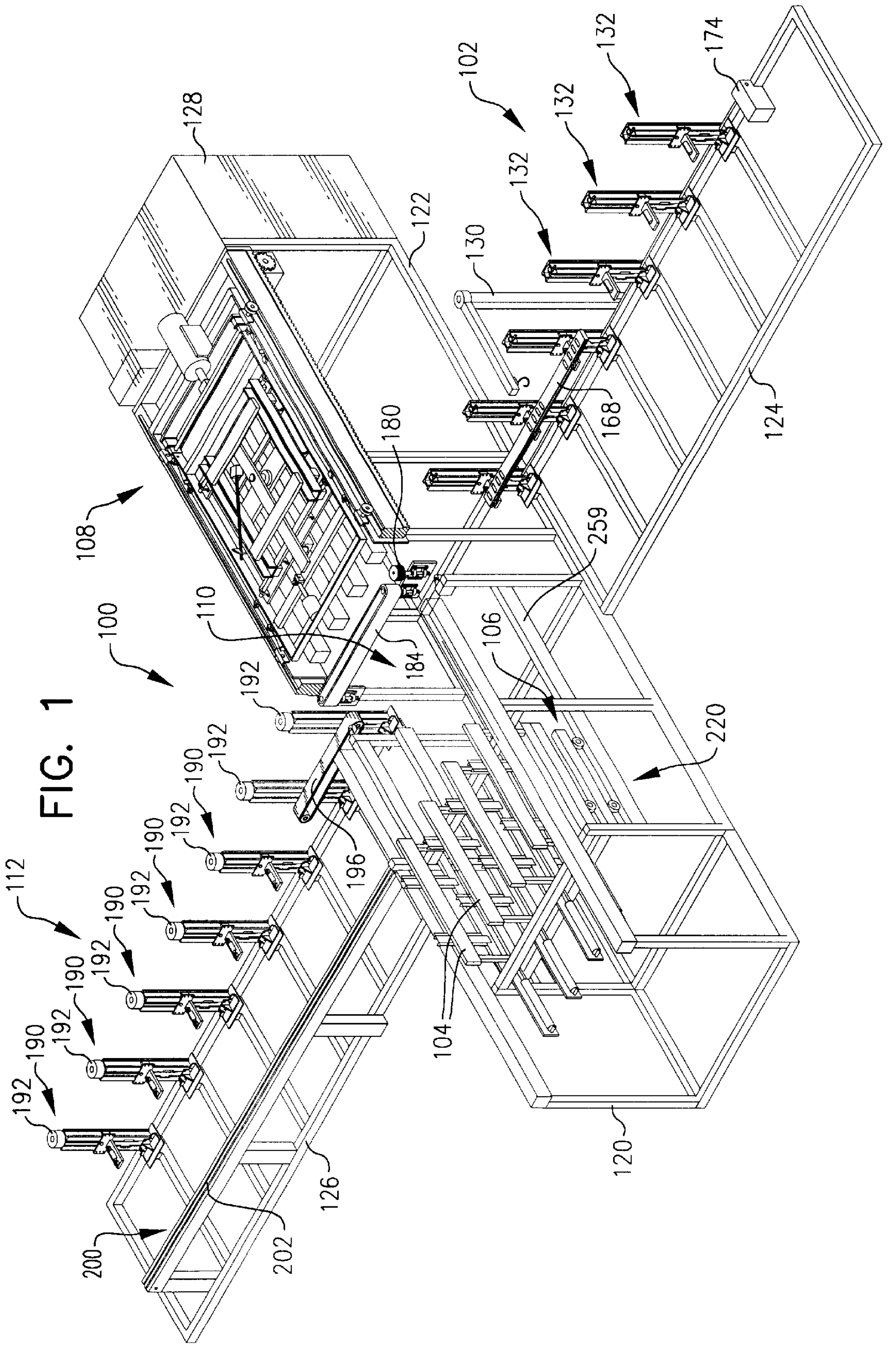
FIG. 1 is a side perspective view of a mechanism for assembling roof panel structures in accordance with one aspect of the present invention, with parts removed to show detail.
Figure 2:
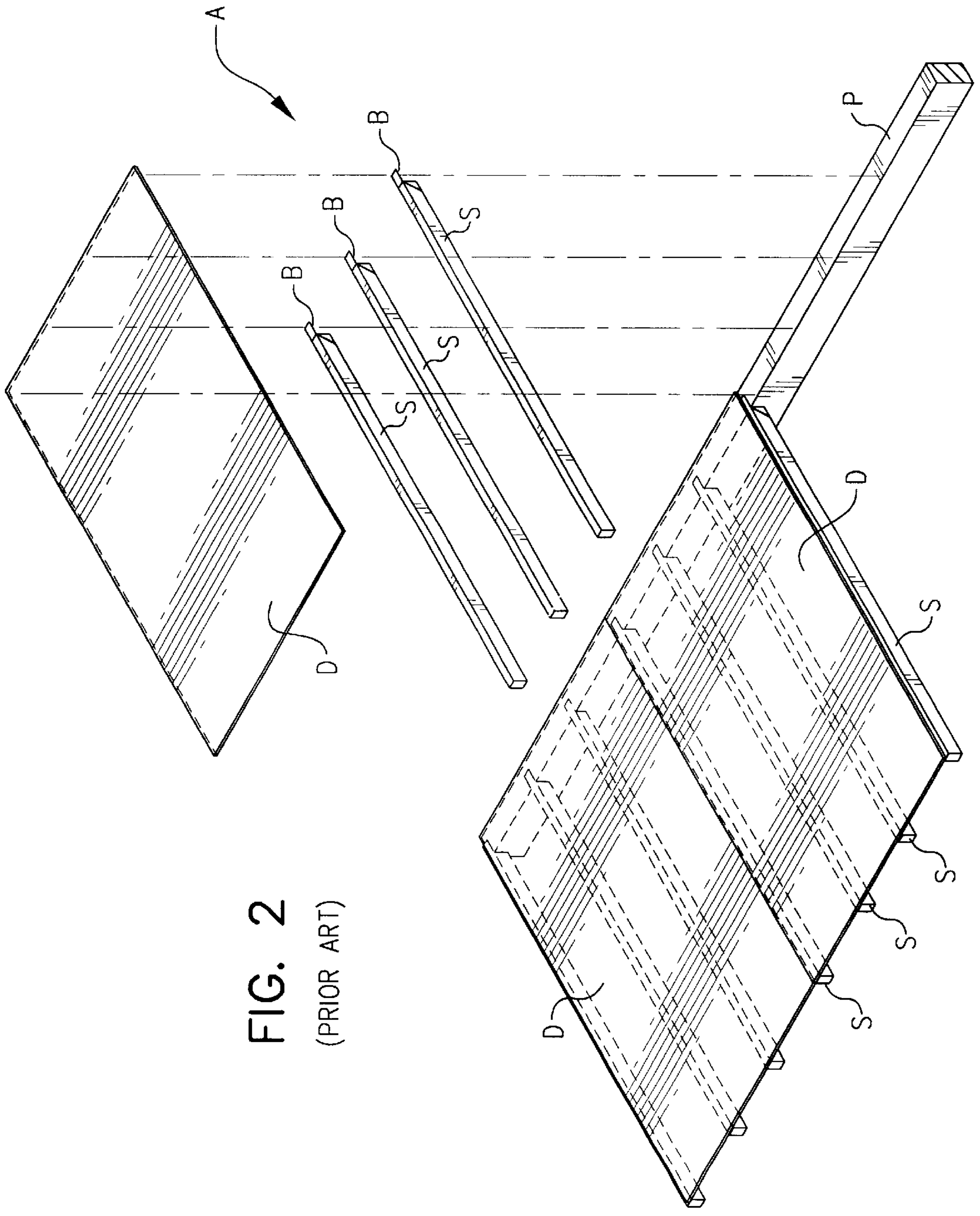
FIG. 2 (PRIOR ART)
FIG. 2 is an exploded perspective view a roof panel structure, used to show one typical construction of such a structure.

Generally described, the present invention is directed to a mechanism, generally designated as 100 in FIG. 1, for assembling roof panel structures, an example of which is generally designated as "A" in FIG. 2. Although the roof panel structure A is shown as one example, variations of that structure are possible, and a person of skill in the art may utilize the features of the present invention in the construction of roof panel structures having various configurations.

As is known in the art, a roof panel structure A typically includes a major horizontal beam, often called a purlin P. The purlin P may be a steel girder, a glulam structure, a wooden beam, or the like, but typically includes wood or another material along a top edge that permits easy attachment of other components of the roof panel structure (e.g., by nailing).

Minor beams, called "subpurlins" (S in FIG. 2) extend orthogonally to the purlin P, and are often attached to the purlin P by right angle brackets B that extend from an end of the subpurlin. The subpurlins S may be made of any of the materials described with above with respect to purlins P, but are typically lumber stiffeners, such as 2-by-6's or 2-by-4's, 3-by-4's, 3-by-6's, and so forth, six to ten feet in length.

Diaphragms D, such as wood structural panels (e.g., 4×8, 4×10, 8×8, or 8×10 structural wood panels) are mounted over the subpurlins S and the purlin P, and are typically nailed to the subpurlins and the purlin for structural and shear support. In the embodiment shown in FIG. 2, the diaphragms D extend beyond both ends of the subpurlins S, and a front end of the diaphragms overlaps approximately one half of the thickness of the purlin P. The back ends of the diaphragms on an adjacent roof panel structure A overlap the other half of the thickness of the purlin P. Subpurlins S are located such that the edges of the diaphragm D overlap one half of the subpurlins that extend along the side edges of the diaphragm, and other, intermediate subpurlins (two shown in FIG. 2, but this number may be varied) are spaced between the two subpurlins on the side edges. Adjacent diaphragms D overlap the other half of the subpurlins S at the side edges.

The number of diaphragms D and subpurlins S used in a roof panel structure A depends upon the spacing of the subpurlins, the width of the diaphragms, and the length of the roof panel structure. Typically, the diaphragms are 4 or 8 feet in width (although they may be less or more wide), and the subpurlins are typically spaced 24 inches on center (i.e., two edge subpurlins S and one intermediate for a 4 foot wide diaphragm, and two edge subpurlins and three intermediate subpurlins for a 8 foot wide diaphragm, and so forth). Completed roof panel structures A may be 25 to 80 feet in length, or even longer. When installed, these roof panel structures A extend orthogonally to main supporting beams (not shown, but known in the art) and are attached to the main supporting beams and adjacent roof panel structures by nailing or another appropriate attachment method.

General Overview

FIG. 1 shows a perspective view of a roof panel structure assembly mechanism 100 in accordance with the present invention. Parts have been removed for detail. In summary, the roof panel structure assembly mechanism 100 includes a purlin feeder 102, subpurlin feeders 104, subpurlin clamping mechanisms 106, and a diaphragm feeder 108. The structure and operation of an embodiment for each of these different components is described further below. However, in general, the purlin feeder 102 advances a purlin P into an assembly station, generally shown at 110 in FIG. 1. The subpurlin feeders 104 insert a subpurlin S into each of the subpurlin clamping mechanisms 106, and the subpurlin clamping mechanisms advance into the assembly station 110 and hold the subpurlins against the section of the purlin P that is already in the assembly station. The diaphragm feeder 108 places a diaphragm D onto the subpurlins S and the purlin P at the assembly station 110.

The components shown in FIG. 1 are arranged relative to one another in one possible configuration. However, as will be understood from the following description, the components may be arranged differently. As nonlimiting examples, one or more of the purlin feeder 102, the diaphragm feeder 108, the subpurlin feeders 104, and the subpurlin clamping mechanisms 106 may be located above another of these components, or two components may be located on the same side of the assembly station (e.g., side by side), or one or more of the components or parts of the components may be located above or below the assembly station. In addition, the functions of two or more of the purlin feeder 102, the diaphragm feeder 108, or the subpurlin clamping mechanisms 106 may be combined in a single station, or one or more of their functions may be provided at the assembly station 110. In addition, the features and operation of any of the components may be distributed over multiple components or devices. As an example, one or more subpurlins and one or more diaphragms may be advanced to a first assembly station where they are attached, e.g., by nailing. The assembled structure may then be advanced to a second station where it is attached to a purlin (which may be advanced into the second station as well). As another alternative, the purlin may be advanced into the first assembly station, where it may be attached to the assembled diaphragm and subpurlin structure. Multiple variations are available.

Thus, multiple different arrangements are available for the purlin feeder 102, the diaphragm feeder 108, the subpurlin clamping mechanisms 106, and the assembly station 110. In addition, the functions of these components may be combined, or may be distributed over multiple stations. For ease of understanding, however, the invention will be described with reference to the arrangement shown. However, a person of skill in the art could modify the arrangement according to space constraints or particular needs.

In accordance with one aspect of the present invention, after the purlin P, the subpurlins S, and the diaphragm D are brought together in the assembly station 110, the components are attached, for example by one or more automatic nailers (e.g., nailing guns). The purlin P is then advanced so that additional subpurlins S and a diaphragm D may be attached. This process proceeds until the end of the purlin P is reached.

The automatic nailers in the described embodiment are provided on a nailing carriage that moves with the diaphragm feeder. However, the automatic nailers may alternatively be provided on a separate carriage, and may be positioned where convenient. In addition, although the described embodiment discloses a nailing operation that occurs after the purlin P, subpurlins S, and diaphragm D have been assembled, a nailing operation may be used where subassemblies are assembled and attached (e.g., subpurlins and one or more diaphragms), and the subassemblies are then advanced to be joined with the remaining portions of the roof panel structure A (e.g., the purlin). Thus, automatic nailers may be distributed over multiple locations. Moreover, as used herein, "carriage" is meant to denote a movable part of the roof panel structure assembly mechanism 100 that may be used to deliver the respective object or part, such as the automatic nailers for the nailing carriage.

The forward end of the purlin P that has subpurlins S and diaphragm(s) D attached thereto advances into an exit station 112. The exit station 112 includes supports for the assembled roof panel structure A, as described further below. The purlin P continues to index into the exit station 112 until the assembled roof panel structure A exits the assembly station 110. The assembled roof panel structure A is then ready for removal from the exit station, and installation in a roof.

The components shown in FIG. 1 may be made portable, and thus may be transported to a work site for assembly of roof panel structures A on the site. As an example, a frame 120 for housing the subpurlin feeders 104 and the subpurlin clamping mechanisms 106 may be formed integral with a frame 122 for the diaphragm feeder 108. This integral unit may be sized so that it may be transported on a single trailer. In addition, a frame 124 for the purlin feeder 102 and a frame 126 for the exit station 112 may be integrally formed and sized so that the integral unit fits on a trailer. However, for the embodiment shown in the drawings, these two frames 124, 126 are separate, but individually may be transported together on a trailer or may be transported on separate trailers. The frames 124, 126 may include attachment structures so that they may be fixed to the frames 120, 122 once the roof panel structure assembly mechanism 100 has been placed at a site. The attachment of the frames 120, 122, 124, 126 assures that proper alignment of the various stations is maintained.

Although not shown so that details of the components of the roof panel structure assembly mechanism 100 are visible, the subpurlin frame 120 and the diaphragm frame 122 may include paneling on their outer surfaces. The paneling provides safety and security for the roof panel structure assembly mechanism 100. Other paneling or appropriate covering may be incorporated in the roof panel structure assembly mechanism 100.

The frames 120, 122, 124, and 126 and the other components of the roof panel structure assembly mechanism 100 may be made steel. Other materials may be used, such as aluminum or other metals, wood for some components, and/or plastics or composites. However, the applicant has found that steel is a relatively inexpensive material that provides strength, wear resistance, and manufacturability.

The operation of the roof panel structure assembly mechanism 100 may be controlled by a computer 128 (shown generally by a large box in FIG. 1, but its size and location may be altered as appropriate). The computer 128 may be any device or devices that can execute computer-executable instructions, such as program modules. Generally, program modules include routines, programs, objects, components, data structures and the like that perform particular tasks or implement particular abstract data types. Given the description herein, the computer 128 may be programmed by a programmer of ordinary skill to perform the functions and operations described herein. Although the invention is described with reference to a single computer 128, the features of the computer 128 may be distributed over a number of computers, microcomputers, controls, or other devices.

Unless described otherwise herein, the operation of the roof panel structure assembly mechanism 100 is fully automated, and the functions of the roof panel structure assembly mechanism are driven synchronously by the computer 128 with relatively little operator intervention. However, if desired, one or more of the functions of the roof panel structure assembly mechanism 100 may be performed manually instead of automatically, but without the full benefits of the described embodiment.

The Purlin Feeder

Figure 3:
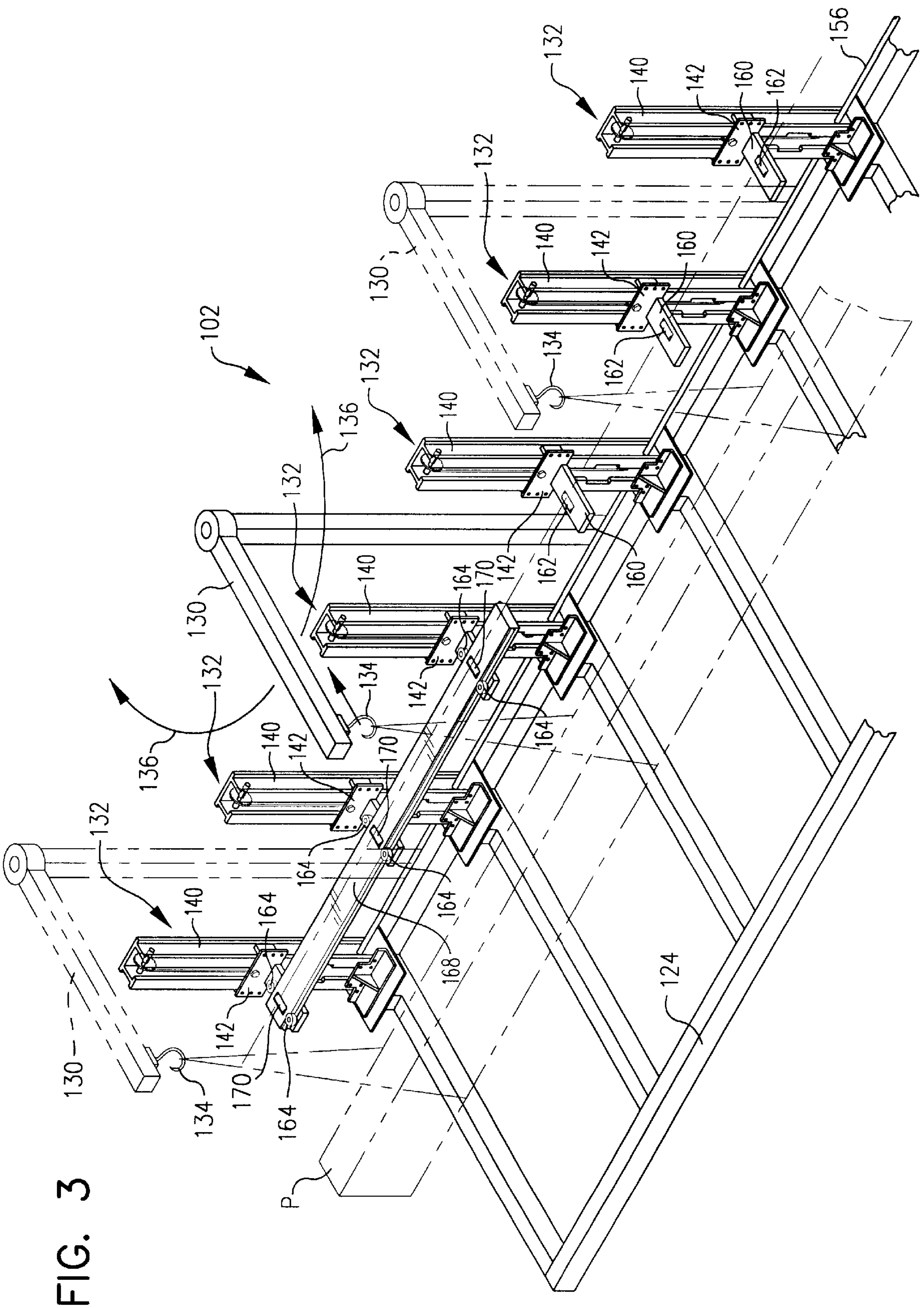
FIG. 3 is a side perspective view of a purlin feeder for the roof panel structure assembly mechanism of FIG. 1.

The station for the purlin feeder 102 is shown in detail in FIG. 3. One or more hoists 130 may be provided for lifting a purlin P (shown for simplification in phantom in FIG. 3, but the structure of which is known in the art) onto a series of lifting mechanisms 132. The hoist 130 or hoists may be, for example, a single boom hoist, having a hook 134 and being capable of rotation, as shown by the arrows 136. As shown phantom in FIG. 3, more than one hoist may be incorporated into the purlin feeder station 102. Purlins P may be stacked on the frame 124, and thus are easily accessible by the hoist 130 or by an operator. The hoist 130 is used to aid a worker in placing a purlin on the lifting mechanisms 132, but is not necessary for operation of the present invention.

Figure 4:
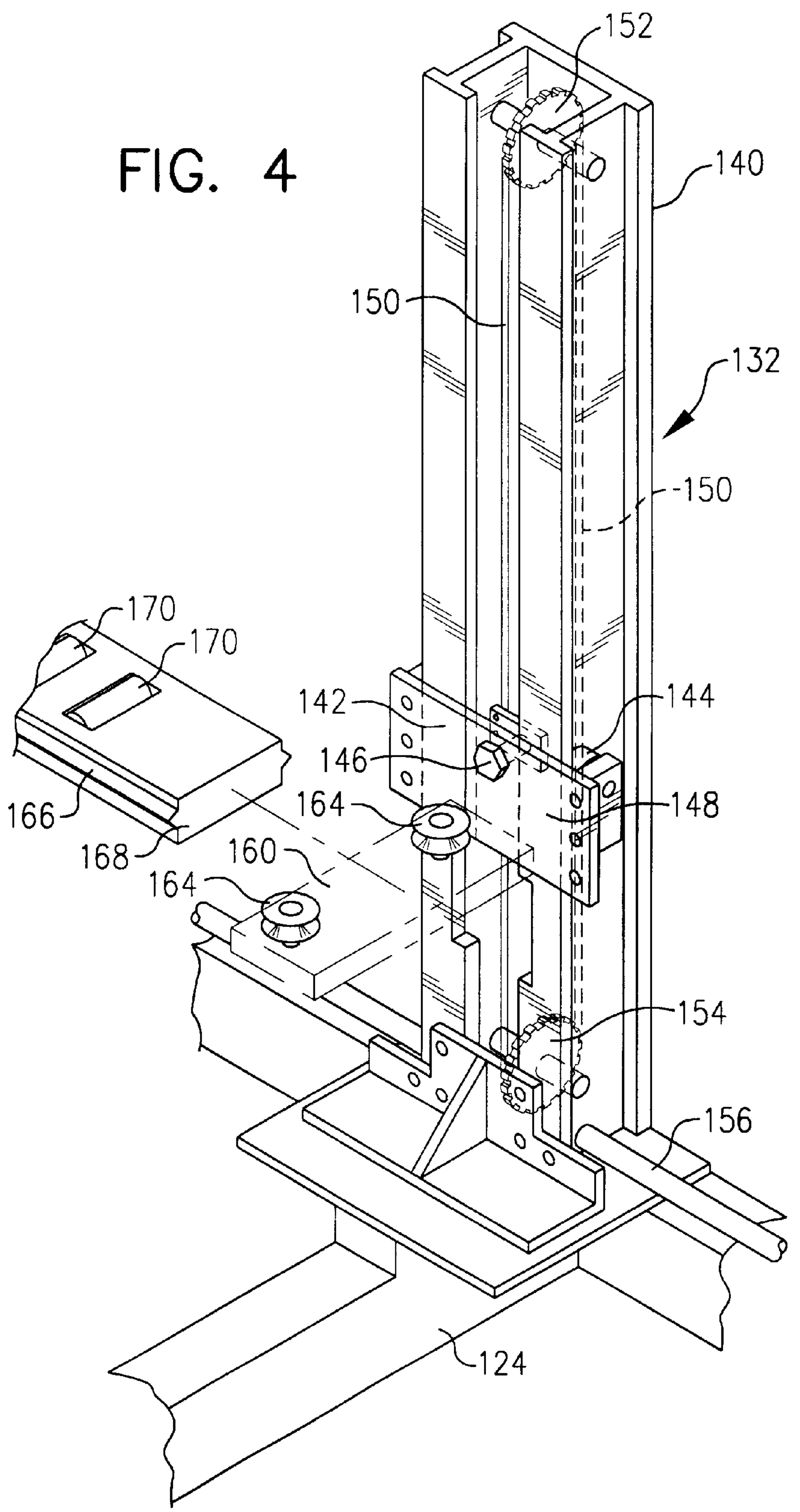
FIG. 4 is a side perspective view of a lifting mechanism for the purlin feeder of FIG. 3.

The details of one of the lifting mechanisms 132 are shown in FIG. 4. The lifting mechanism 132 is mounted on the frame 124, and includes a vertical column 140. The vertical column 140 has a cross section of a "U," with sides of the U being formed by connected, parallel I-beams.

A carriage 142 is mounted for sliding movement up and down the face of the vertical column 140. The carriage 142 includes wheels 144 (only one of which is shown in FIG. 4) that allow the carriage to smoothly glide up and down the vertical column 140. A bolt 146 or other fastener extends out of the back of a front plate 148 for the carriage 142, and is connected to an endless belt or chain 150. The chain 150 loops around an idler sprocket 152 at the top of the vertical column 140, and a drive sprocket 154 at the bottom of the vertical column 140. The drive sprocket 154 is arranged to engage teeth (not shown) on a horizontal shaft 156.

In accordance with one aspect of the present invention, the structure thus described for the lifting mechanism 132 is included on each of the lifting mechanisms. In addition, the shaft 156 is common to all the lifting mechanisms for the purlin feeder 102, i.e., connects to the drive sprocket 154 for each of the lifting mechanisms.

A plate 160 extends horizontally outward from the bottom of the carriage 142. In accordance with one aspect of the present invention, for some of the lifting mechanisms (e.g., the right three in FIG. 3), the plate includes a roller 162 or rollers along a top edge. For others (e.g., the left three in FIG. 3), the plate 160 includes a pair of side rollers 164 (best shown in FIG. 4). The side rollers 164 are arranged to engage and receive side edges 166 of a roller bar 168. The roller bar 168 includes a series of rollers 170 along its top surface.

The side rollers 164 permit the roller bar 168 to extend beyond the frame 124 of the purlin feeder 102 and into the assembly station 110. That is, the roller bar 168 may extend from the position shown in FIG. 3, where it is captured by the side rollers 164 on three lifting mechanisms 132, to the extended position shown in phantom in FIG. 5. In this extended position, the roller bar 168 is supported by the leftmost two lifting mechanisms 132, and the forward portion of the roller bar 168 extends well into the assembly station 110. A stop may be provided to prevent the roller bar 168 from extending too far forward. By extending into the assembly station 110, the roller bar 168 continues to provide support for a purlin P after the purlin has left the purlin feeder 102.

In operation, a purlin P is lifted by the hoist 130 (if available), and is swung over to the lifting mechanisms 132. A purlin P is shown at the beginning stage of lifting in FIG. 5. If not already extended into the assembly station 110, the roller bar 168 may be thus extended prior to lifting the purlin P. Alternatively, the roller bar 168 may be extended with a purlin P.

Figure 6:
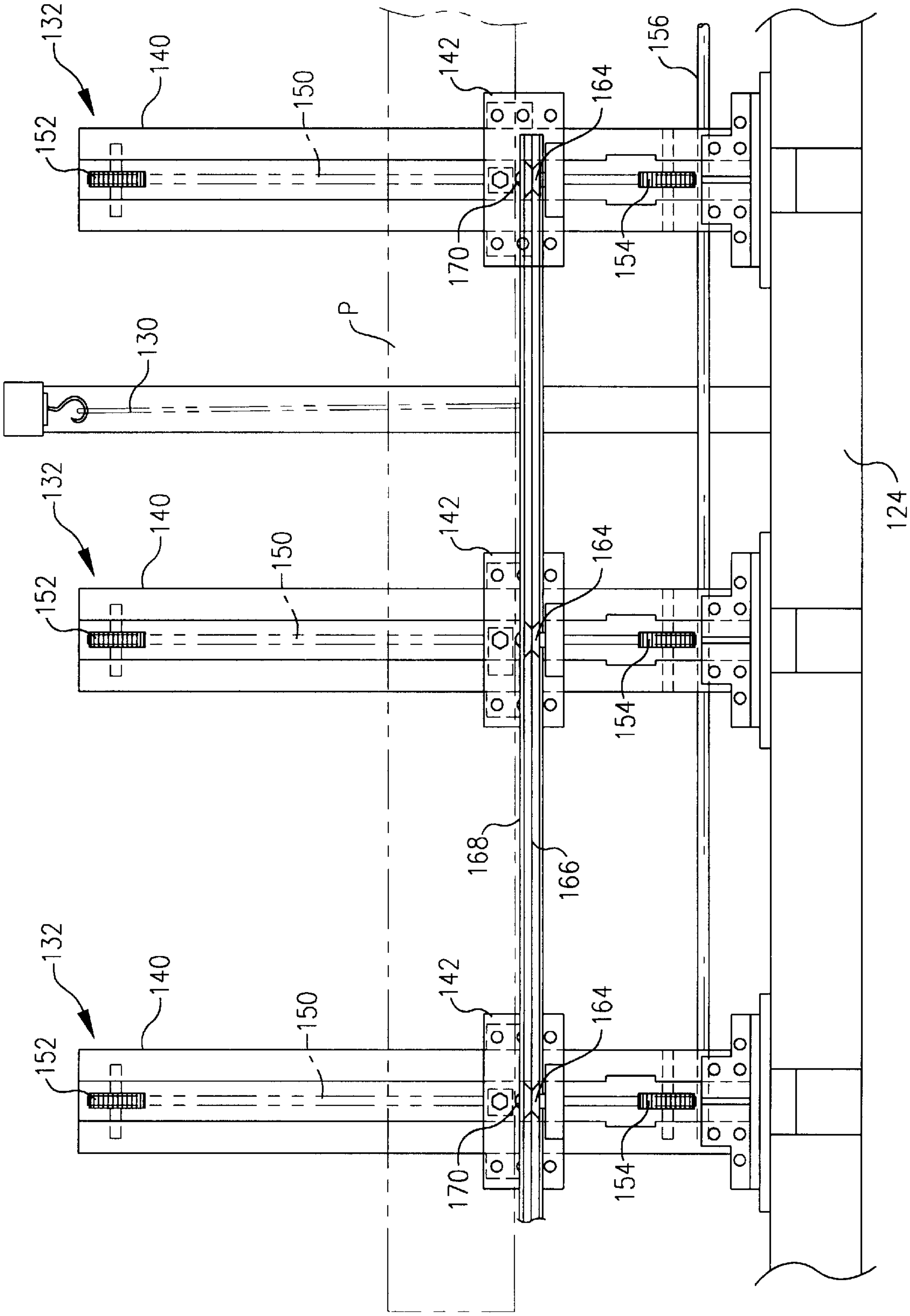
FIG. 6 is a side view of a portion of the purlin feeder of FIG. 3, with a purlin shown in a lowered position.

The purlin P, once installed on the lifting mechanisms 132 (FIG. 6), rests on the rollers 162 and the rollers 170 (e.g., the purlin P is shown on the rollers 170 in FIG. 6). To this end, the rollers 162 and the rollers 170 are arranged so that their top edges are aligned. The purlin P may lean against the vertical columns 140 for stability. If desired, other rollers (not shown) may be provided on the vertical column 140 to aid in advancing a purlin P.

After the purlin P is placed on the lifting mechanisms 132, the lifting mechanisms 132 may then raise or lower the purlin P so as to align the top of the purlin with a reference point. This feature is important for the embodiment of the invention shown in the drawings, because the purlin P should be at a particular level for the subpurlins to properly align with the top of the purlin in the assembly station. In alternate embodiments, the height of the subpurlins S may be altered to align with the purlin P, for example, or the subpurlins and purlin may be aligned in other manners.

Figure 7:
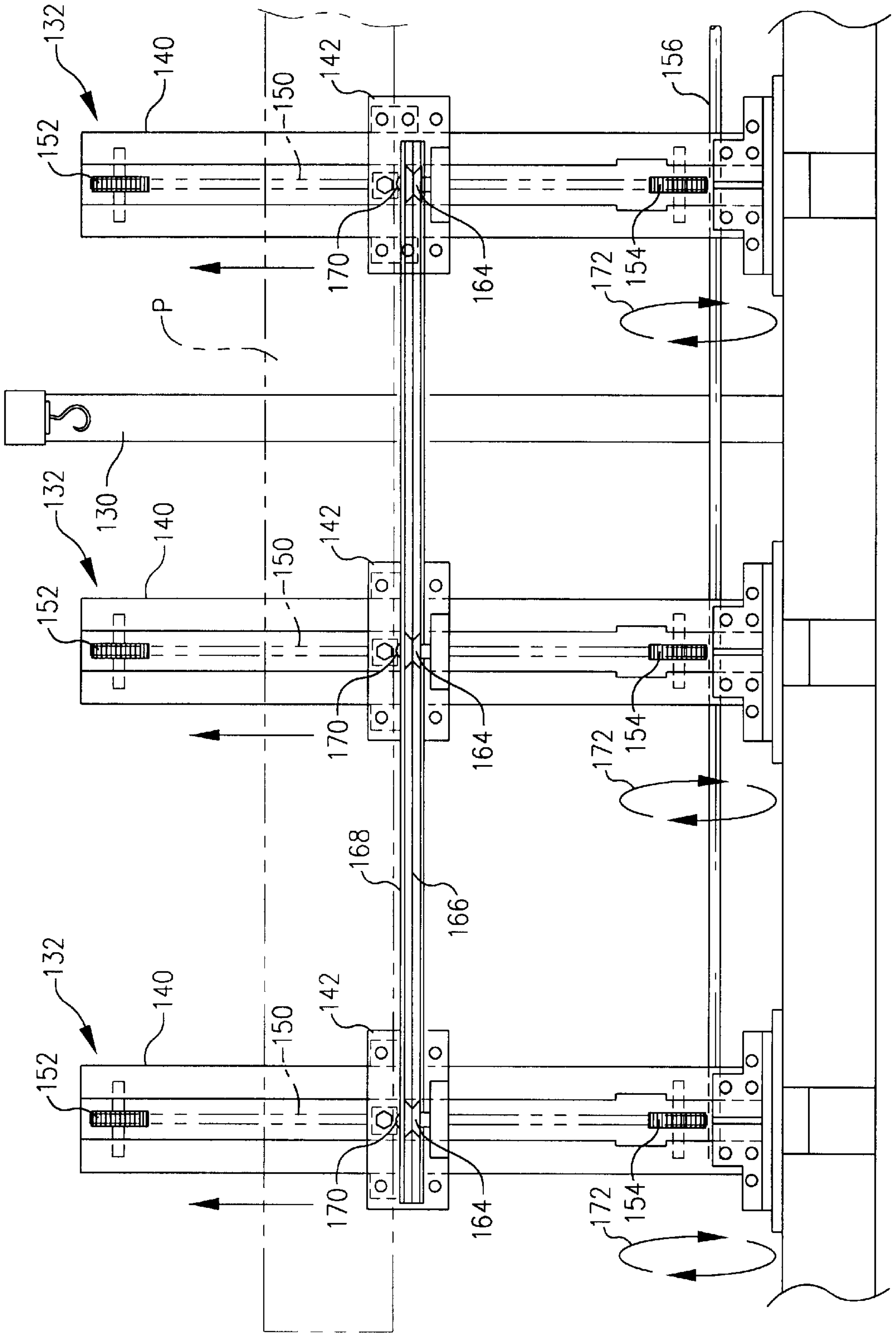
FIG. 7 is a side view of a portion of the purlin feeder of FIG. 3, similar to FIG. 6, with a purlin shown in a higher position.

To adjust the height of the purlin P, the shaft 156 is rotated, as shown by the arrows 172 in FIG. 7. Rotation of the shaft 156 causes the drive sprockets 154 to rotate, forcing the front loop of the chains 150 upward. This movement drives the carriage 142 upward, lifting the purlin along with it.

Because each of the lifting mechanisms 132 is driven by the same shaft 156, the plates 160 move upward at the same rate. This feature permits the purlin P to remain horizontal and fully supported during lifting. The shaft 156 may be driven by a servo motor, shown generally as a box 174 in FIG. 1.

The proper height may be determined by a user (e.g., by visual inspection against a reference), or may be sensed. If a sensor or sensors are used, then the sensors may shut power to the servo motor 174 once the purlin P has reached the appropriate height.

Figure 5:
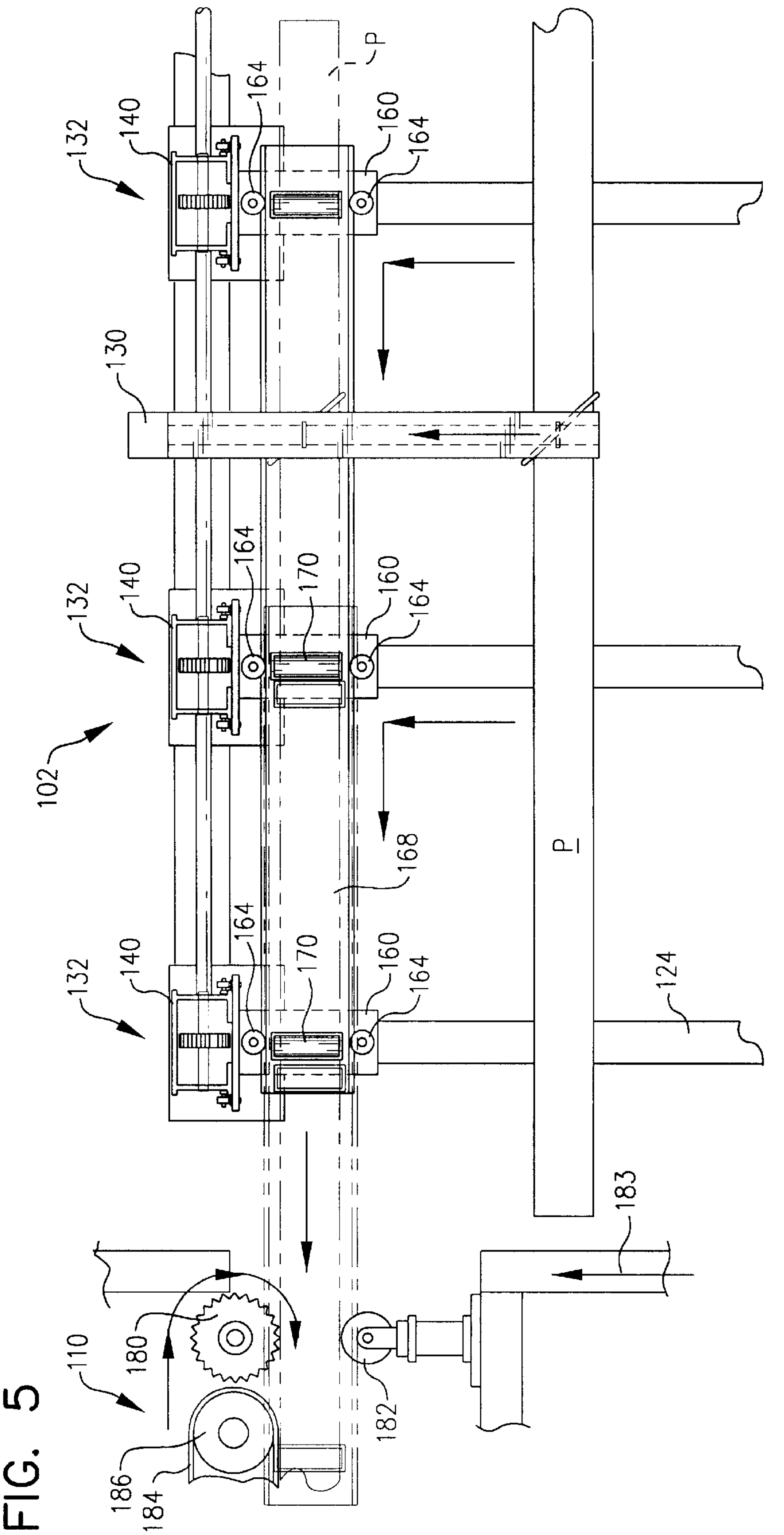
FIG. 5 is a top view of a portion of the purlin feeder of FIG. 3.

After the purlin P is raised or lowered to the proper height, the purlin P is ready for advancing into the assembly station 110. As such, the purlin P may be advanced (e.g., manually) on the rollers 162 and 170 into the assembly station, as is shown in FIG. 5. As stated above, additional rollers (not shown) may be provided on the vertical columns 140 to aid in smooth movement of the purlin P into the assembly station 110. The roller bar 168, because it extends into the assembly station 110, continues to support the purlin P as it is advanced. When the purlin P reaches the assembly station 110, it is captured between a toothed driven roller 180 (FIG. 5) and a biased idler roller 182. The idler roller 182 is pressed toward the toothed driven roller 180, as shown by the arrow 183, for example by a cylinder or spring (not shown).

Further within the assembly station 110, just forward of the toothed driven roller 180, is a belt 184. The belt 184 is wrapped over a number of rollers 186, one of which is shown in FIG. 5. The rotation of the outer surface of the belt 184 is synchronized with the rotation of outer surface of the toothed driven roller 180. For example, the toothed driven roller 180 and the rollers 186 and belt 184 may have the same radius, and therefore would rotate at the same speed.

Once the purlin P is captured between the toothed driven roller 180 and the idler roller 182, rotation of the toothed driven roller pulls the purlin into the assembly station 110. The toothed surface of the toothed driven roller 180 helps to grip the purlin P, and the bias of the idler roller 182 assures constant engagement of the purlin P with the toothed driven roller.

Either of the toothed driven roller 180 and the idler roller 182 may include a sensor and/or a counter (not shown) for determining the start of a purlin P, and for measuring the amount the purlin has been advanced into the assembly station 110. This feature may be provided, for example, by the toothed driven roller 180 being driven by an absolute feedback servo motor (not shown). As is known, such motors provide feedback of their functions, even if power has been cut during operation. This feature helps to automatically feed the purlin P the correct amount into the assembly station, and to maintain information regarding information about the position of the purlin as it advances into and through the assembly station 110. In addition, the amount that the idler roller 182 is biased inward may be sensed to determine or confirm the thickness of the top of the purlin P.

As the purlin P continues to advance into the assembly station, it engages the belt 184, which helps maintain alignment of the purlin, and further helps to pull the purlin forward. The idler roller 182 maintains the contact of the purlin with the front of the vertical columns 140 of the lifting mechanisms, the toothed driver roller 180, and the belt 184. In this manner, the purlin maintains proper alignment as it enters and passes through the assembly station 110.

The lifting mechanisms 132 shown in the drawings are but one way to provide lifting and feeding of the purlin P. For example, a single column may be used, having a roller bar stabilized thereon. A platform may be provided, the height of which may be adjusted, and along which the purlin P may be fed. The purlin P may be captured between opposing rollers (up and down or side-to-side), or suspended from overhead. Many alternatives are available. However, the described embodiment is relatively inexpensive to fabricate, and provides exemplary stability and lifting ease.

The Exit Station

Figure 8:
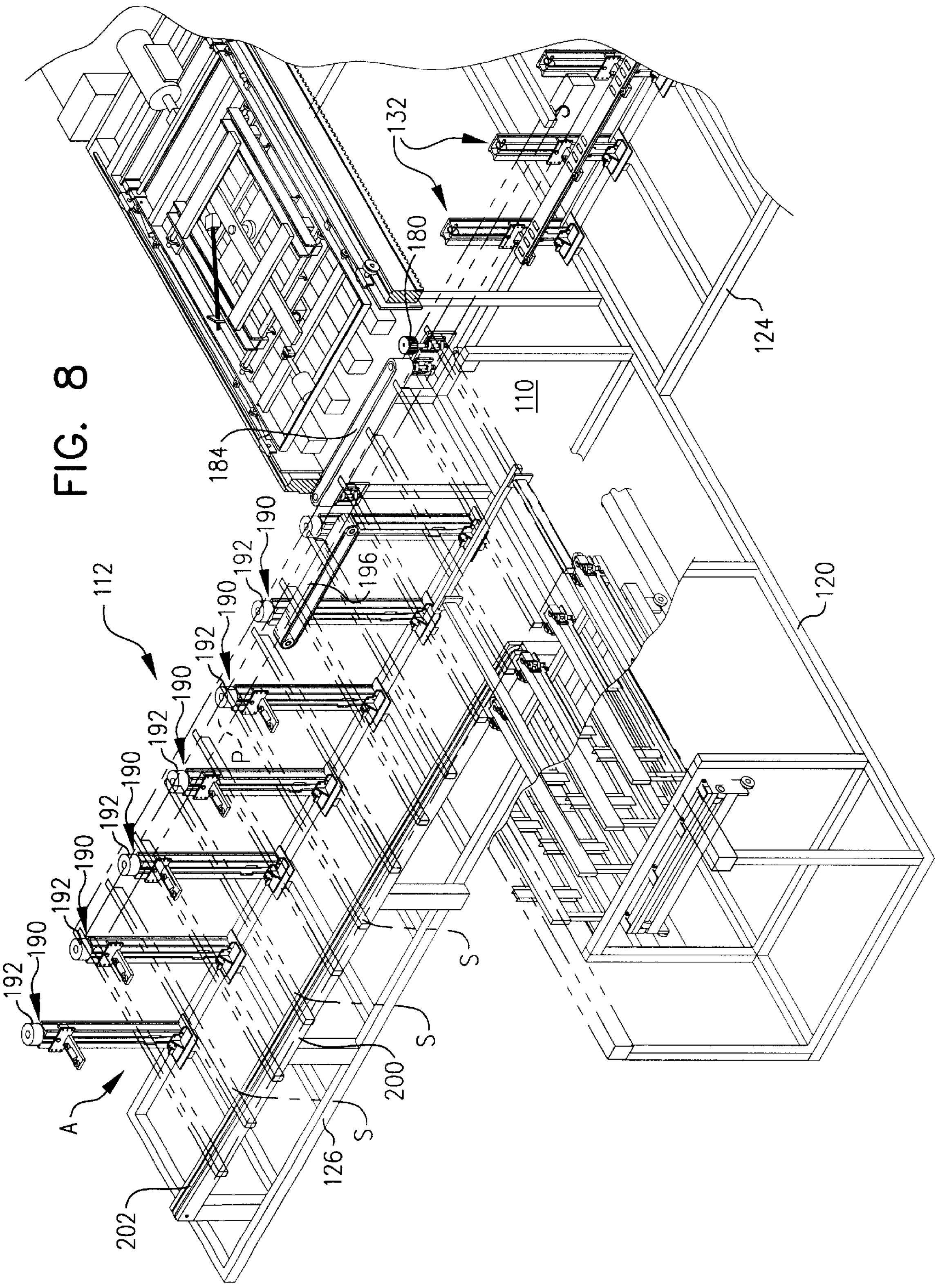
FIG. 8 is a side perspective view of the roof panel structure assembly mechanism of FIG. 1, with parts removed for detail, and showing an assembled roof panel structure in an exit station, the assembled roof panel structure being shown in phantom.
Figure 9:
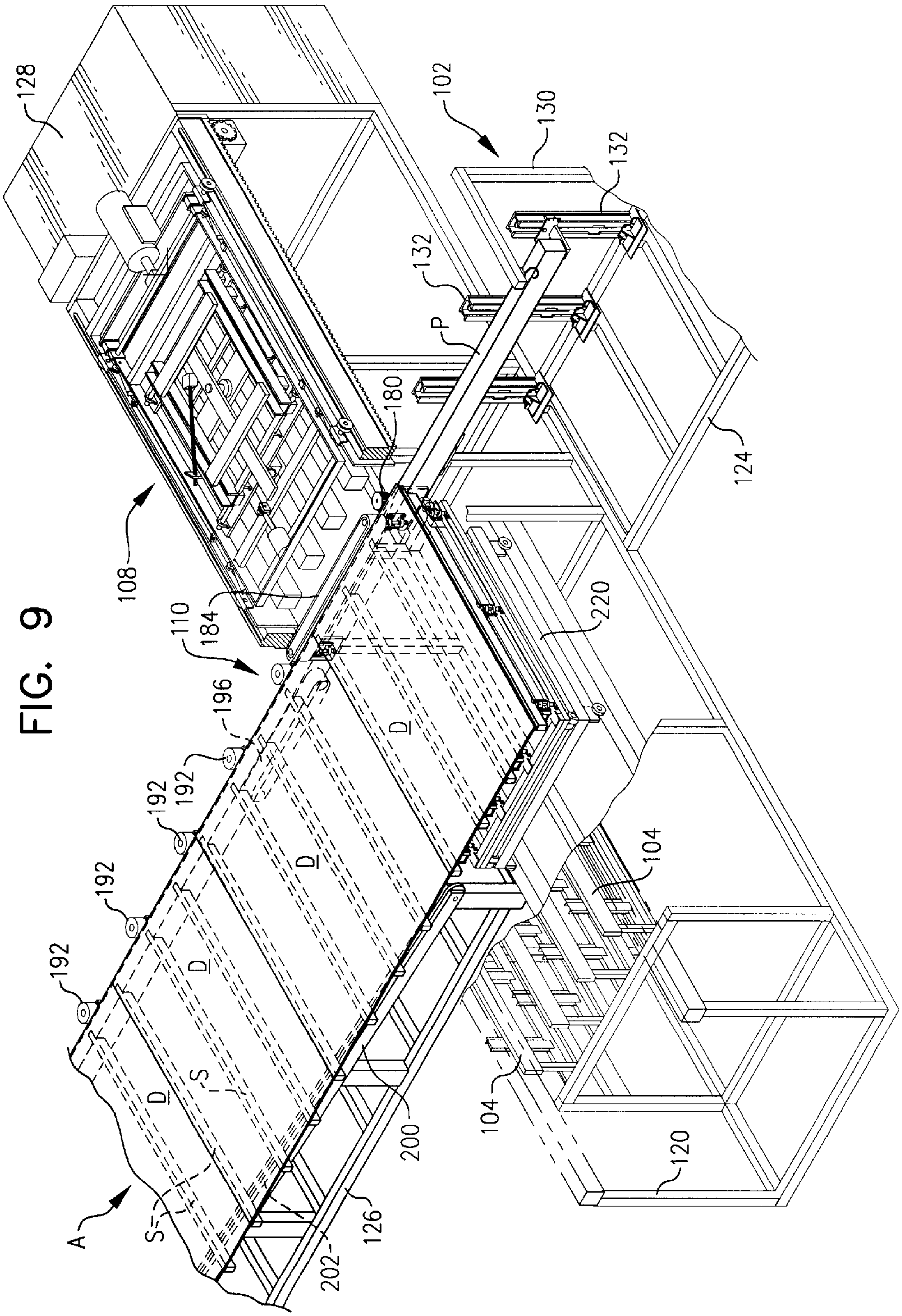
FIG. 9 shows a side perspective view, similar to FIG. 8, with the roof panel structure not being in phantom.

The exit station 112 is shown in detail in FIGS. 8 and 9. As the assembled panel A leaves the assembly station 110, it enters the exit station 112. The exit station 112 includes a number of lifting mechanisms 190 that are similar to the lifting mechanisms 132 in the purlin feeder 102. The lifting mechanisms 190 include passive rollers 192 at their top edges, with an axis of rotation for each of the rollers being aligned vertically.

The lifters for the lifting mechanism 190 are similar in construction to the plates 160 and carriages 142 for the lifting mechanisms 132. In the embodiment shown in the drawings, the left-most five lifting mechanisms 190 include rollers similar to the right-most three lifting mechanisms 132. However, the two right-most lifting mechanisms 190 of the exit station 112 include a conveyor 196 extending between the two plates 160 for the lifting mechanisms 190. When the assembled roof panel structures A leave the assembly station 110, the bottom edge of the purlin P aligns with and then rides along the top of the conveyor 196. The conveyor 196 may be driven by an absolute feedback servo motor (not shown), and preferably is synchronized with the belt 184 and the toothed driven roller 180.

The shaft or other mechanism that is used to raise the lifting mechanisms 190 may be similar to, or the same as, the shaft 156 used to raise the lifting mechanisms 132 for the purlin feeder 102. If separate mechanisms (e.g., separate shafts) are used to lift the two lifting mechanisms 132, 190, then the lifting of these two lifting mechanisms is preferably synchronized so that the heights of the two mechanisms may be the same, so that the purlin P may smoothly transition from the purlin feeder 102, through the assembly station 110, and into the exit station 112. As the purlin P enters and continues through the exit station 112, the top end of the purlin aligns against the rollers 192 on the top of the lifting mechanism 190.

A support 200 is provided on the opposite side of the exit station 112 from the lifting mechanisms 190. The support 200 is arranged and configured to receive a bottom edge of the subpurlins S as the assembled roof panel structure A advances through the exit station 112.

The support 200 includes an endless chain 202 running along its length. The subpurlins rest against this endless chain 202. The rotation of the endless chain 202 is preferably synchronized with the movement of the conveyor 196, for example by an absolute feedback servo motor (not shown). Thus, the subpurlin end of the roof panel structure A is driven through the exit station 112 at the same rate that the purlin P is driven through the exit station. The outer end of the support 200 is canted slightly inward toward the lifting mechanisms 190 relative to the inner end, so that the subpurlin end of the assembled roof panel structures A crowd or lead toward the lifting mechanisms 190. This feature maintains the assembled roof panel structure A against the rollers 192, and helps to maintain the alignment of the assembled roof panel structure through the exit station 112.

The Forklift Tines

Figure 10:
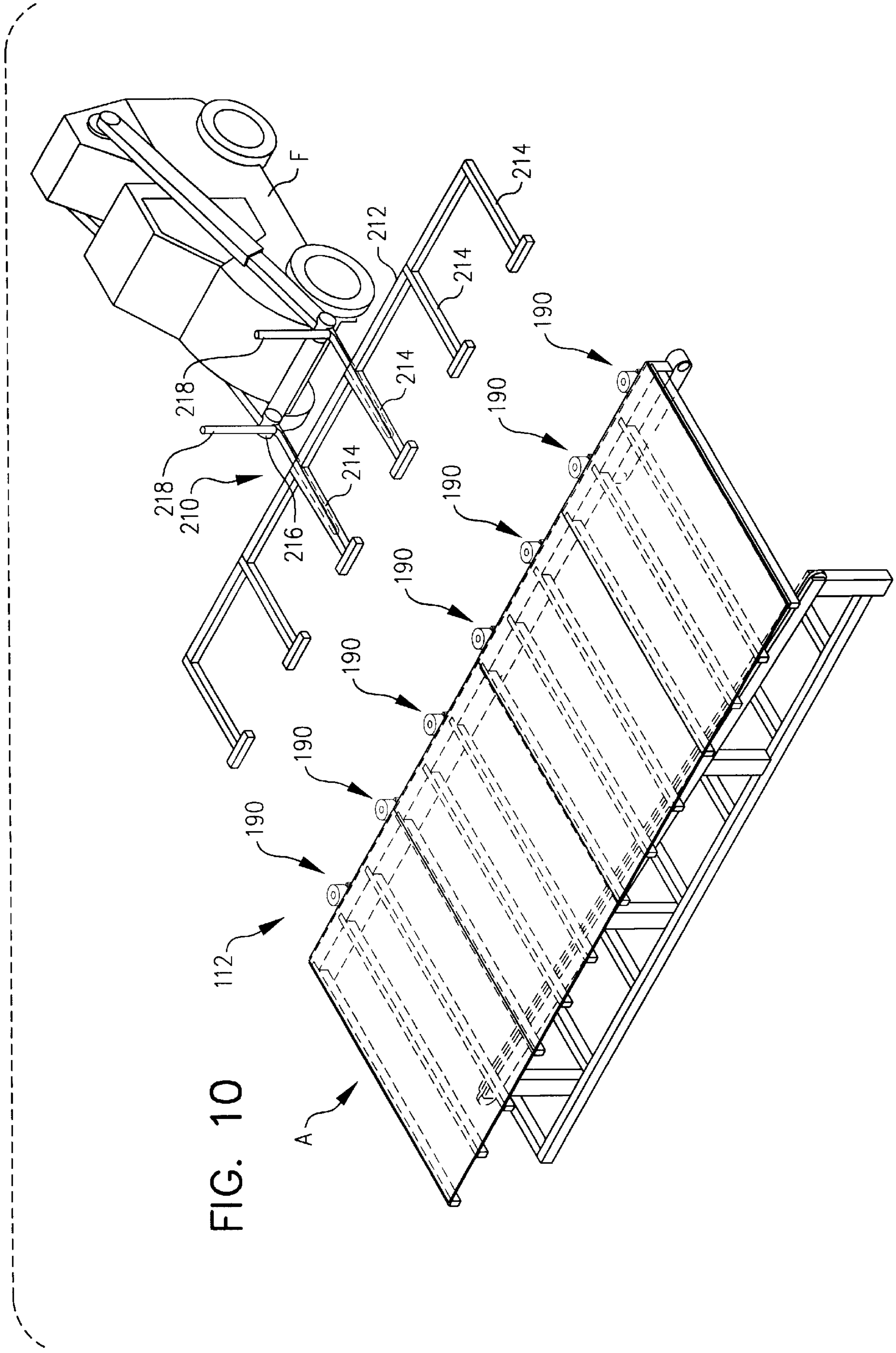
FIG. 10 is a side perspective view of a roof panel structure in the exit station of FIG. 8, with a forklift shown preparing to remove the roof panel structure from the exit station.

In accordance with one aspect of the present invention, a novel set of forklift tines 210 (FIG. 10) is provided for removing the assembled roof panel structure A from the exit station 112. The forklift tines 210 include an elongate bar 212 extending orthogonally to the forklift F. A series of T-bars 214 extend orthogonally from the elongate bar 212. The T-bars 214 are attached at their base to the elongate bar 212 such that the top of the T-bars 214 is spaced from the elongate bar. The T-bars 214 are spaced from each other the same as the lifting mechanisms 190, and the length of the top of the T-bars 214 is less than the spacing between the lifting mechanisms 190.

The forklift tines 210 are rotatably mounted to the forklift, for example, about an axle 216. This rotational mounting permits the tines 210 to be rotated upward relative to the arms of the forklift F. Vertical bars 218 extend upward from the axles 216.

The use of the forklift tines 210 is shown in FIGS. 10–13. After an assembled roof panel structure A is complete, a forklift F having the forklift tines 210 mounted thereon is driven toward the exit station 112, and the T-bars 214 are aligned between the lifting mechanisms 190 and under the assembled roof panel structure A. The T-bars 214 are inserted until the elongate bar 212 is adjacent the lifting mechanisms 190. The tines 210 are then rotated about the axle 216, and the arms of the forklift F are raised such as to remove the assembled roof panel structure from the exit station 112. The assembled roof panel structure A may then be rotated about the axle 216 and lifted by the arms of the forklift F as appropriate so as to place the roof panel structure in position for installation. The roof panel structure A may at this point be resting against the vertical bars 218.

The Subpurlin Feeders

Figure 14:
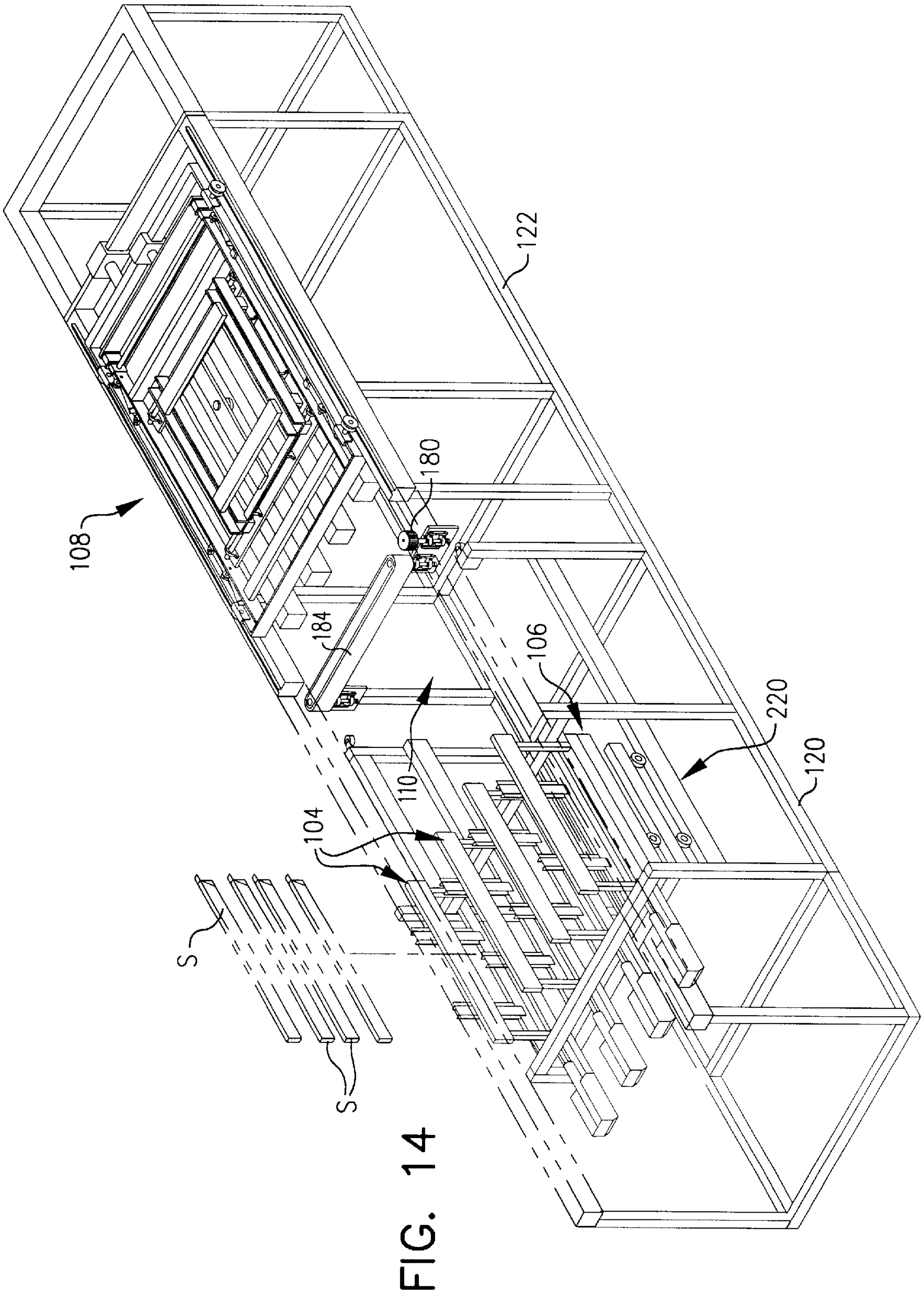
FIG. 14 is a side perspective view of a subpurlin station and a diaphragm station for the roof panel structure assembly mechanism of FIG. 1.
Figure 15:
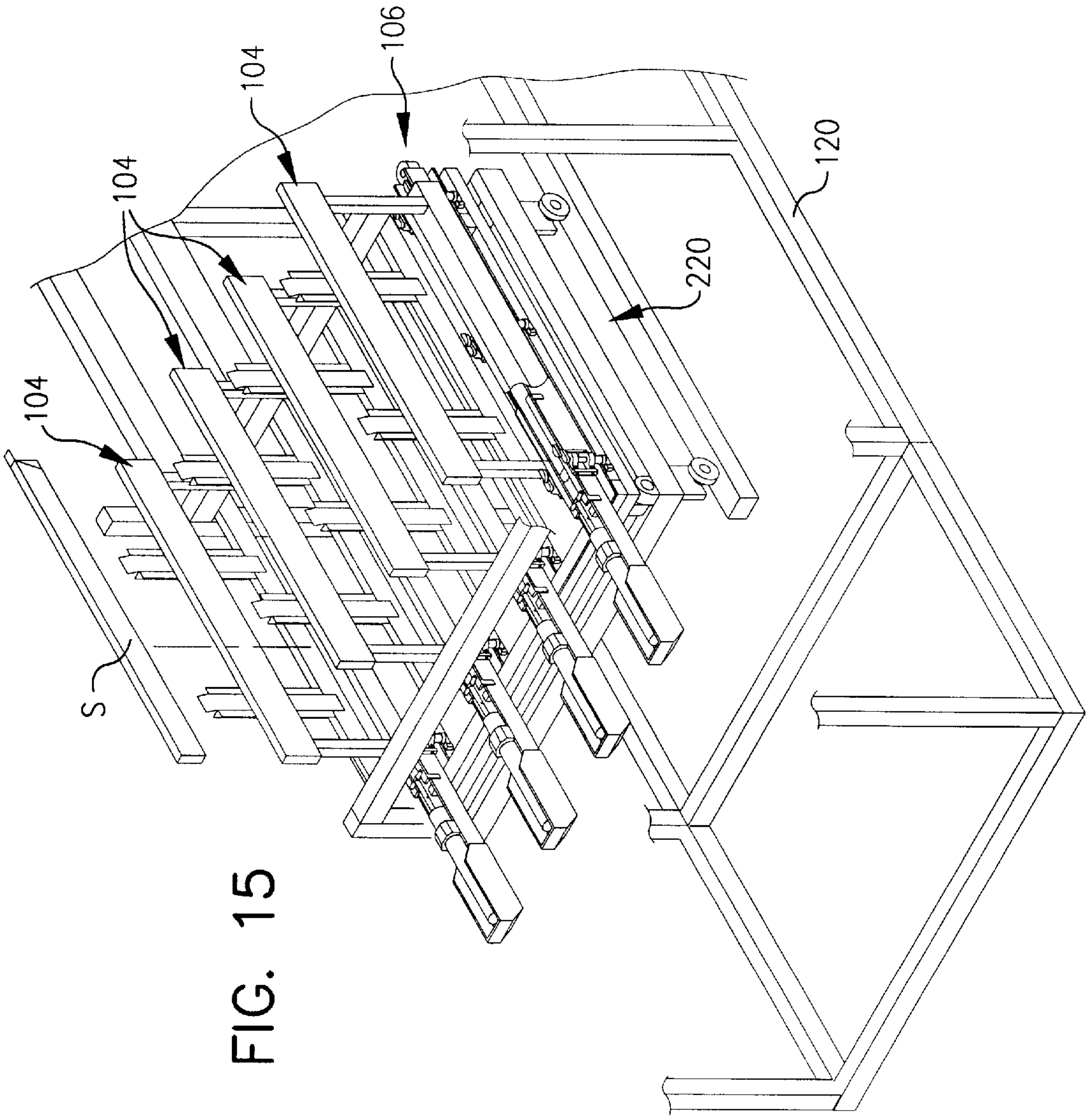
FIG. 15 is a side perspective view showing a portion of the subpurlin station of FIG. 14.

FIG. 14 shows the subpurlin frame 120 and the diaphragm frame 122, with the purlin frame 124 and the exit station 112 removed for detail. FIG. 15 shows a detail view of a rear portion of the subpurlin clamping mechanisms 106 and the subpurlin feeders 104. In summary, as described above, the subpurlin feeders 104 are configured and arranged to deposit subpurlins S into the subpurlin clamping mechanisms 106. The subpurlin clamping mechanisms 106 then advance into the assembly station 110, with the subpurlins S therein, so that the subpurlins may be aligned with and attached to the purlin P and the diaphragms D. To this end, the subpurlin clamping mechanisms 106 are mounted on a subpurlin carriage 220, shown in FIG. 15. The operation and structure of the subpurlin carriage 220 and the subpurlin clamping mechanisms 106 are further described below.

The subpurlin feeder 104 may be any structure that is arranged and configured to deposit subpurlins S into the subpurlin clamping mechanisms 106. In one example shown in the drawings, each subpurlin feeder 104 is a magazine that is designed to hold a plurality of subpurlins S, and to drop one subpurlin into an empty subpurlin clamping mechanism 106.

Figure 16:
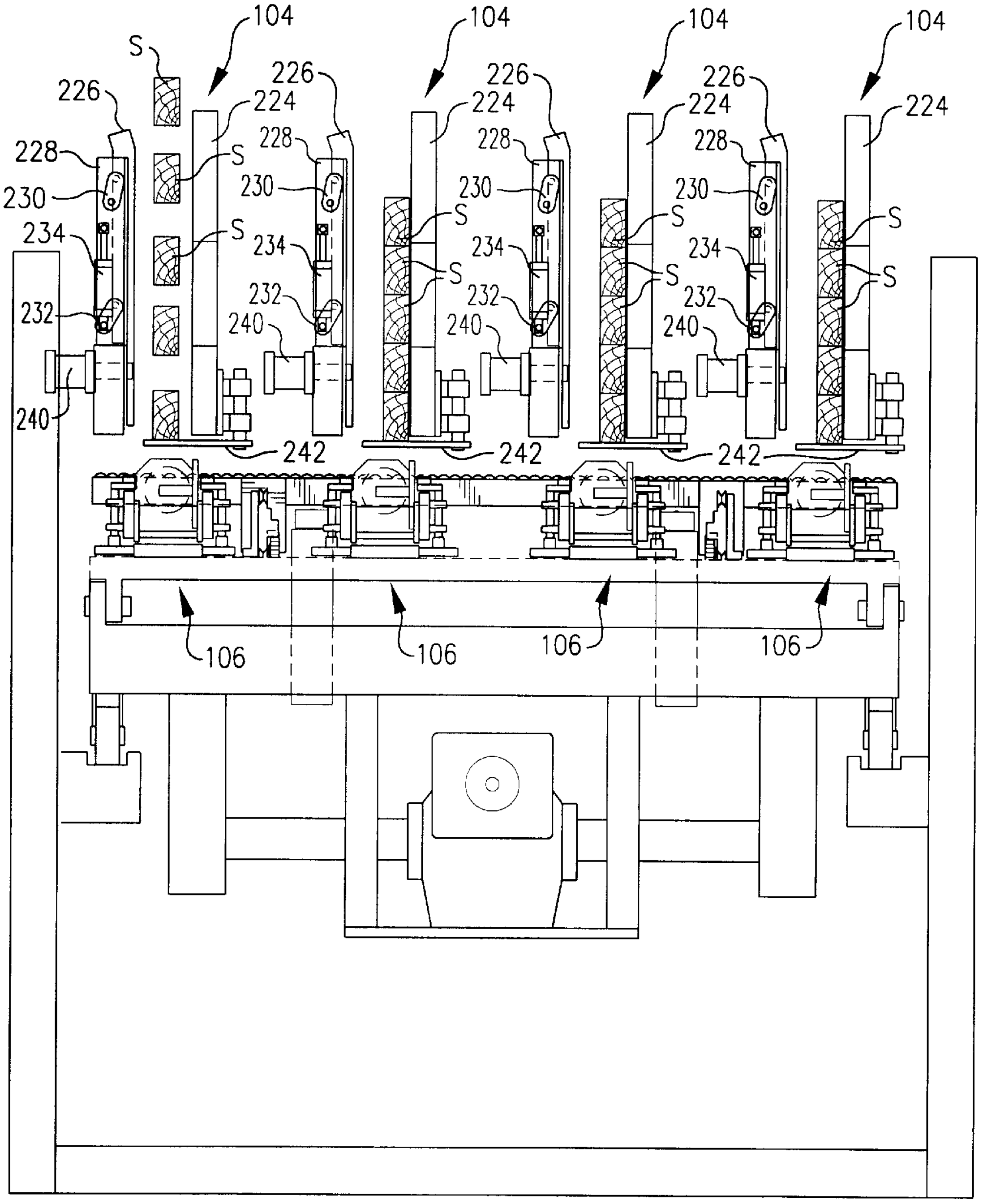
FIG. 16 is a rear view of the subpurlin station FIG. 15.

A rear view of the subpurlin feeders 104 is shown in FIG. 16. Each of the subpurlin feeders 104 includes a vertical wall 224 that is fixed in position. An adjustable vertical wall or bracket 226 extends parallel to the fixed vertical wall 224. Each of these walls 224, 226 may extend along the length of the subpurlin frame 120 or any portion thereof, but the walls are preferably arranged to maintain subpurlins S therebetween, arranged in the direction of the assembly station 110.

Figure 17:
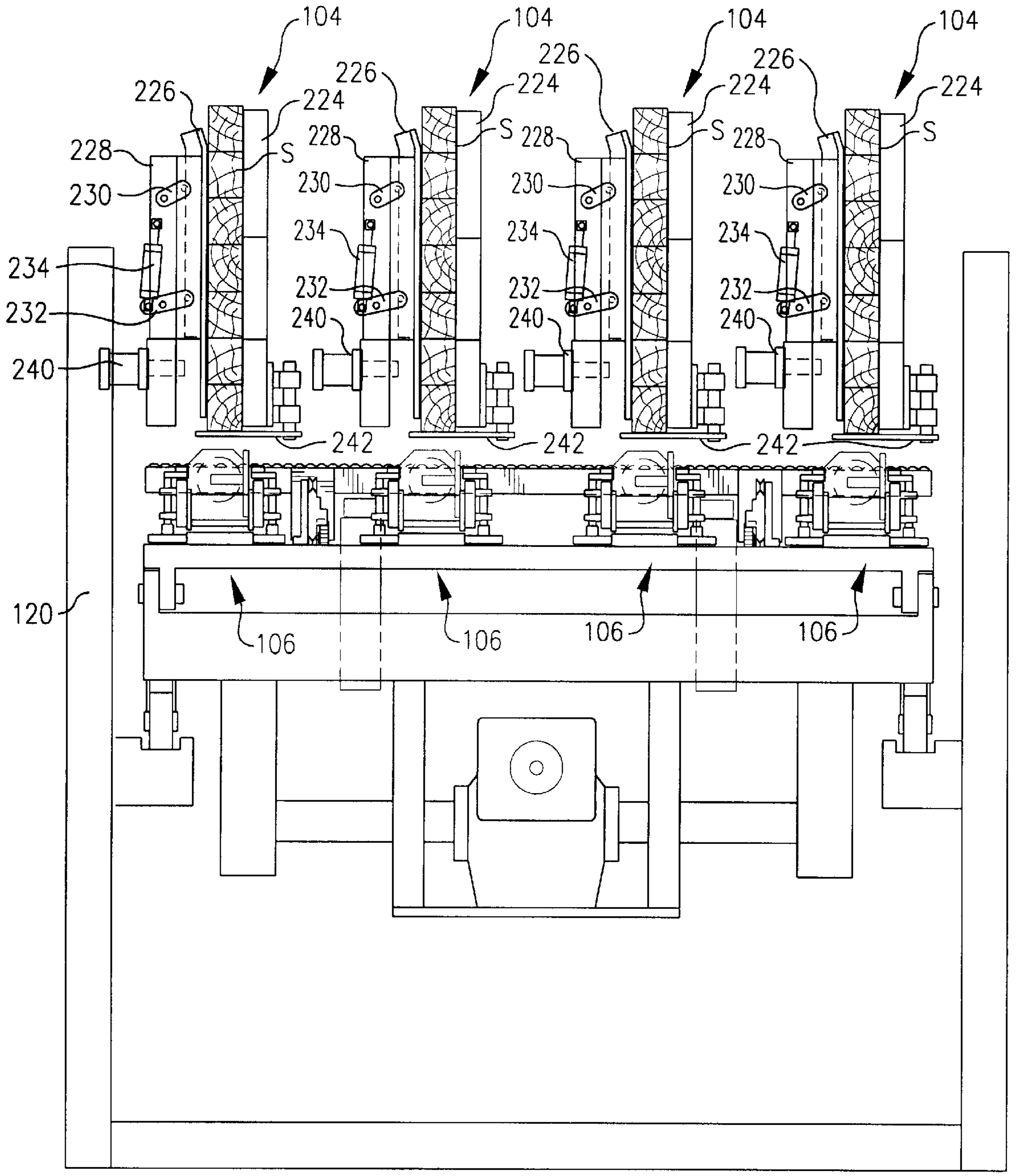
FIG. 17 is a rear view of the subpurlin station FIG. 15, similar to FIG. 16, with subpurlin feeders being closed against subpurlins in the subpurlin feeders.

The adjustable vertical wall 226 is rotatably attached to a fixed frame 228 by a pair of lever arms 230, 232. As can be seen in FIG. 17, one of the lever arms 232 includes a cylinder 234 eccentrically mounted thereon. The opposite end of the cylinder 234 is attached to the frame 228. Extending the cylinder 234 causes the two lever arms 232, 230 to rotate, pushing the adjustable wall 226 outward relative to the frame 228 and toward the fixed vertical wall 224.

The adjustable vertical wall 226 and its movement permit the spacing between the adjustable vertical wall 226 and the fixed vertical wall 224 to be adjusted to various different thicknesses of subpurlins S. As such, the two walls 226, 224 may be appropriately spaced so that subpurlins can be stacked edge to edge within and between the two walls, without permitting the subpurlins S to rotate or bind between the two walls.

The subpurlin feeders 104 may be sized to hold an appropriate amount of subpurlins S, given space constraints and the desire of the manufacturer. The subpurlins S may be manually fed into the subpurlin feeders 104, or some type of automated input of the subpurlins S may be provided. The subpurlin feeder 104 may include sensors (not shown) for determining that the subpurlins need to be replenished in the subpurlin feeder. These sensors may be provided, for example, by eye sensors, contact sensors, or weight sensors.

The spacing between the walls 224, 226 may be set according to the subpurlins S that are located in the subpurlin feeders 104. The spacing between the two walls 226, 224 may be set, for example, by the computer 128 in response to operator input, may be manually set by an operator, or may be automatically set based upon a sensing of the width of the subpurlins S. In general, however, the spacing is slightly more than the width of the subpurlins S, e.g., two inches for 2×6's, and so forth.

Figure 19:
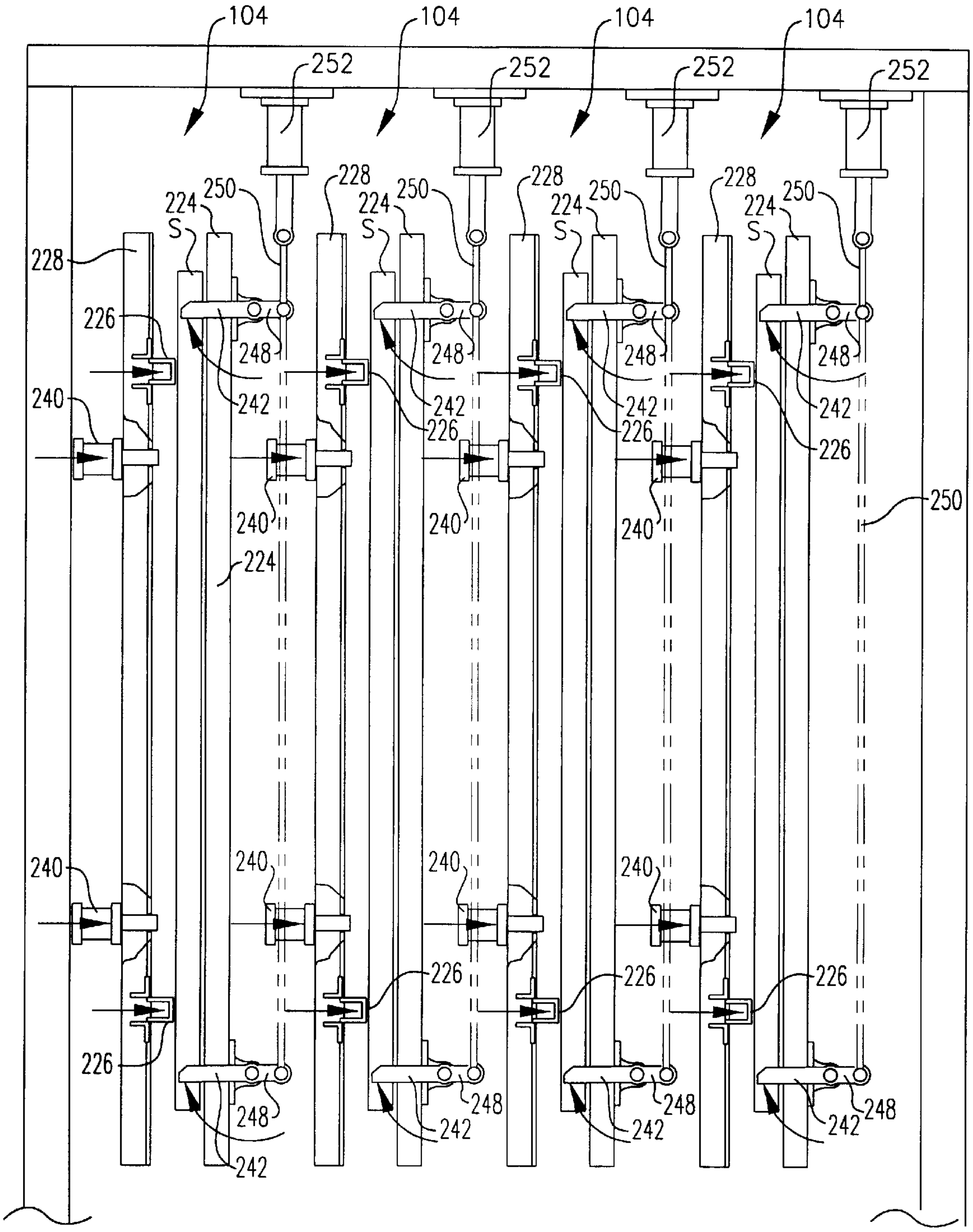
FIG. 19 is a bottom view of the subpurlin feeders of FIG. 17.

A plunger 240 is mounted on the frame 228 so that it aligns with the second from the bottom, or penultimate subpurlin S. In the embodiment shown in the drawings, there are two of these plungers 240 per subpurlin feeder 104 (FIG. 19).

Figure 18:
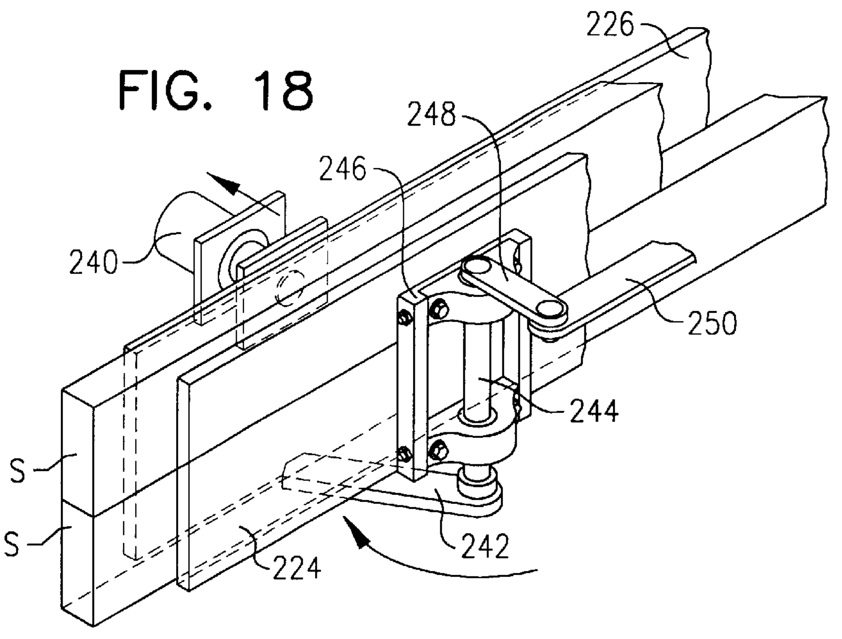
FIG. 18 is a side perspective detail view of a release mechanism for the subpurlin feeders of FIG. 17.

In addition, a swivel-mounted support arm 242 is attached for rotation adjacent to the bottom of the fixed vertical wall 224. As can be seen in FIG. 18, the support arm 242 is fixed to rotate with a rod 244 that extends through a bracket 246 on the fixed vertical wall 224. A pivot arm 248 is attached for rotation with the rod 244 and extends outwardly from the top of the rod. The pivot arm 248 is attached to a lever arm 250. The lever arm 250 attaches to a similar pivot arm 248 on another end of the purlin feeder 104, as can be seen in FIG. 19.

Figure 20:
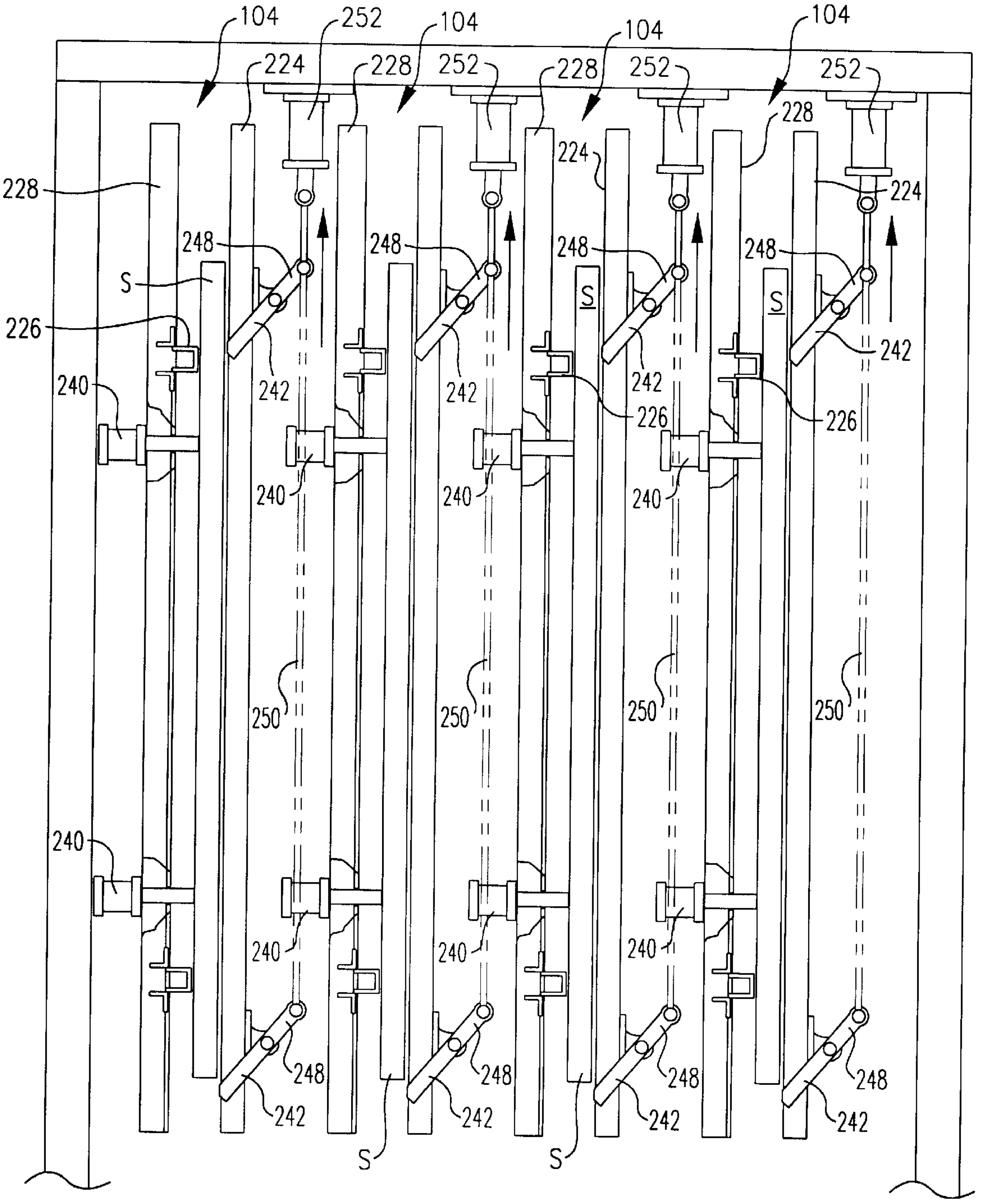
FIG. 20 is a bottom view of the subpurlin feeders of FIG. 17, similar to FIG. 19, with arms of the subpurlin feeders open so that bottom subpurlins may be released.
Figure 21:
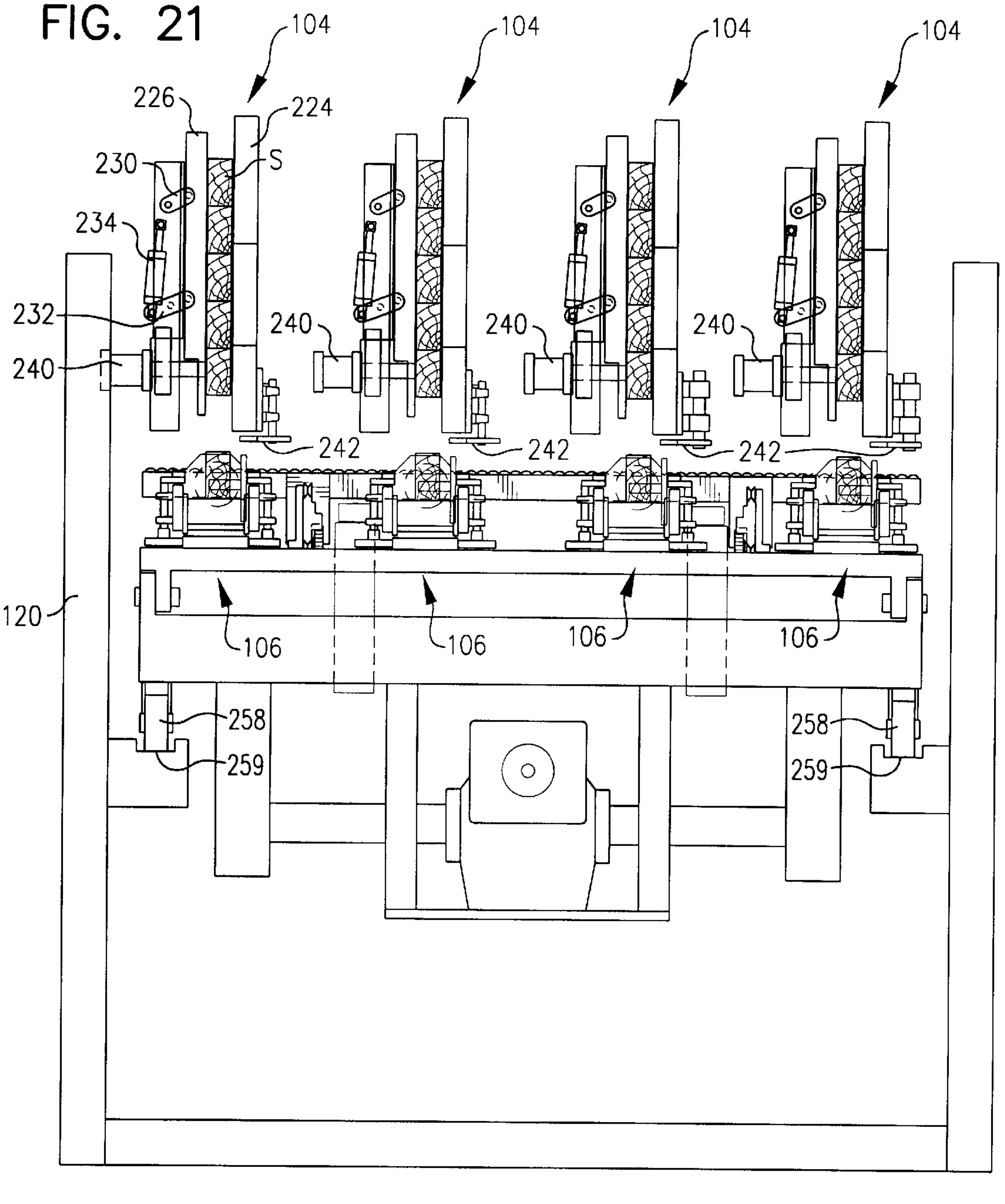
FIG. 21 is a rear view, similar to FIG. 17, showing the bottom subpurlins dropped from the subpurlin feeder and into subpurlin clamping mechanisms.
Figure 22:
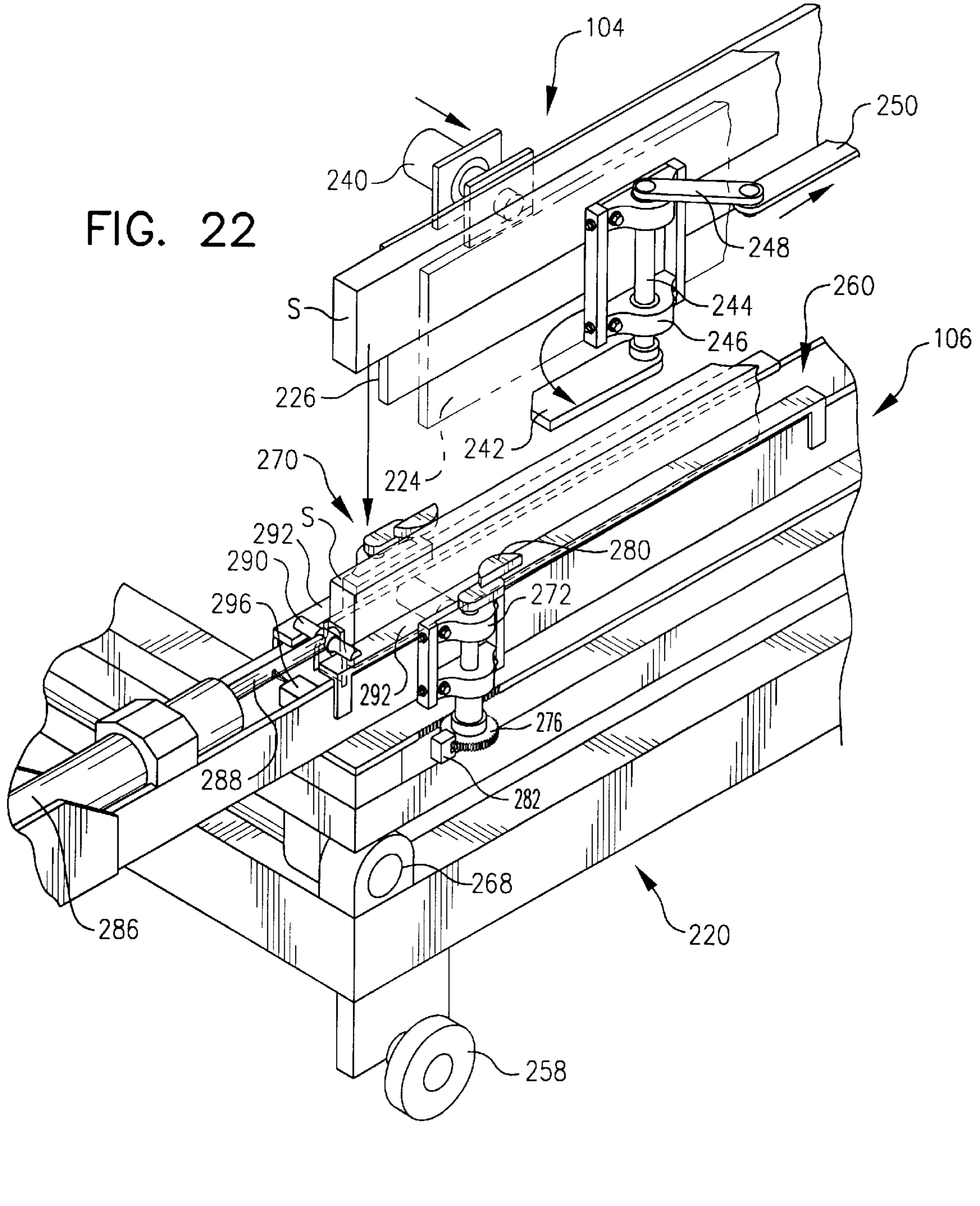
FIG. 22 is a side perspective detail view of the bottom subpurlins being dropped as in FIG. 21.

A plunger 252 (FIG. 19) is attached to an end of the lever arm 250. Operation of the plunger 252 causes the lever arm 250 to retract which, in turn, causes the pivot arm 248 to rotate, rotating the support arm 242. Rotation of the arms is shown in FIG. 20. As the support arms 242 rotate, they move out of the way of the bottom subpurlin S, permitting the bottom subpurlin to fall into the subpurlin clamping mechanism 106. A subpurlin S that has dropped into the clamping mechanism 106 is shown in FIGS. 21 and 22. The subpurlins S may alternatively be dropped or placed in the subpurlin clamping mechanisms 106 in different ways.

Before the lever arm 250 is used to rotate the support arms 242, the plungers 240 are extended to hold the penultimate subpurlin S in place. The plungers 240 continue to hold the penultimate subpurlin S during rotation of the support arms 242. In this manner, the penultimate subpurlin S and all subpurlins above the penultimate subpurlin are supported as the bottom subpurlin drops. After the lower subpurlin S has been dropped, the plunger 252 extends, causing the support arms 242 to align back under the stack of subpurlins S. The plungers 240 then retract, allowing the penultimate subpurlin and the subpurlins S above the penultimate subpurlins to drop into place. The purlin feeder 104 is then ready for dropping of the next subpurlin S.

The Subpurlin Clamping Mechanisms

Figure 23:
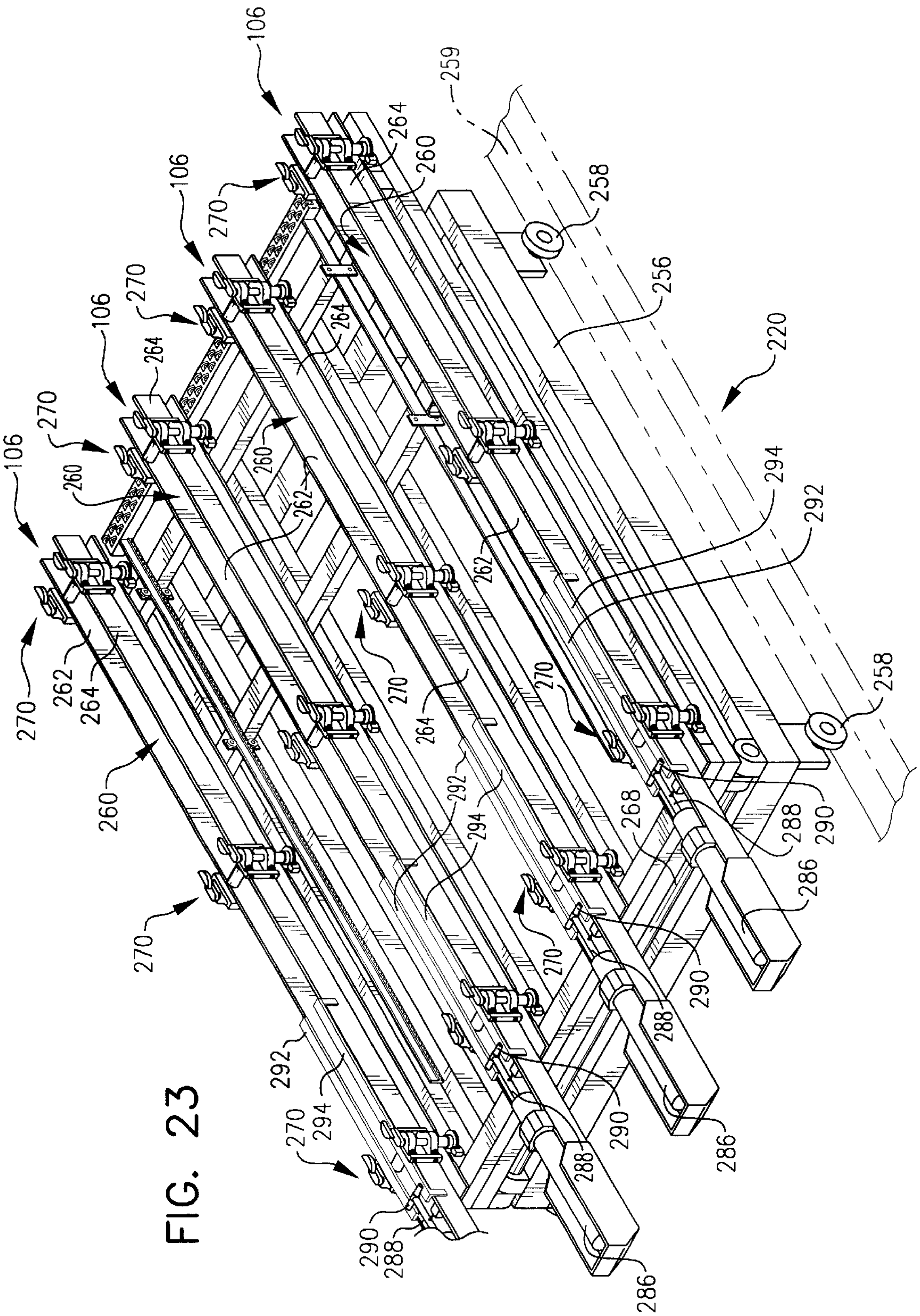
FIG. 23 is a side perspective view of a subpurlin carriage for the subpurlin clamping mechanisms of FIG. 21.

As stated above, the subpurlin clamping mechanisms 106 are mounted on a subpurlin carriage 220. The carriage 220 includes a carriage frame 256 having wheels 258 (FIG. 23). In operation, subpurlins S are provided to the subpurlin clamping mechanisms 106 by the subpurlin feeders 104, and the subpurlin carriage 220 moves the subpurlin clamping mechanisms from the subpurlin feeders to the assembly station 110. During this movement, the subpurlin carriage wheels 258 roll along rails 259. The movements of the subpurlin carriage 220 and its components may be operated by absolute feedback motors, such as absolute feedback servo motors. As such, the location of the components of the subpurlin carriage and the speeds of the operation may be easily altered by the computer 128 or by a programmer or operator via the computer 128, or may, for example, be moved precisely to a location based upon input from sensors or the computer.

Figure 24:
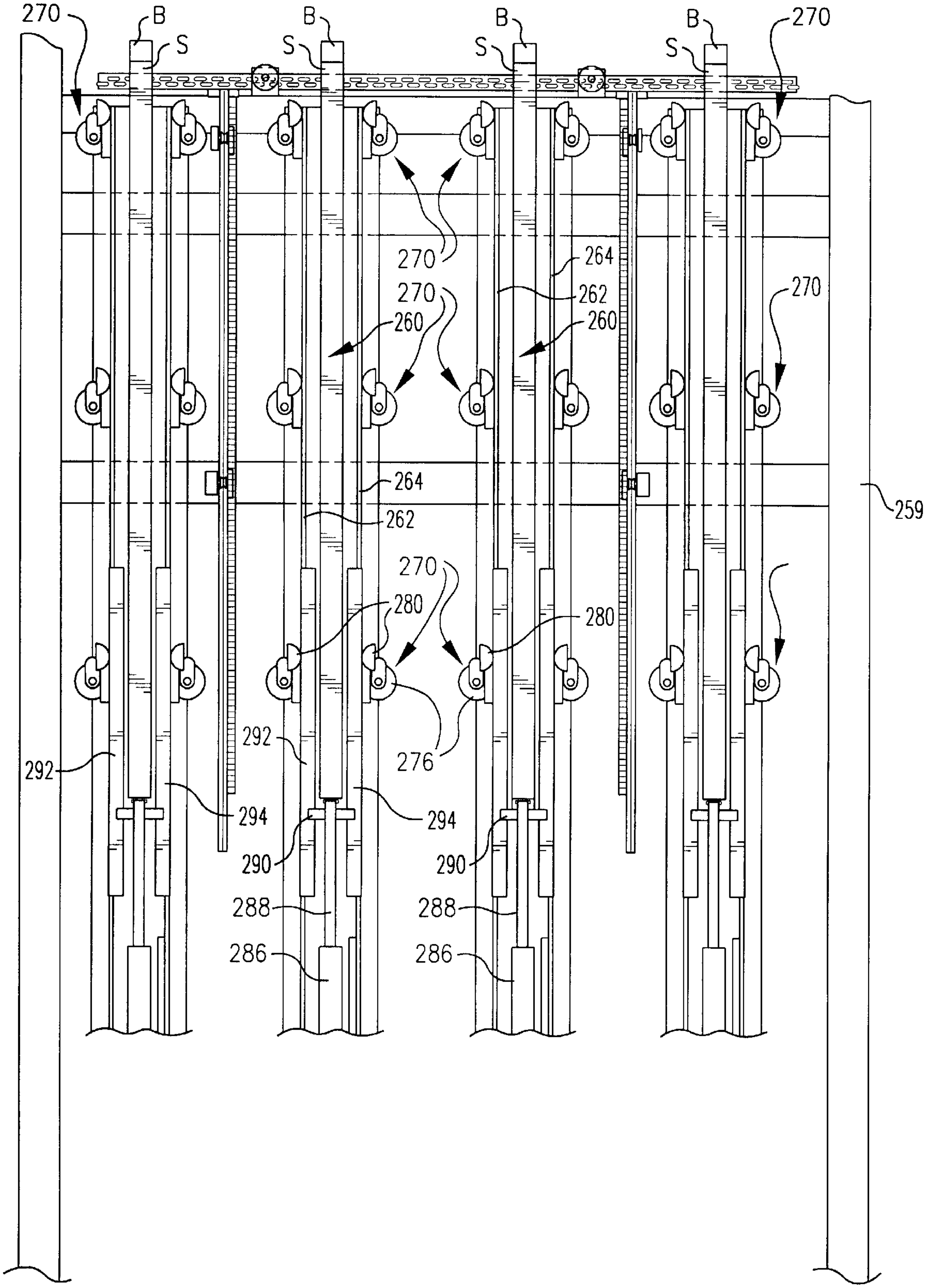
FIG. 24 is a top view of the subpurlin clamping mechanisms of FIG. 23.

Details of the subpurlin clamping mechanisms 106 can be seen in FIGS. 23 and 24. The subpurlin clamping mechanisms 106 include slots 260 for receiving the subpurlins S. The slots 260 include left rails 262 and right rails 264. These rails 262, 264 are mounted on a clamping mechanism frame 266. The clamping mechanism frame 266 is pivotally mounted to the carriage frame 256, for example via a pivot rod 268. The pivot rod 268 is shown in FIGS. 22 and 23, and the function of the clamping mechanism frame 266 pivoting relative to the carriage frame 256 is described below.

Mounted along the length of the subpurlin clamping mechanisms 106 are a number of clamping, or pinching mechanisms 270. In the embodiment shown, the number of pinching mechanisms 270 per subpurlin clamping mechanism 106 is three, but this number may be varied. The pinching mechanisms 270 are configured to center the subpurlins S in the subpurlin clamping mechanisms 106, and to hold the subpurlins in position once centered. In addition, as further described below, the pinching mechanisms 270 include sensors that detect the thickness of the subpurlins in the subpurlins clamping mechanisms 106.

Figure 25:
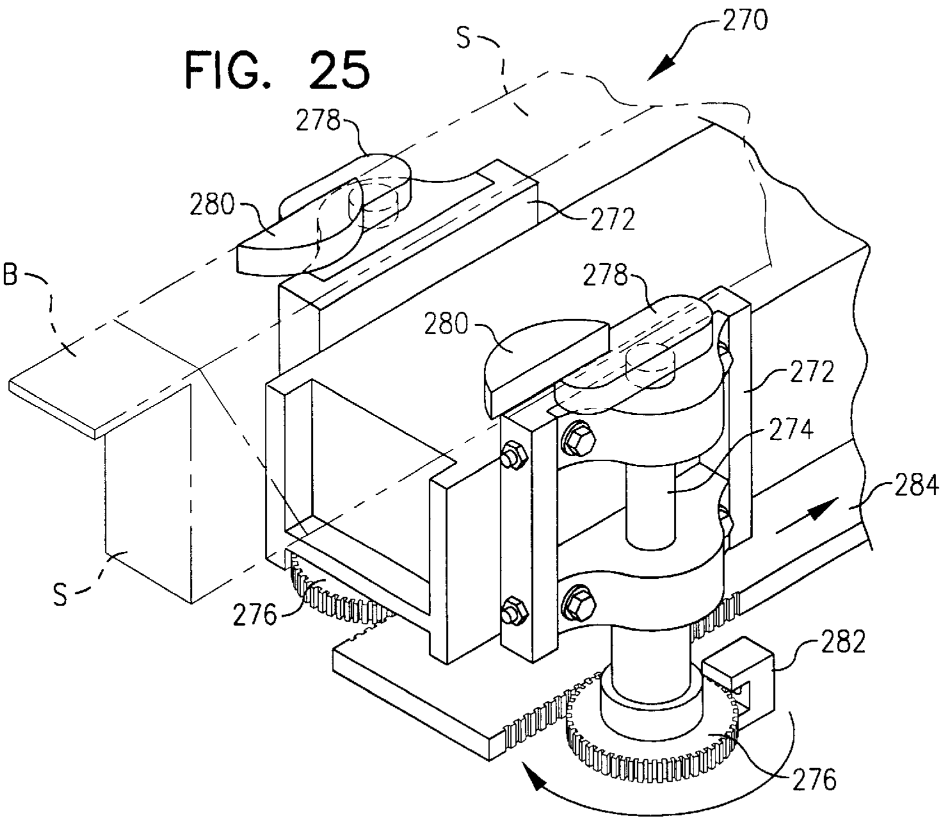
FIG. 25 is a side perspective detail view of a pinching mechanism for use in the subpurlin clamping mechanisms of FIG. 23.
Figure 26:
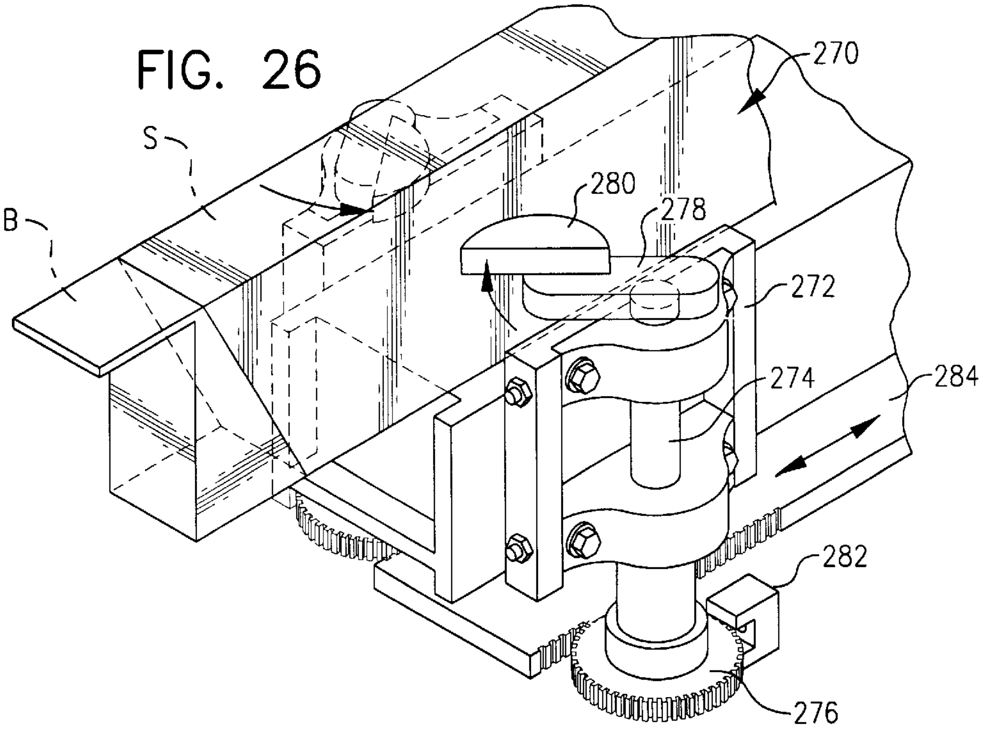
FIG. 26 is a side perspective view of a pinching mechanism for use in the subpurlin clamping mechanisms of FIG. 23, similar to FIG. 25, showing the pinching mechanisms closed.

Details of one of the pinching mechanisms 270 are shown in FIGS. 25 and 26. The pinching mechanisms 270 include two different sides that are mirror images of one another. For simplicity, only one side is described.

The pinching mechanisms 270 include a bracket 272 mounted on the outside of the slots 260. A rod 274 is rotatably mounted in the bracket 272. A toothed gear 276 is mounted for rotation with the rod 274 at a bottom end of the rod. An eccentrically mounted arm 278 is mounted on the top end of the rod, also for rotation with the rod 274. A half-circular contact 280 is mounted on the end of the eccentrically mounted arm 278.

A counter-type sensor 282 is mounted on the outside of the toothed gear 276, and is arranged and configured to index a unit as each tooth of the gear 276 passes through the sensor. The sensor 282 is located on only one side of the pinching mechanism 270. A bar 284 having teeth along its outer edges engages the toothed gear 276 on each side of the pinching mechanism 270.

In operation, the bar 284 is extended (e.g., by a cylinder, not shown) after a subpurlin S has dropped into the slot 260. This extension causes the toothed gears 276 to rotate, forcing the half-circular contacts 280 inward. The contacts 280 engage and maintain the subpurlin S in the center of the slot 260. In addition, the counter/sensor 282 provides real-time information to the computer 128 regarding the amount that the gears 276 on at least one side of the pinching mechanism 270 have rotated, and therefore the width of the subpurlin S may be confirmed or detected.

The subpurlin clamping mechanisms 106 each include a cylinder 286 at the trailing end. The cylinders 286 include a rod 288 having a T-bar 290 mounted at a distal end. The outer edges of the T-bar 290 engage left and right tracks 292, 294. A sensor/counter 296 is mounted along one side of the rod 288.

During operation, after a subpurlin S has been inserted into the slot 260, and the pinching mechanisms 270 have closed around the subpurlin, the carriage 220 moves into the assembly station 110. At the end of this movement, the cylinders 286 drive the subpurlin S against the purlin P, as further described below. The T-bar 290 engages the tracks 292, 294, preventing the rod 288 from rotating, thus providing an accurate reading for the sensor 296, and preventing the subpurlins from being twisted out of the subpurlin clamping mechanisms 106.

At the front end of the subpurlin carriage 220 is mounted a pair of push bars 300. Each of the push bars 300 includes a roller 302 mounted at its top, with a vertical axis of rotation. A bolt 304 extends through the bottom of the push bar and attaches the push bar to the clamping mechanism frame 266 or the carriage frame 256. A spring 306 is mounted on the bolt and biases the bolt and the push bar 300 into an upright position. A stop 308 and a pair of second bolts 310 operate to maintain the position of the push bar 300 in the upright position, along with the spring 306 and the bolt 304.

During operation, as the subpurlin carriage 220 is extended forward, the roller 302 engages the purlin P, and the push bar 300 rotates backward around the second bolts 310 and against the bias of the spring 306. As such, the push bar 300 helps to assure that the purlin P is pressed appropriately against the belt 184. Because the width of the purlin P is known, the subpurlin carriage 220 may be stopped at the appropriate location by the use of the absolute feedback servo motor that drives the subpurlin carriage. As an example, the subpurlin carriage 220 may stop at a location where the push bar 300 is bent backward approximately ¼ inch.

Figure 27:
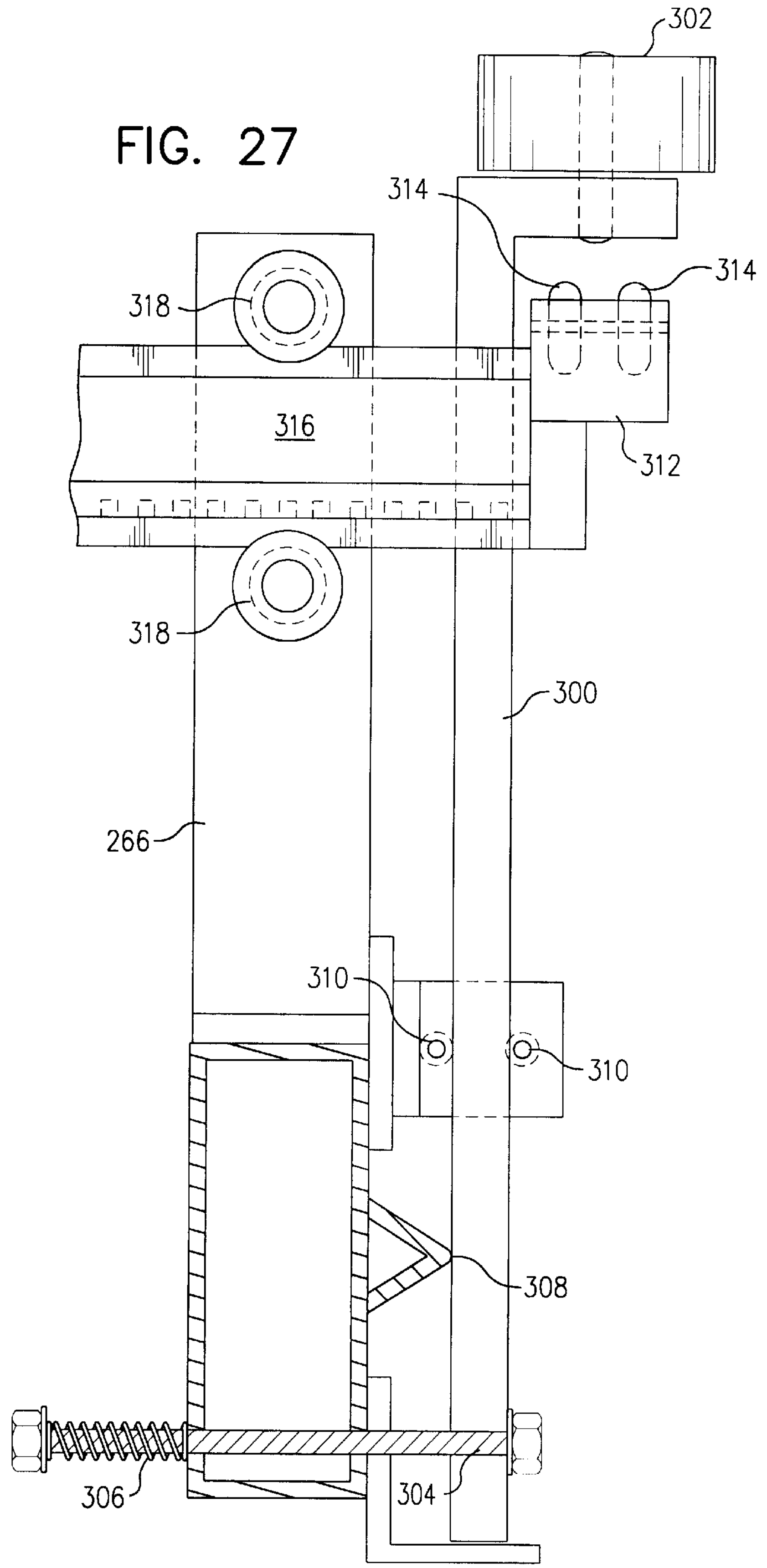
FIG. 27 is a side view of a push bar system for use on the leading end of the subpurlin carriage of FIG. 23.
Figure 28:
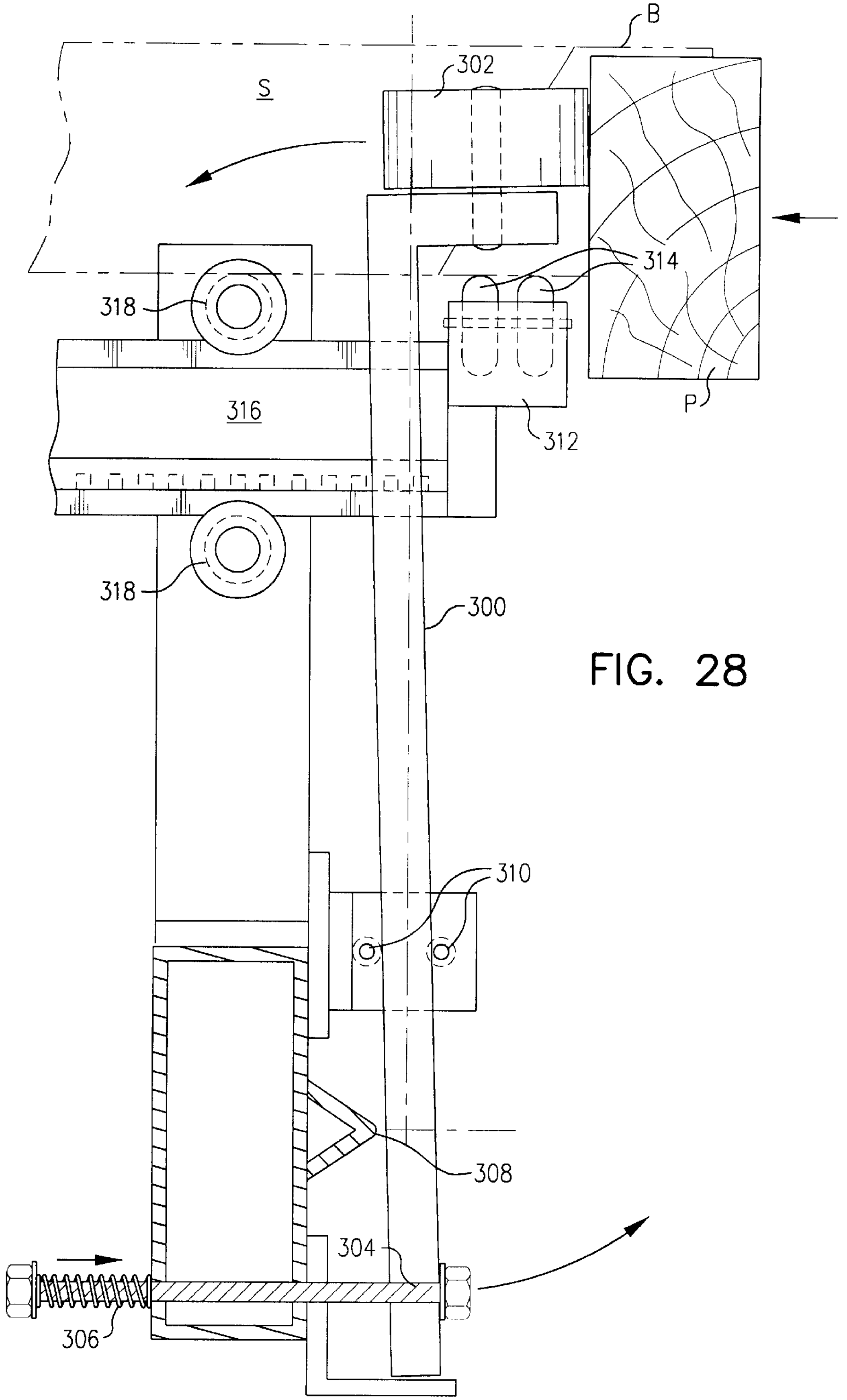
FIG. 28 is a side view, similar to FIG. 27, showing the push bar engaging a purlin.
Figure 29:
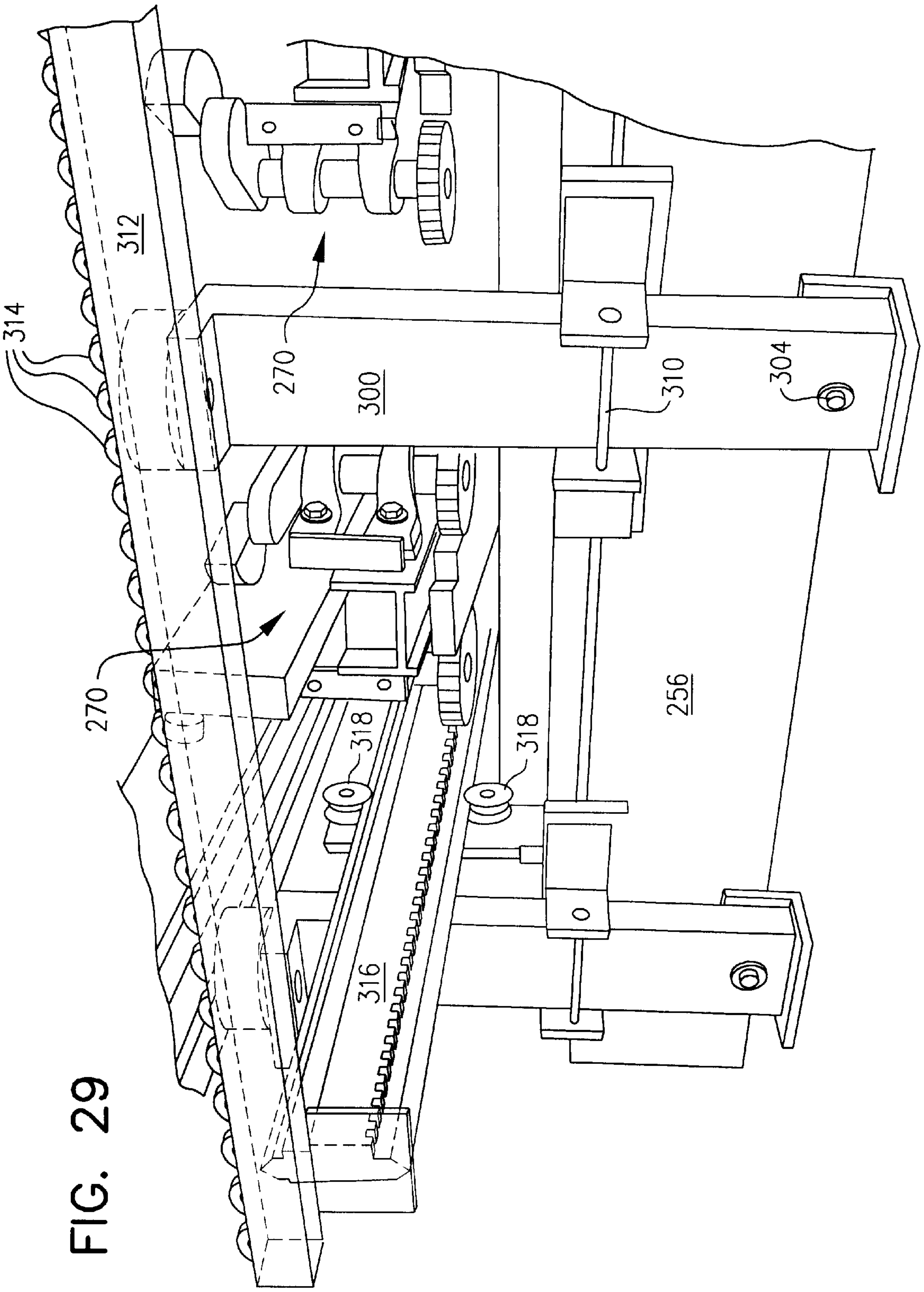
FIG. 29 is a side perspective view of a front end of the subpurlin carriage.
Figure 31:
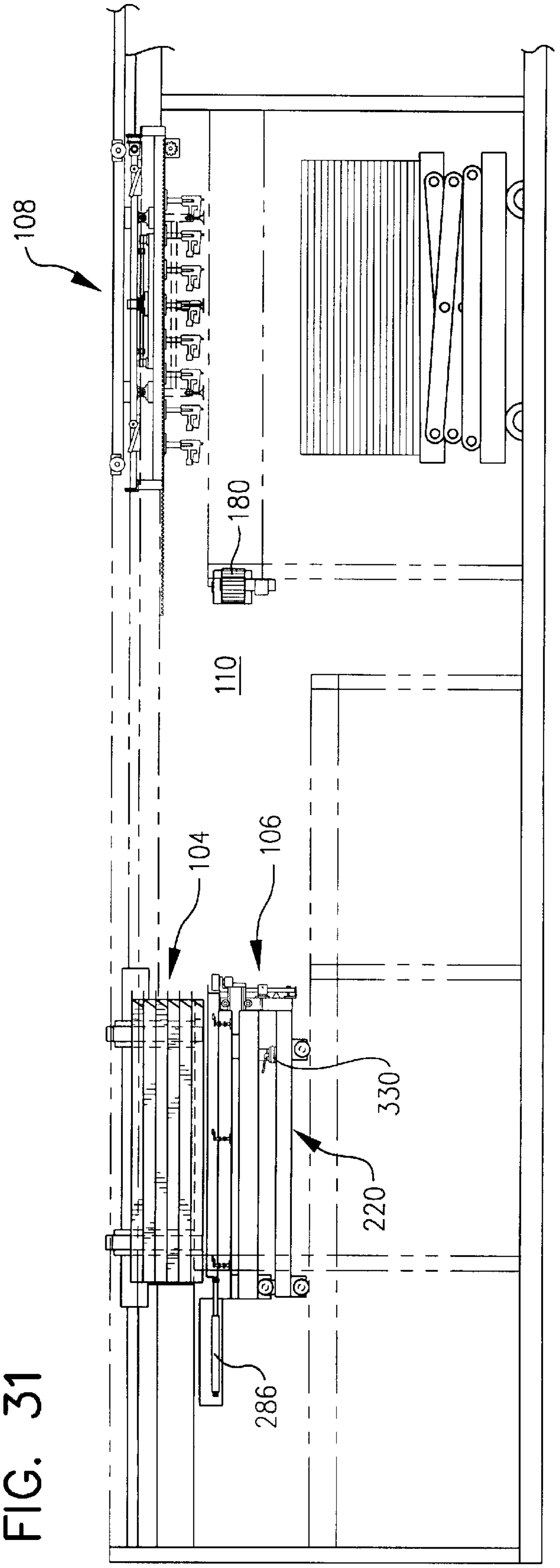
FIG. 31 is a diagrammatic side view showing the subpurlin carriage positioned below the subpurlin feeders.
Figure 32:
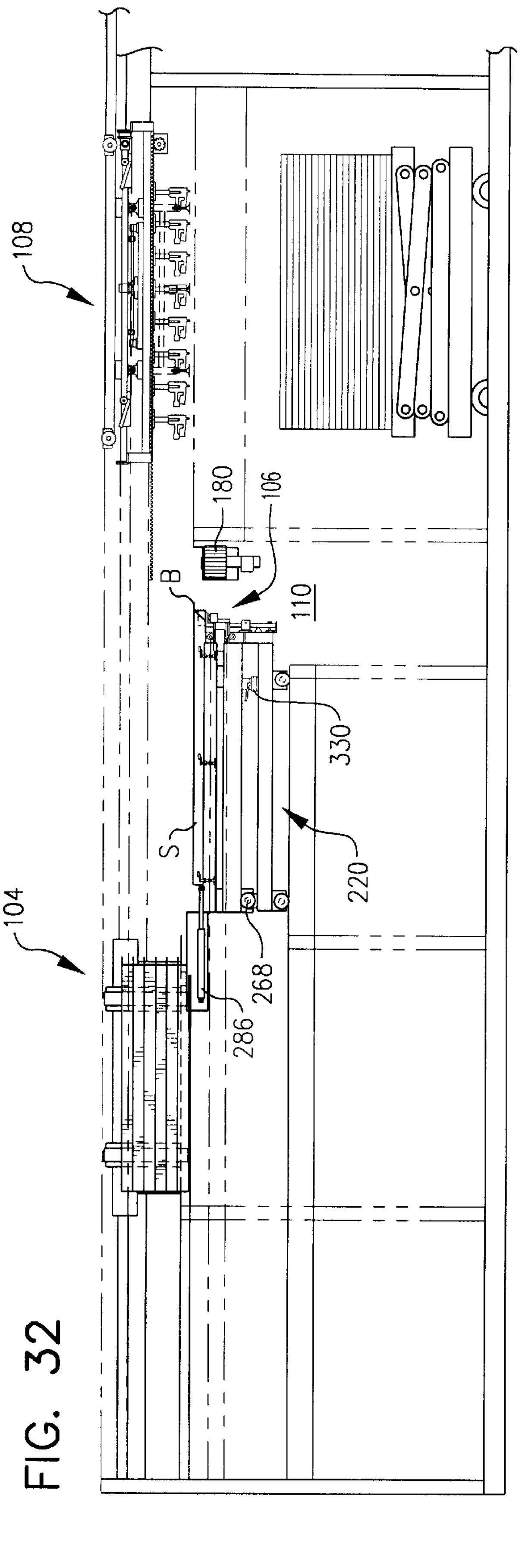
FIG. 32 is a diagrammatic side view, similar to FIG. 31, showing the subpurlin carriage advancing into an assembly station.

The subpurlin carriage 220 includes an assembly support 312, shown in FIGS. 27, 28 and 29. The assembly support 312 includes rollers 314 along its top edge, and is mounted on a pair of extension bars 316. The extension bars 316 are mounted between two pinch rollers 318 so that the extension bars 316 may extend outward and forward relative to the subpurlin carriage 220. The extension bars 316 include teeth along a lower surface for engaging a gear 320, shown schematically in FIG. 30.

Figure 30:
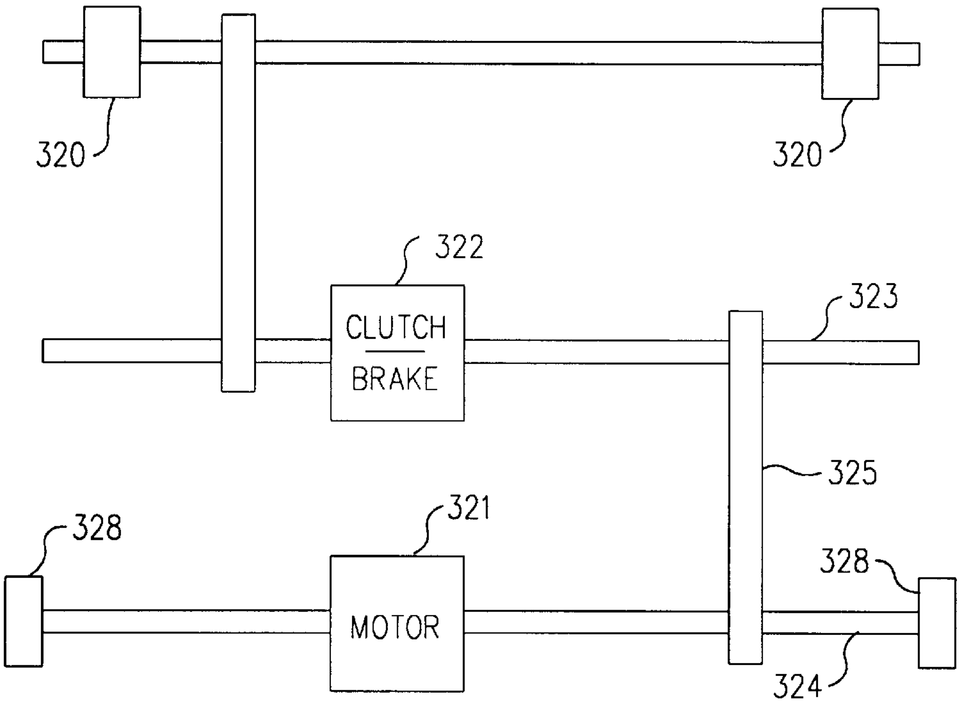
FIG. 30 is a diagrammatic view of a drive system for the subpurlin carriage.

As shown in FIG. 30, the gear 320 is attached, via a clutch 322, to the drive train 324 for the subpurlin carriage 220. The drive train 324 is connected to a motor 321, which drives gears 328 for extending the subpurlin carriage 220. The gears 328 may, for example, engage a gear rack (not shown) on the frame 120. The drive train 324 is linked to an intermediate axle 323 via a drive chain 325. The clutch 322 is arranged between the drive chain 325 and a second chain 326, which is connected to the axle 327 for the gears 320.

The gear ratio for the gear 320 is preferably the same as the ratio for the drive for the subpurlin carriage 220. However, the gear 320 is arranged to drive the assembly support 312 in the opposite direction of the subpurlin carriage 220, and the clutch 322 is operative to engage upon retraction of the subpurlin carriage 220. Thus, when the clutch 322 is engaged, the assembly support 312 moves outward relative to the subpurlin carriage 220 at a rate that is substantially equal to the rate in which the subpurlin carriage is moving rearwardly. Thus, during this movement, the assembly support 312 appears to be stationary as the subpurlin carriage 220 is moving rearward. When the assembly support 312 moves outward, it is positioned to support the subpurlin and diaphragm end of the assembled roof panel structure A, after the subpurlins S and diaphragm D have been attached, so that the assembled roof panel structure A may move into the exit station 112 by rolling on the rollers 314. The clutch 322 may also include a brake so that the assembly support may be stopped after extension.

The operation of the subpurlin clamping mechanisms 106, after subpurlins S have been installed in the subpurlins clamping mechanisms 106, is shown in FIGS. 31–38. Beginning at FIG. 31, the subpurlin feeders 104 drop subpurlins S into the subpurlin clamping mechanisms 106. Then, at FIG. 32, the subpurlin carriage 220 moves forward with the subpurlin clamping mechanisms 106, and toward the assembly station 110.

Figure 33:
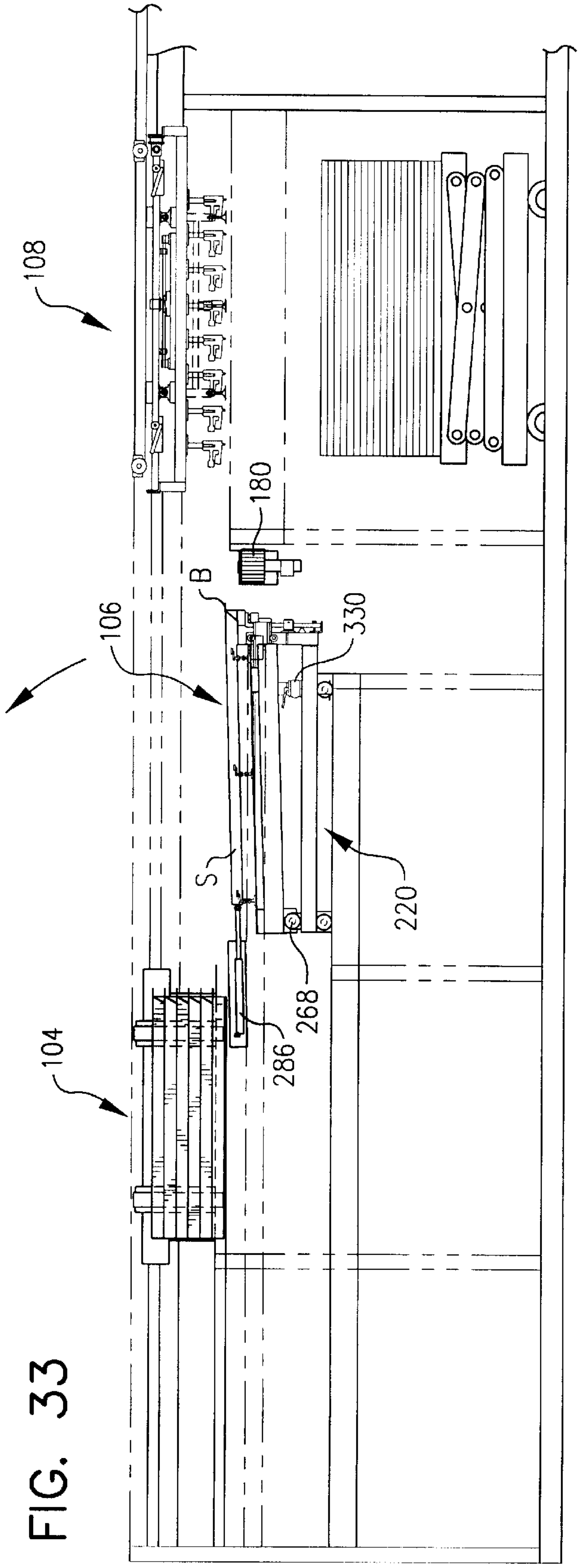
FIG. 33 is a diagrammatic side view, similar to FIG. 32, showing the subpurlin carriage further advanced into the assembly station.
Figure 34:
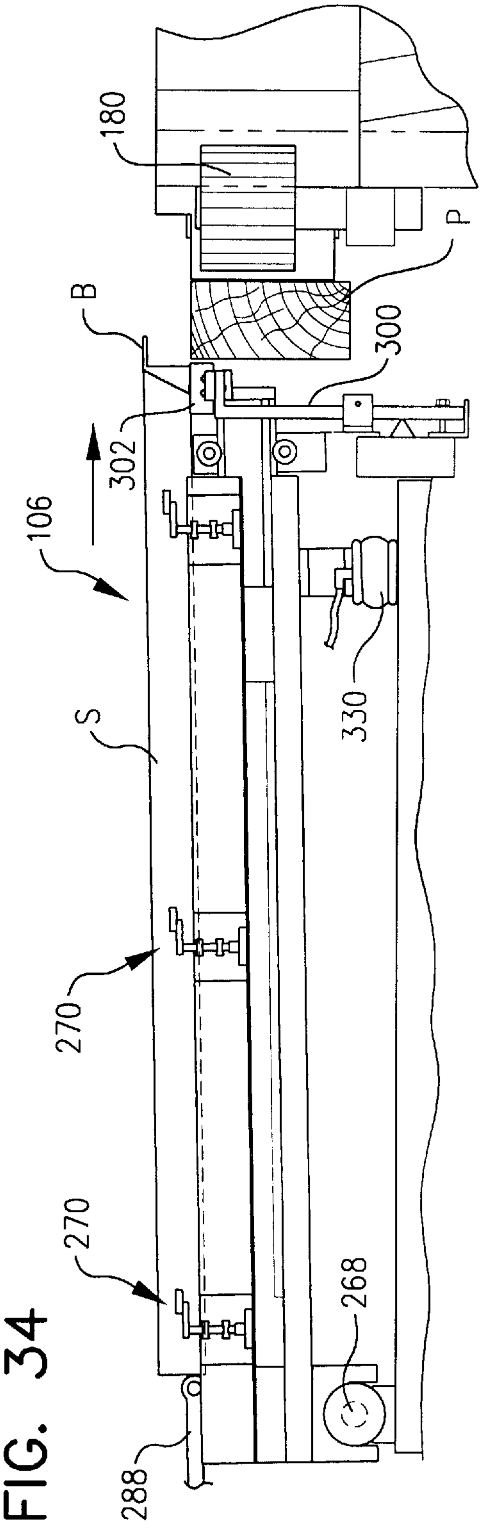
FIG. 34 is a side detail view showing the subpurlin carriage as it approaches a purlin in the assembly station, with a front end of the subpurlins lifted.

When the subpurlin carriage 220 enters the assembly station, a purlin P is already in place. If the brackets B are used for the subpurlin S, there is a possibility that the edge of the bracket may hit the subpurlin S. For this reason, in accordance with one aspect of the present invention, a lift is provided on the front edge of the clamping mechanism frame 266 for raising the front edge of the subpurlins S before they reach the purlin P. In the embodiment shown in the drawings, the lift is provided as an air bag or air bags 330. The air bags 330 may alternatively be air cylinders, mechanical lifts, or any other suitable device for lifting the front end of the subpurlins S. The air bags 330 fire as the subpurlin S approaches the purlin P, thereby lifting the bracket B to clear the top edge of the purlin. The beginning of this movement is shown in FIG. 33, and is shown in close detail in FIG. 34. In FIG. 33, the purlin P has been removed to show detail, but in FIG. 34 it is shown, demonstrating how lifting the front end of the subpurlins S causes the bracket B to clear over the top edge of the purlin P.

While the front end of the subpurlin S is lifted, the subpurlin carriage 220 continues to move toward the purlin P. In an exemplary embodiment, the air bags 330 fire during the movement of the subpurlin carriage 220, and thus its movement does not slow until slowed by slowing of the motor 321 that drives the subpurlin carriage 220 (i.e., when the subpurlin approaches the purlin). As the subpurlin S is adjacent the purlin P, the push bar 300 engages the purlin P, ensuring that the purlin is pushed against the belt 184.

Figure 35:
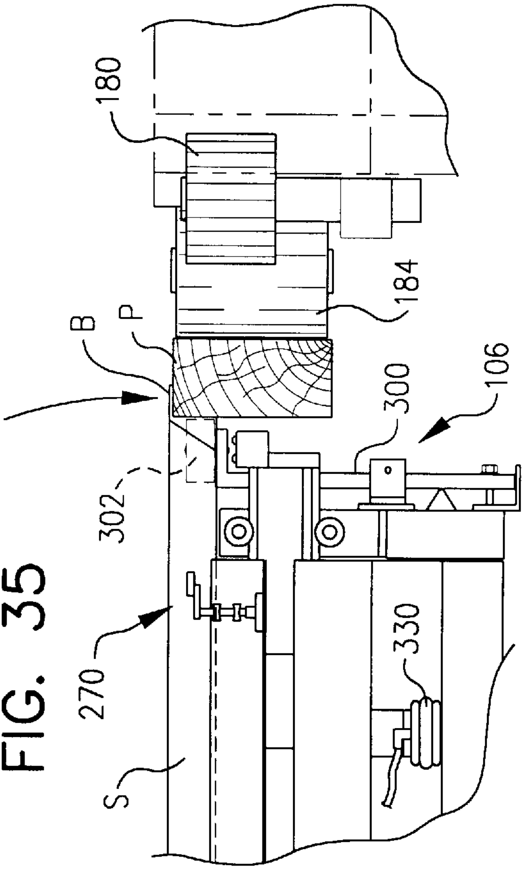
FIG. 35 is a side detail view, similar to FIG. 34, showing the subpurlins being lowered against a purlin in the assembly station.
Figure 36:
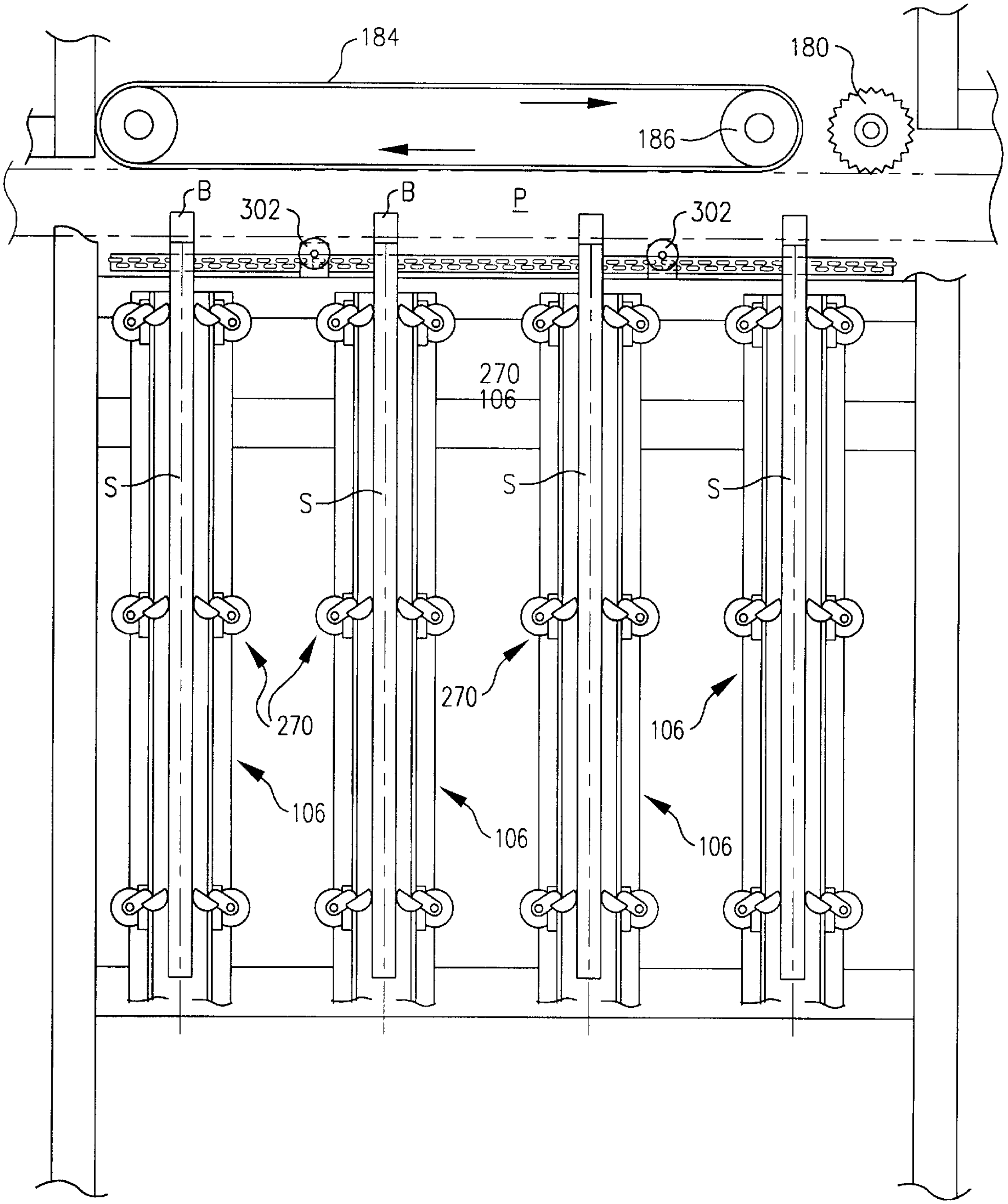
FIG. 36 is a top view of the subpurlin carriage in the position shown in FIG. 35.

After the subpurlin S has abutted against the purlin P, the cylinder 286 presses the subpurlin against the purlin, while the sensors 296 confirm or determine the length of the subpurlin. The air bags 330 may then be released, allowing the bracket B to rest against the top of the purlin P, as shown in FIGS. 35 and 36.

Figure 37:
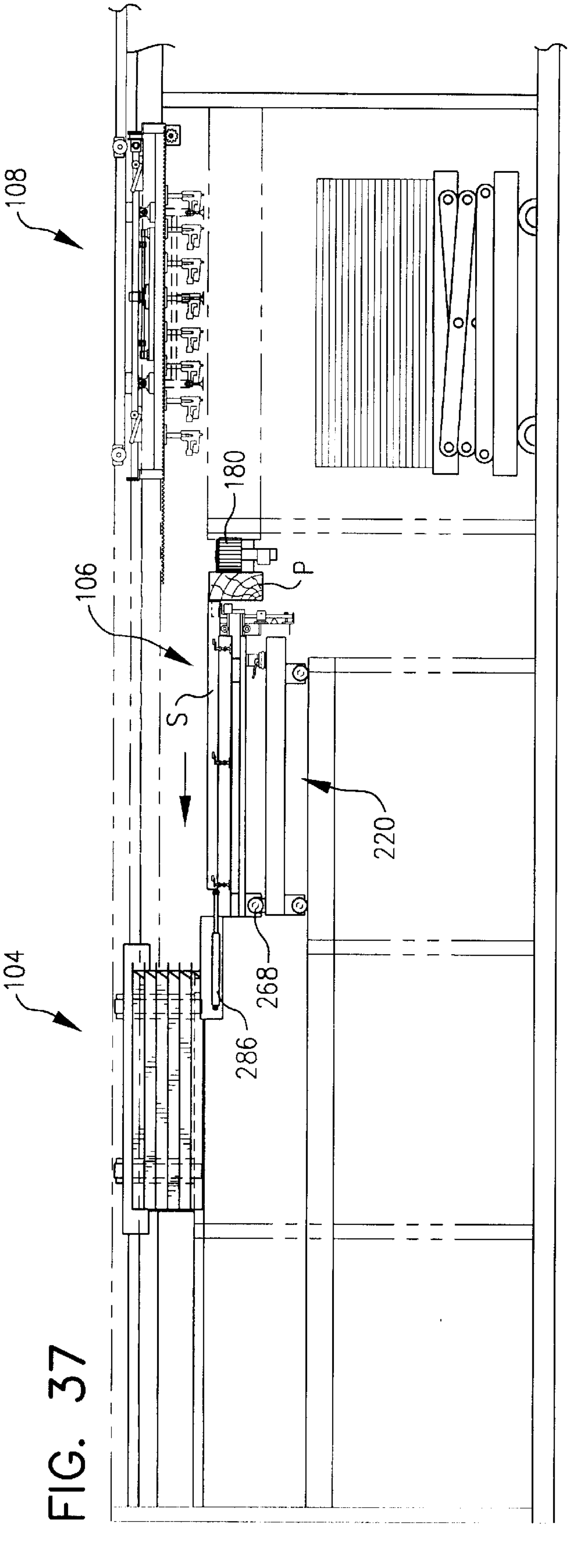
FIG. 37 is a diagrammatic side view, similar to FIG. 32, showing the subpurlin carriage in the position in FIG. 35.
Figure 38:
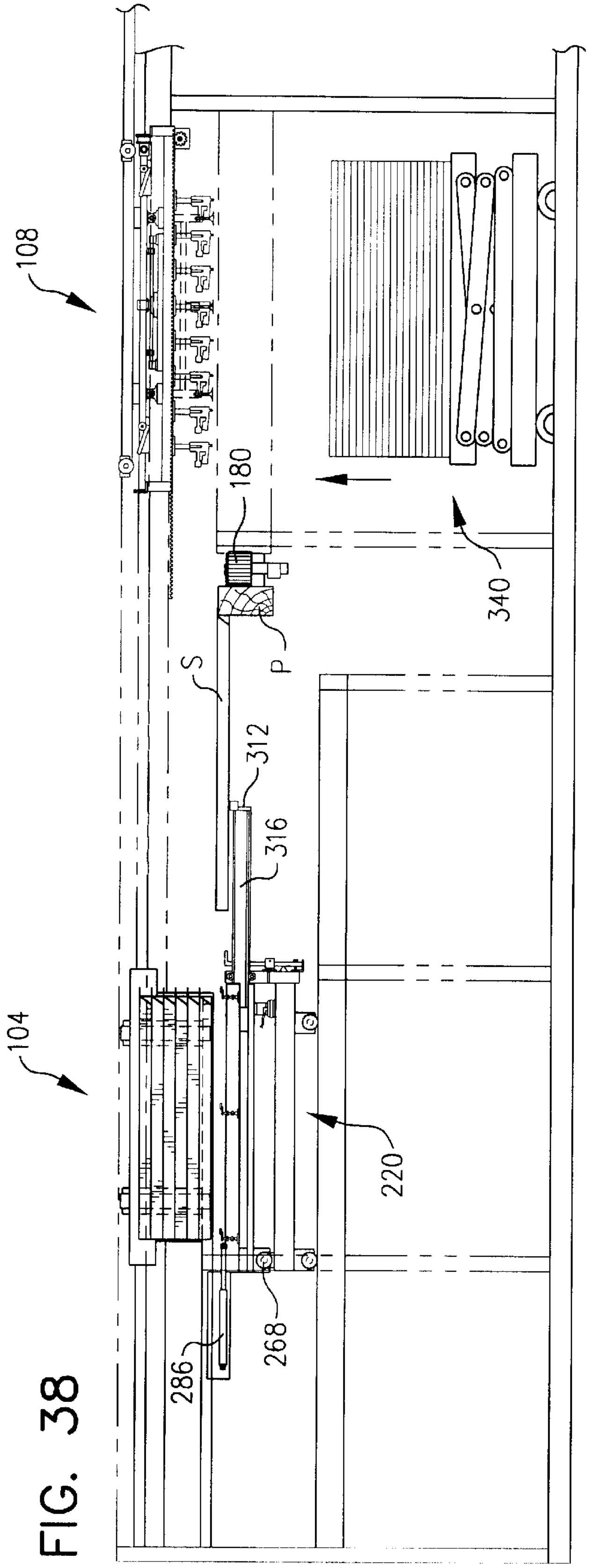
FIG. 38 is a diagrammatic side view, similar to FIG. 37, showing the subpurlin carriage fully retracted back to underneath the subpurlin feeders.

After the subpurlin S is attached to the purlin P (described further below), the subpurlin carriage 220 retracts, as shown in FIG. 37. When it has retracted approximately halfway, the assembly support 312 is released, by engaging the clutch 322. As the subpurlin carriage 220 continues to retract, the assembly support 312 remains in the same location, so that it may support the end of the subpurlins S, as shown in FIG. 38. The subpurlins S are supported on the wheels 314, and may roll toward the exit station 112 on these wheels as the purlin P is advanced through the assembly station 110.

The Diaphragm Feeder

Figure 39:
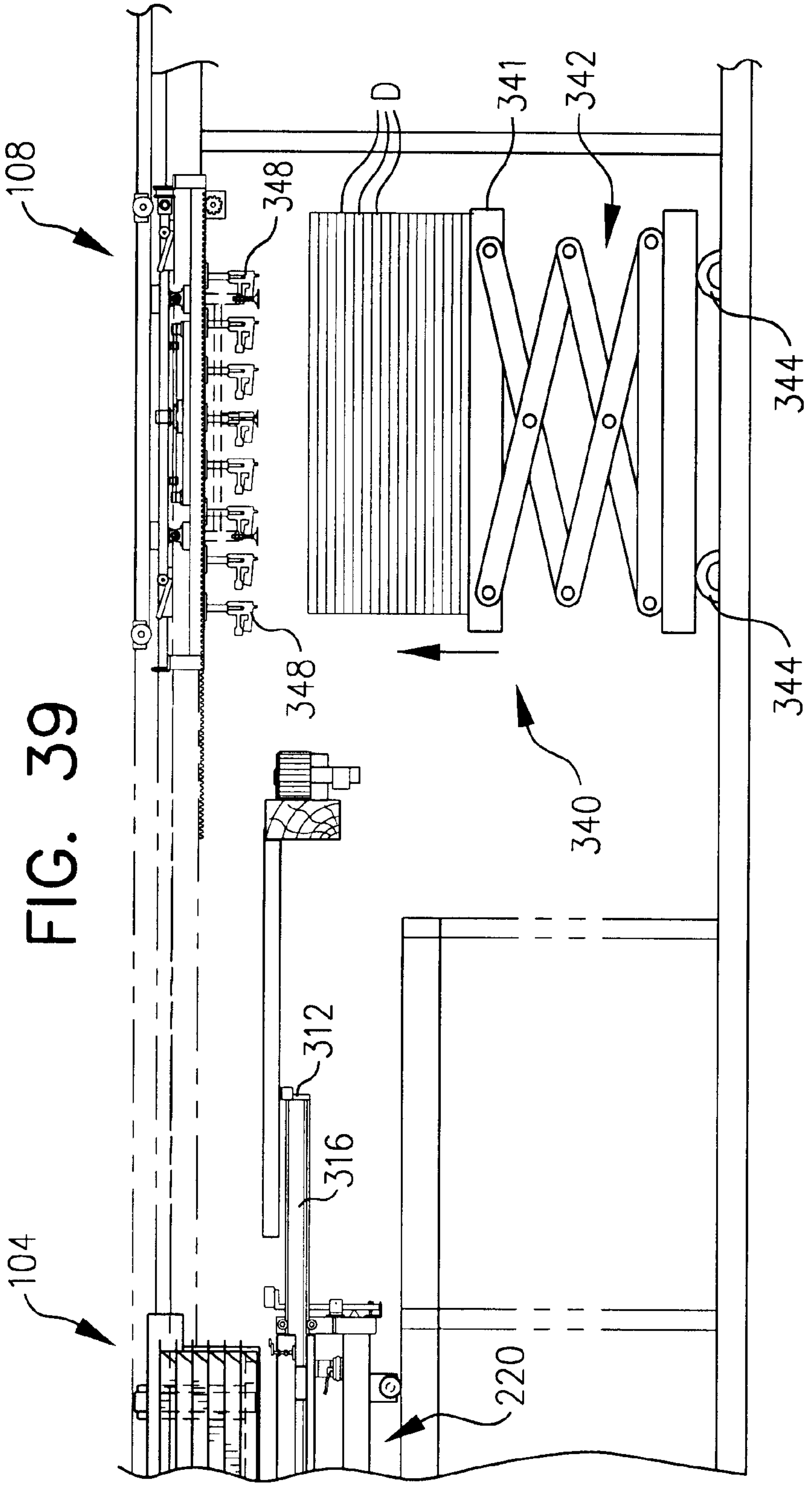
FIG. 39 is a diagrammatic side view, similar to FIG. 38, showing a beginning stage of movement of a diaphragm lift.

The diaphragm feeder 108 is designed to advance a diaphragm D into the assembly station 110. The diaphragms D, in the shown embodiment, are provided on a diaphragm lift 340 (FIG. 39). The diaphragm lift 340 includes a stack of the diaphragms D on top of a platform 341. The platform 341 is mounted on a scissors lift 342. The scissors lift 342 may include appropriate cylinders or other lifting devices such as is known in the lift art. Through the use of weight or position sensors, the lift 340 may maintain a top diaphragm D in the stack at a consistent height, such that as diaphragms are removed, the scissors lift 342 indexes upward to maintain the top diaphragm at this consistent level. Wheels 344 may be provided on the bottom of the diaphragm lift 340 so that the lift may be moved in and out of the diaphragm feeder station for service or to replenish the stack of diaphragms D.

Figure 41:
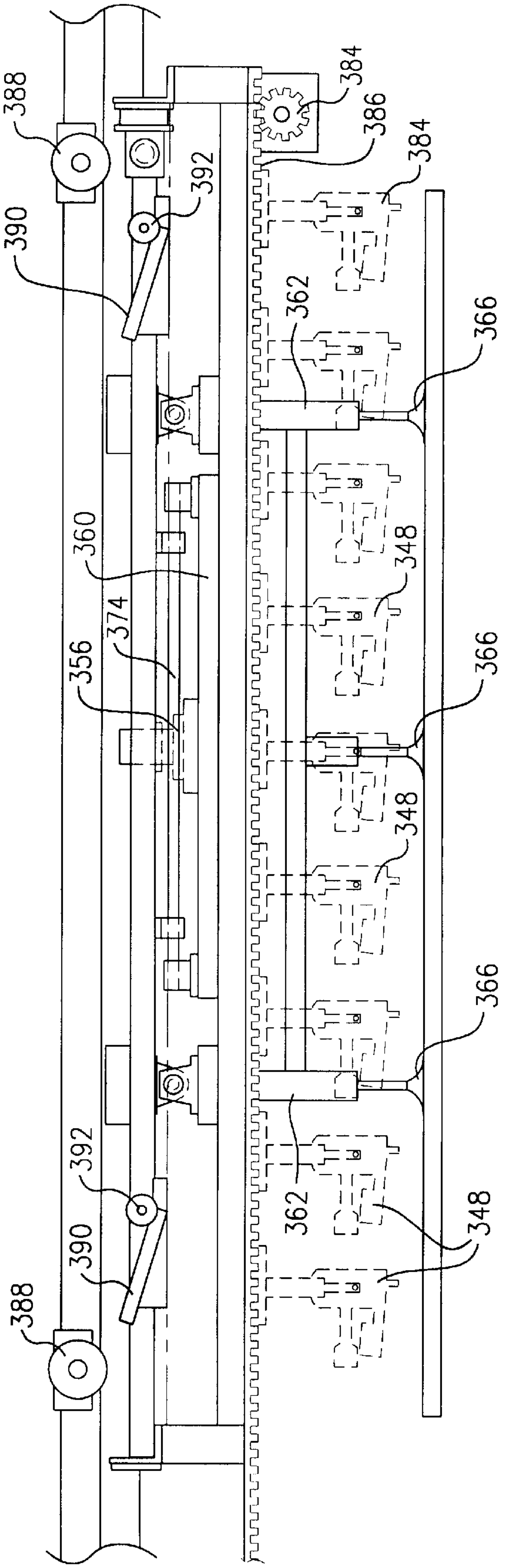
FIG. 41 is a diagrammatic side view of the diaphragm carriage of FIG. 40.

In accordance with one aspect of the present invention, the diaphragm feeder 108 includes a diaphragm carriage 346. In the shown embodiment, a lifting carriage 350 and a nailing carriage 352 are configured to travel with the diaphragm carriage 346. The lifting carriage 350 is configured to lift a diaphragm D from the diaphragm lift 340 and to properly position the diaphragm, and then place the diaphragm in the assembly station 110. The nailing carriage 352 is configured to move automatic nailers 348 (FIG. 41) into place so that the nailers may nail the diaphragms D to the subpurlins S and the purlin P. The structure and operation of the nailing carriage 352 and the lifting carriage 350 are further described below.

Figure 40:
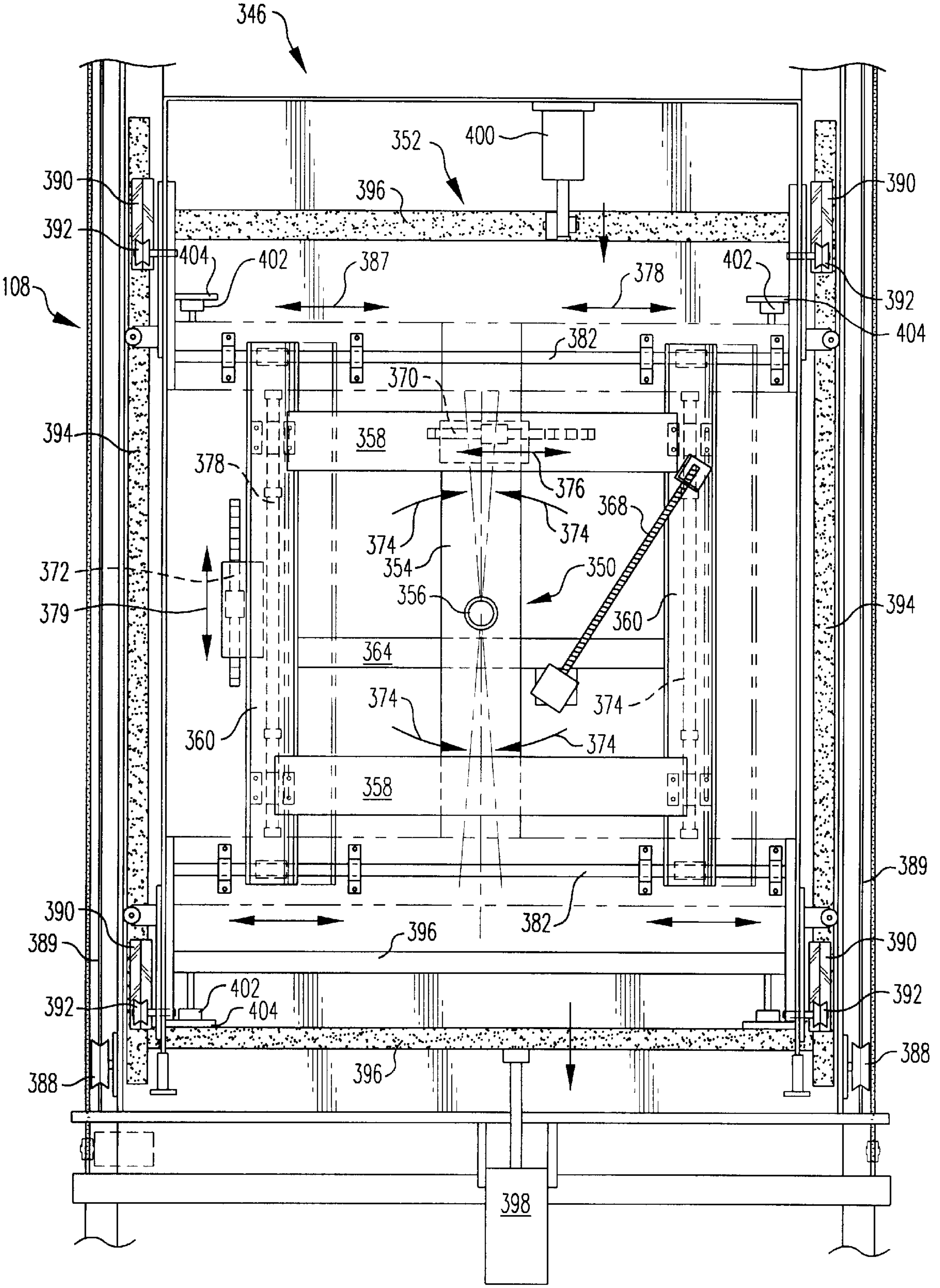
FIG. 40 is a top view of a diaphragm carriage in accordance with one aspect of the present invention.

Turning now to FIG. 40, the lifting carriage 350 is suspended from a horizontal beam 354 by a swivel attachment 356. The horizontal beam 354 is suspended from a pair of cross beams 358 that extend orthogonally to the horizontal beam. These cross beams 358, in turn, are suspended from a pair of orthogonally arranged cross beams 360.

The lifting carriage 350 includes a manifold 362 (FIG. 41) having a central beam 364 (FIG. 40). A number of suction cups 366 are attached to the manifold 362 and are fluid communication with the manifold. The manifold 362 is also connected to a vacuum system (not shown).

Returning now to FIG. 40, a worm gear 368 extends from the cross beam 364 on the manifold 362 to the cross beam 360. A second worm gear 370 is included between the attachment of the horizontal beam 354 and the cross beam 358. A third worm gear 372 is attached between the cross beams 358 and the orthogonally arranged cross beam 360.

The three worm gears 368, 370, 372 provide rotational, x-, and y-movement of the lifting carriage 350 relative to the nailing carriage 352. The movements of the worm gears 368, 370, 372 may be operated by absolute feedback motors, such as absolute feedback servo motors. As such, the location of the lifting carriage 350 and the speeds of the operation of the worm gears 368, 370, 372 may be easily altered by a programmer or operator via the computer 128, or may be performed automatically by the computer. In addition, the automatic feedback motors permit the lifting carriage 350 to be accurately located relative to the nailing carriage 352, and for that location to be known to the computer at all times.

Operation of the worm gear 368 causes the beam 364 of the manifold 362 to rotate, causing the lifting carriage 350 to rotate about the swivel attachment 356 in the direction of the arrows 374. Operation of the worm gear 370 causes the horizontal beam 354 to move along the cross beams 358, moving the horizontal cross beam in the direction of the arrows 376. Operation of the worm gear 372 causes the cross beams 358, and therefore the horizontal beam 354 and the lifting carriage 350, to move along the linear bearings 378, in the direction of the arrow 379. All of these movements may be controlled by the computer 128, and are smooth because of the use of the worm gears 368, 370, and 372. Other mechanisms may be used for providing the rotational, x- and y-directional movements.

The Nailing Carriage

The nailing carriage 352 includes a number of automatic nailers 348 suspended therefrom. The automatic nailers 348 may be, for example, nailing guns or other devices which are capable of pneumatically, mechanically, or otherwise driving fasteners for attaching the diaphragms D to the subpurlins S and the purlin P. As another example, the automatic nailers may be replaced with automatic screw drivers or other appropriate fastener drivers. Alternatively, if metal components are used for the roof panel structure A, the automatic nailers 348 may be welders.

The nailing carriage 352 may be suspended from the cross beams 360. The cross beams 360 are mounted on linear bearings 382 that provide lateral movement in the direction up and down in FIG. 40 of both the nailing carriage 352 and the lifting carriage 350. A worm gear or other appropriate mechanism may be provided for movement of the cross beams 360 relative to the linear bearings 382.

The lifting carriage 350 and the nailing carriage 352 may also be moved to the left and right in FIG. 40 by rotation of a gear 384 (FIG. 41) that engages the rack 386. The gear 384 may be driven by an appropriate motor or other mechanism (not shown). To aid in movement of the lifting carriage 350 and the nailing carriage 352, the diaphragm carriage 346 is suspended by wheels 388 (FIGS. 40 and 41), which run along a track 389 (FIG. 40).

As described thus far, it is apparent that the lifting carriage 350 may move in x, y, and rotational directions relative to the nailing carriage 352. The nailing carriage 352 is fixed for movement with the cross beam 360. The lifting carriage 350, on the other hand, may move relative to the cross beam 360 in the left to right direction in FIG. 40, denoted by the arrow 349 and movement provided by the worm gear 372, in the up and down directions in that drawing, denoted by the arrow 376 and provided by the worm gear 370, and in the rotational direction by swiveling about the swivel connection 356, denoted by the arrow 374 and provided by the worm gear 368.

In addition to the above three degrees of movement, the nailing carriage 352 and the lifting carriage 350 may be moved together in x and y directions. First, the two carriages 350, 352 may be moved up and down in FIG. 40 in the direction of the arrows 387 by moving the cross beams 360 along the linear bearings 382. Second, the nailing carriage 352 and the lifting carriage 350 may be moved left and right in FIG. 40 by rotation of the gear 384 and movement of the entire diaphragm carriage 346 along the track 389.

A lift mechanism is provided to allow one more degree of movement for the lifting carriage 350 and the nailing carriage 352. The lift mechanism permits the two carriages 350, 352 to move out of the page in FIG. 40, or upward. The lift mechanism may be provided in a number of ways, including, but not limited to, cylinders, air bags, and mechanical lifts, but a particular embodiment is shown in the drawing that utilizes wedges 390 that are driven under wheels 392. The lifting carriage 350 and the nailing carriage 352 are suspended by the wheels 392. Driving the wedges 390 under the wheels 392 causes the lifting carriage 350 and the nailing carriage 352 to be raised.

To permit the wedges 390 to be driven under the wheels 392, the wedges 390 are mounted for sliding movement on rails 394. The rails 394 are mounted for movement along the outer edges of the diaphragm carriage. Cross beams 396 extend between the two rails 394, such that a rectangle is formed by the cross beams 396 and rails 394 (the rectangle is shown with stippling for ease of viewing). A rear drive 398, such as an absolute feedback servo motor, is attached to one of the cross beams 396. The absolute feedback motor permits the location of the rectangle and the speed of the operation to be set by the computer 128, or to be easily altered by a programmer or operator via the computer 128. Actuation of the rear drive 398 causes the wedges 390 to move relative to the wheels 392, thus raising or lowering the lifting carriage 350 and the nailing carriage 352. To assure that the movement of the lifting carriage 350 and the nailing carriage 352 is vertical only, and not lateral, wheels 402 are connected to these carriages. The wheels 402 are arranged to move along plates 404 that are attached to the diaphragm carriage 346. Engagement of the wheels 402 with the plates 404 prevents lateral movement of the lifting carriage 350 and the nailing carriage 352.

To aid in driving the wedges 390 under the wheels 392, a second cylinder 400 may be provided that is attached to the front cross beam 396. This cylinder 400 acts as a balancing cylinder for the rear cylinder 398, and permits a smaller sized cylinder to be used and smoothes the lifting of lifting carriage 350 and the nailing carriage 352 relative to the diaphragm carriage.

Operation of the Lifting Carriage

Figure 42:
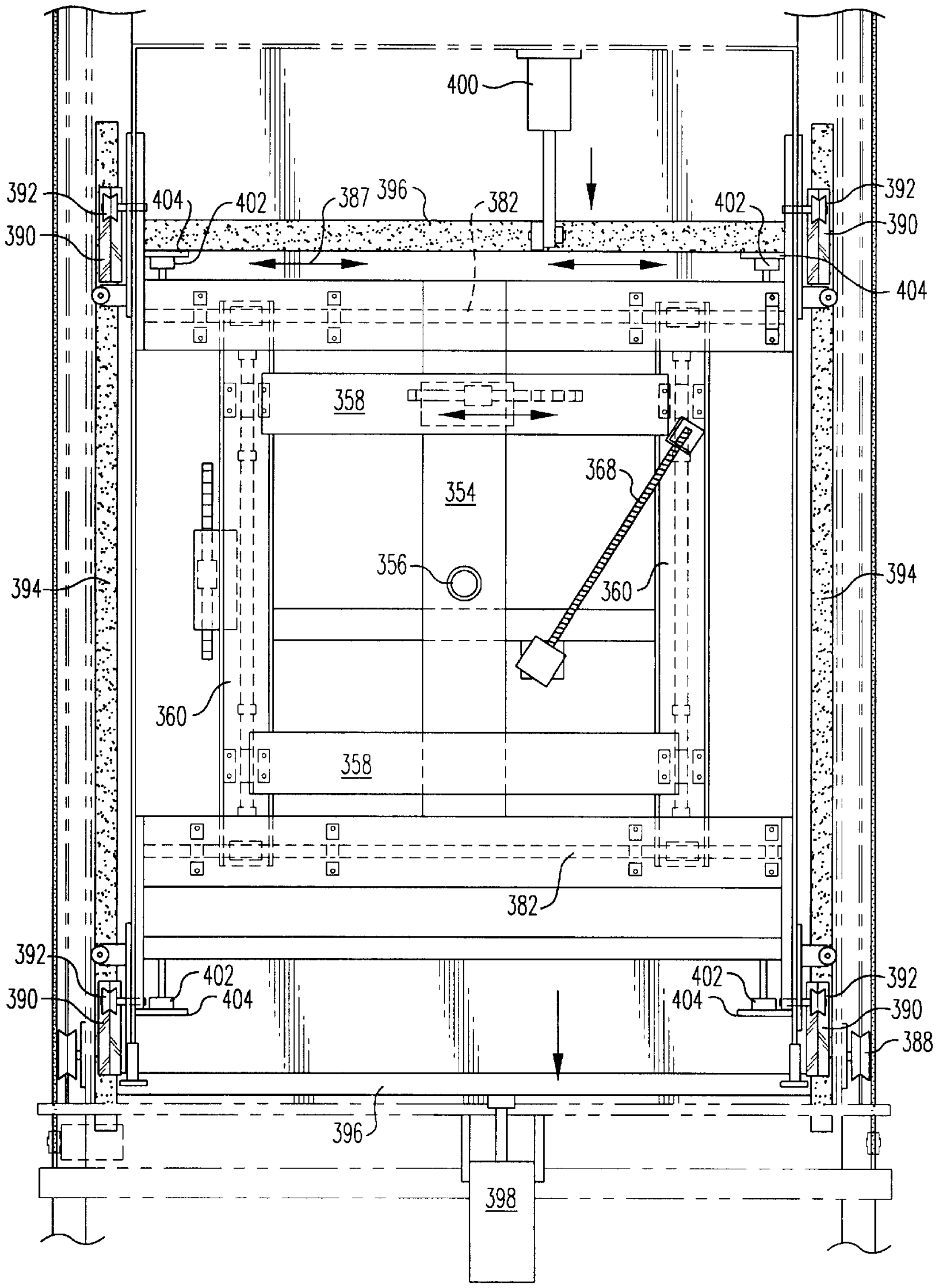
FIG. 42 is a top view of the diaphragm carriage of FIG. 40, similar to FIG. 40, but with a nailing carriage and a lifting carriage being raised.
Figure 43:
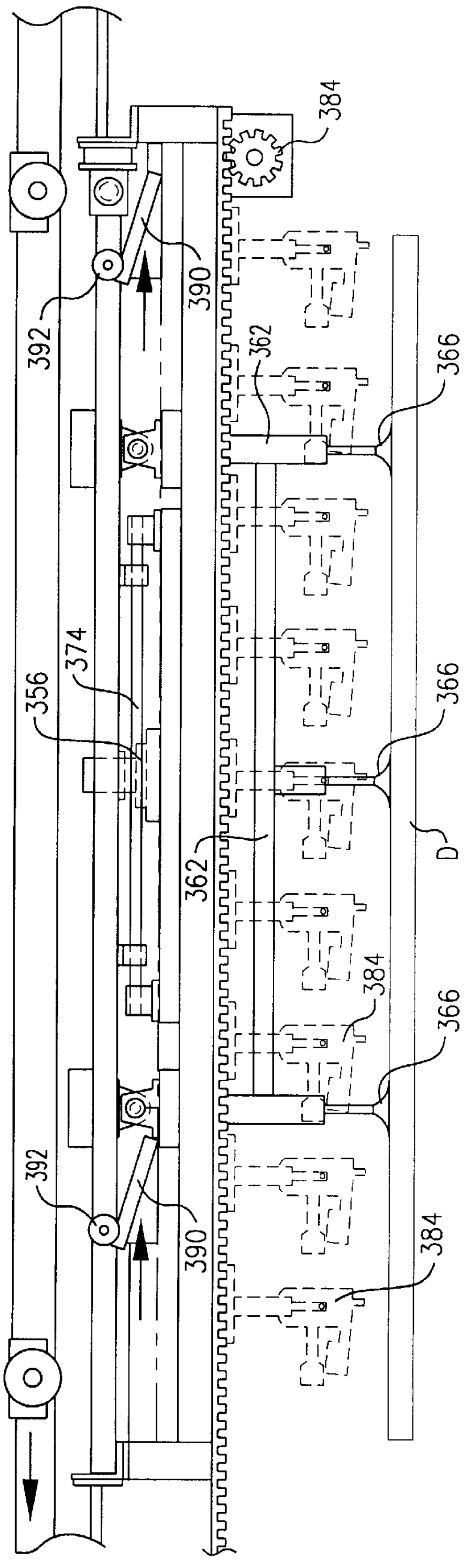
FIG. 43 is a diagrammatic side view, similar to FIG. 41, with the nailing carriage and the lifting carriage being raised as is FIG. 42.

Operation of the diaphragm feeder 108 begins with the diaphragm lift 340 in a raised position, with a diaphragm just below the lifting carriage 350, such as is shown in FIG. 39. At this position, the lifting carriage 350 and the nailing carriage 352 are in the raised position, with the wheels 392 driven upward by the wedges 390, such as is shown in FIGS. 42 and 43.

Figure 44:
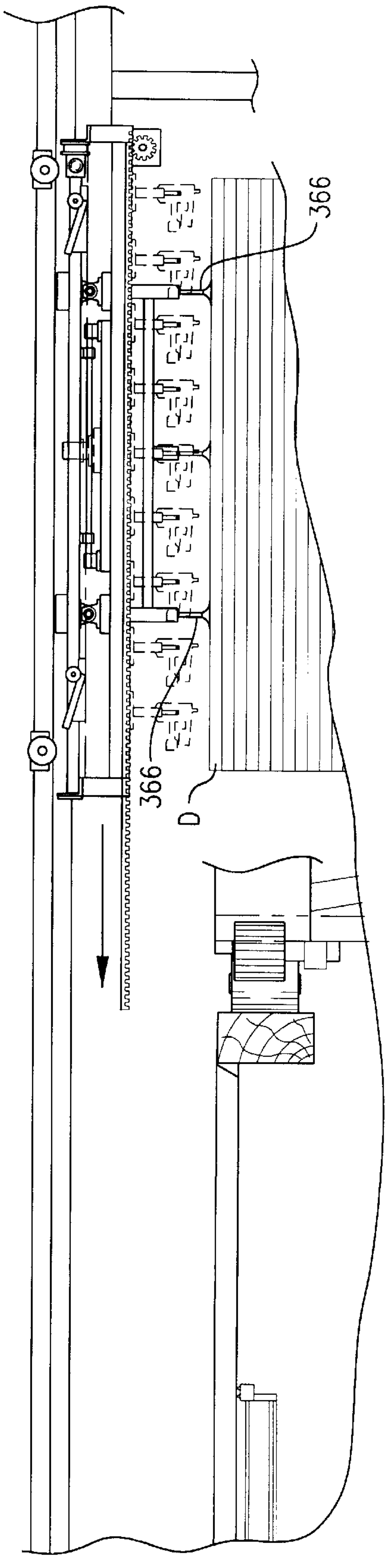
FIG. 44 is a diagrammatic side view showing a beginning stage of lifting of a diaphragm by the lifting carriage of the diaphragm carriage.

With the lifting carriage 350 centered over the stack of diaphragms D, the wedges 390 are driven from under the wheels 392, causing the lifting carriage 350 and the nailing carriage 352 to lower. At the lowered position, the suction cups 366 are lowered downward into contact with the top of the diaphragm D. This action may occur, for example, by the suction cups being retractable into sleeves. The suction cups 366 are shown attached to a top diaphragm D in FIG. 44.

Figure 45:
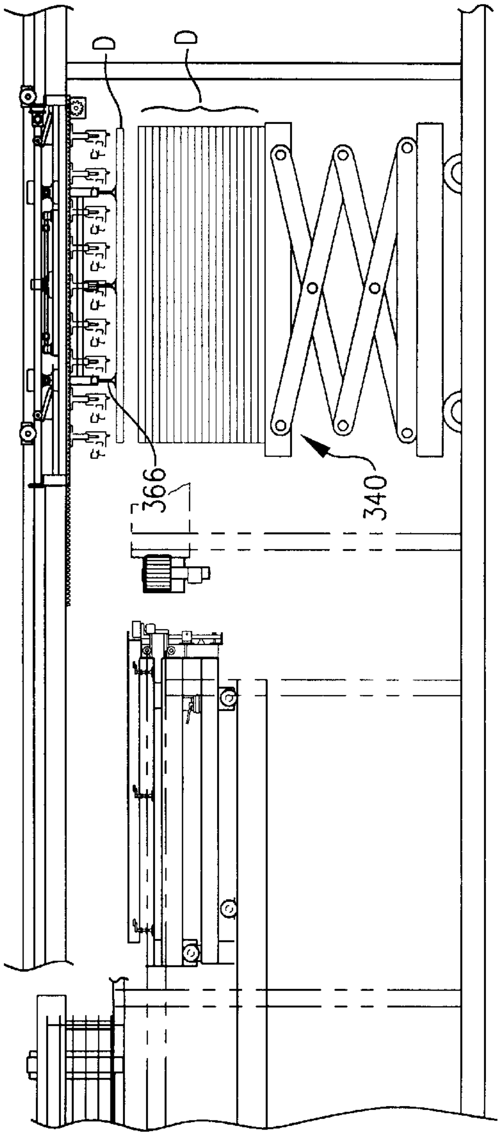
FIG. 45 is a diagrammatic side view, similar to FIG. 44, showing the diaphragm removed from the diaphragm stack.
Figure 46:
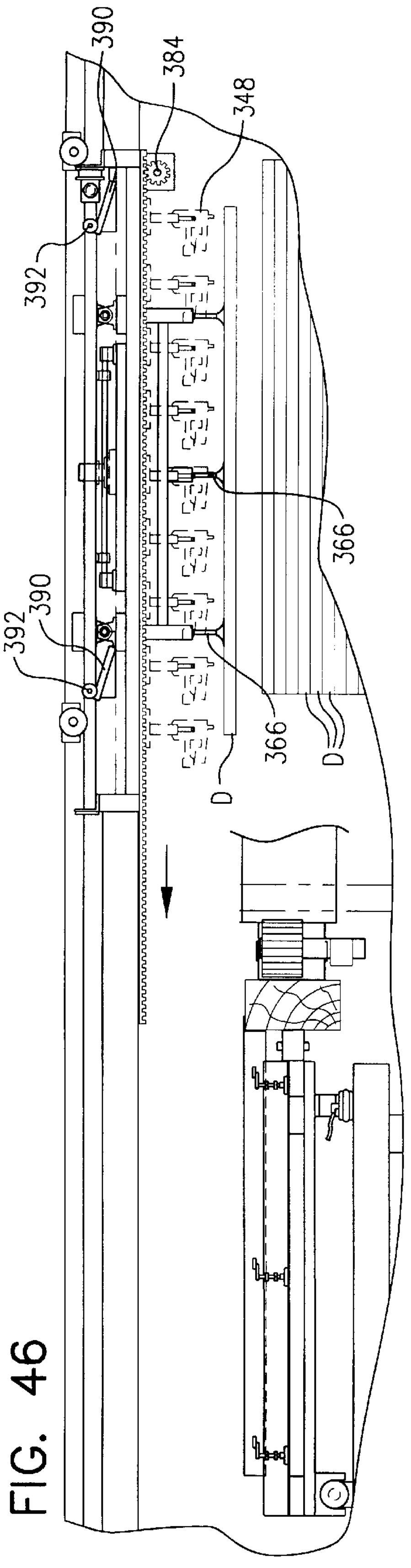
FIG. 46 is a diagrammatic side view, similar to FIG. 45, with the diaphragm carriage beginning movement toward the assembly station.

After the suction cups 366 are attached to the diaphragm D, the lifting carriage 350 and the nailing carriage 352 are lifted upward to the position shown in FIGS. 45 and 46. The movement upward is caused by the wedges 390 being driven under the wheels 392.

Once in the up position, the diaphragm D may be aligned relative to the nailing carriage 352 so that the diaphragms may be properly positioned on the subpurlin S. One way of aligning the diaphragm D is shown in FIGS. 47–50. In accordance with one aspect of the present invention, three sensors 410, 412, and 414 are provided that are aligned so that a first two of the sensors (410 and 412) are located just to one side of the diaphragm D after it is lifted, and the third sensor 414 is located just behind the diaphragm after it is lifted.

Figure 47:
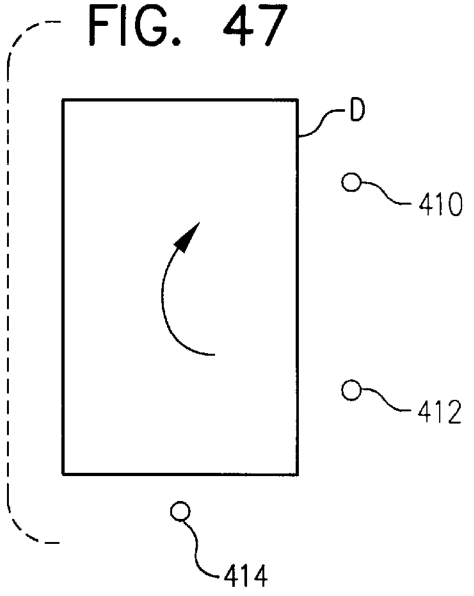
FIGS. 47–50 are diagrammatic views showing a sensor arrangement that may be used to determine the location and orientation of a diaphragm held by the diaphragm feeder, and a diaphragm being oriented relative to the sensors to determine its location and orientation.
Figure 48:
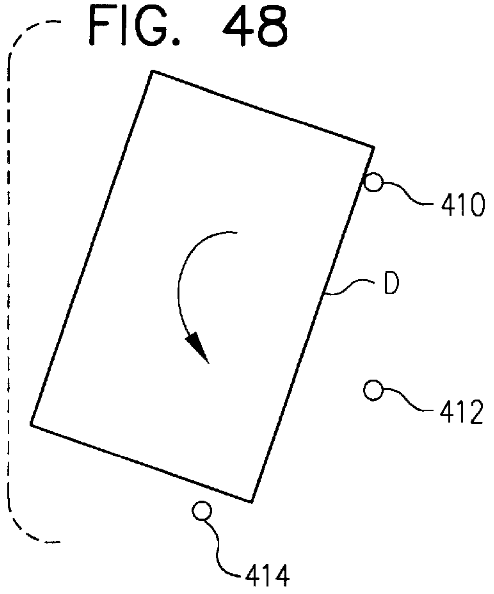
Figure 49:
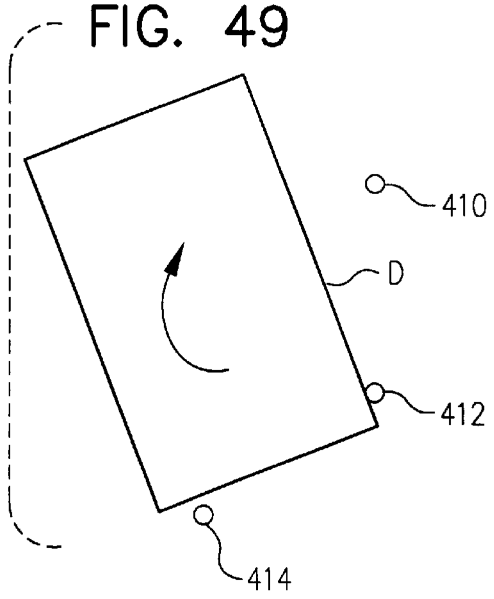

To properly align the diaphragm D, the diaphragm is first rotated as is shown in FIG. 47 to the position shown in FIG. 48. At this location, the leading right edge of the diaphragm engages the first sensor 410. The diaphragm D is then rotated in the opposite direction until the trailing right corner of the diaphragm engages the second sensor 412.

Figure 50:
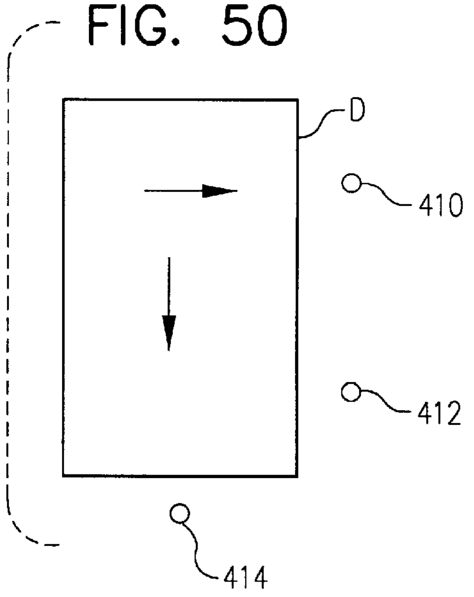

Using the point of rotation and the amount of rotation of the diaphragm, geometry may be used to determine the orientation of the diaphragm. Using this geometry, the diaphragm D may be aligned centered properly underneath the lifting carriage 350. Then, to establish a reference leading edge of the diaphragm, the diaphragm is moved as shown in FIG. 50 until it engages the sensor 414. Once engaged, the trailing edge of the diaphragm is known, and the leading edge may be calculated by knowing the length of the diaphragm. The diaphragm D may also be moved to the right in FIG. 50 to engage the sensors 410 and 412. This movement establishes or confirms the location of the right edge of the diaphragm.

Other methods may be used to align the diaphragm D properly, including but not limited to assuring that the diaphragm is properly placed on the lifting mechanism 340. However, the presently described embodiment provides a structure and operation by which the alignment of the diaphragm D may be confirmed and/or properly set before the diaphragm enters the assembly station 110.

Figure 51:
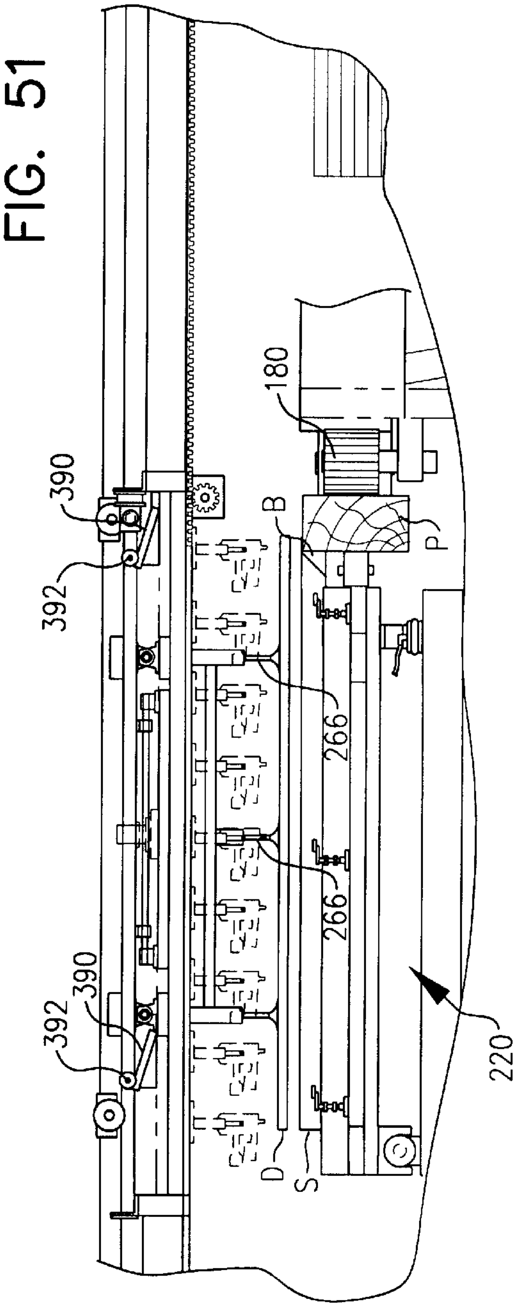
FIG. 51 is a diagrammatic side view showing a diaphragm held by the lifting carriage over the assembly station.

After the diaphragm D is properly aligned, it is advanced to the assembly station 110 by rotating the gear 384 and causing the lifting carriage 350 and the nailing carriage 352 to move into the assembly station and over the subpurlins S and the purlin P. This position is shown in FIG. 51.

Figure 52:
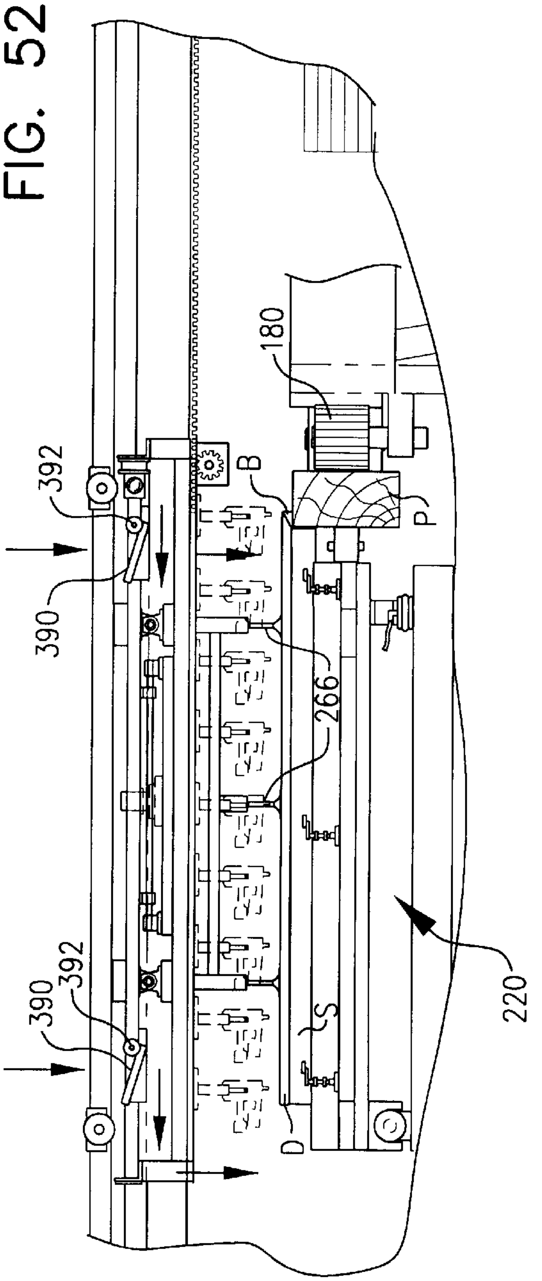
FIG. 52 is a diagrammatic side view, similar to FIG. 51, with the diaphragm lowered against subpurlins and a purlin.

The movements of the lifting carriage 350 and the nailing carriage 352 are preferably operated by absolute feedback motors, such as absolute feedback servo motors. As such, the location of the lifting carriage 350 and the nailing carriage 352 and the speeds of the movement of the carriages may be easily set by the computer 128, and altered by a programmer or operator via the computer 128. Because the width of the purlin is known, the diaphragm D may be properly centered over the subpurlins S and aligned over the brackets B on the subpurlins using the absolute feedback motors. The wedges 390 are then driven from under the wheels 392, causing the lifting carriage 350 and the nailing carriage 352 to lower, such as is shown in FIG. 52. At this lowered position, the automatic nailers 348 are slightly spaced from the top of the diaphragm D, and the suction cups 366 still hold the diaphragm in place.

The automatic nailers 348 are then lowered to nail the first series of nails into the subpurlin S and purlin P. Preferably, this first nailing sequence drives nails through the diaphragm D and through the brackets B and into the top of the purlin P. Other nails are driven into the subpurlins S through the diaphragm D. The nails that are driven through the brackets B and the diaphragm D and the purlin P are used to anchor the three components of the diaphragm, subpurlin S, and purlin relative to one another.

Figure 53:
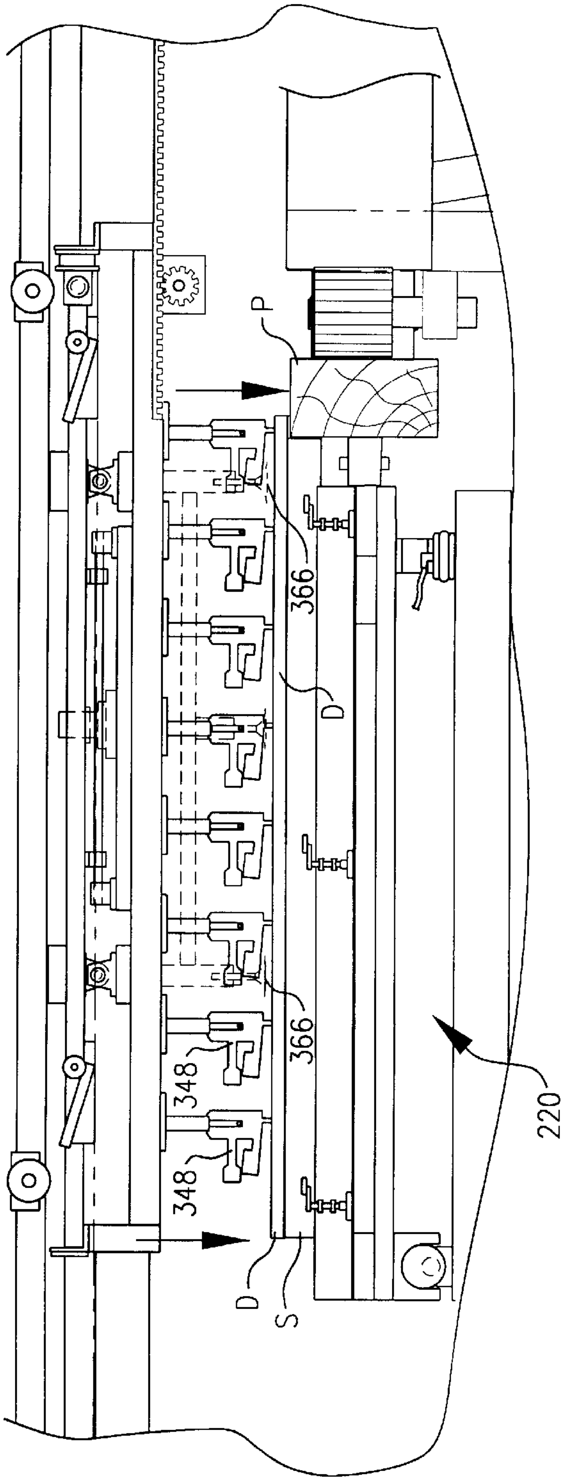
FIGS. 53–58 are diagrammatic side views showing a nailing process for a nailing carriage of the diaphragm carriage in accordance with one aspect of the present invention.
Figure 54:
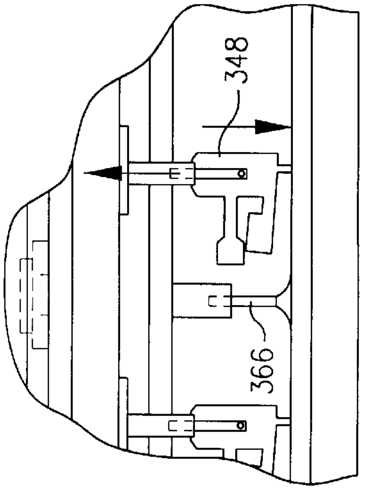

The position of the automatic nailers 348 in this first nailing sequence is shown in FIG. 53. Again, in this first nailing sequence, the suction cups remain down, as is shown in FIG. 54. In this manner, the suction cups 366 assure that the diaphragm D is held in the proper position during the first nailing sequence.

Figure 56:
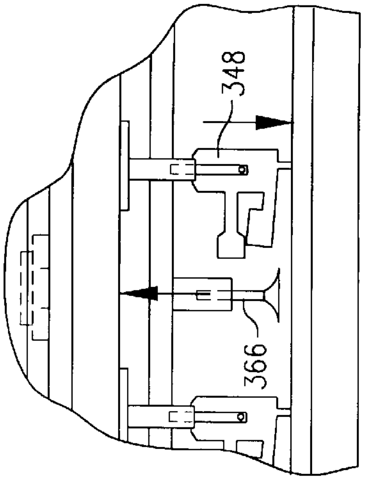
Figure 55:
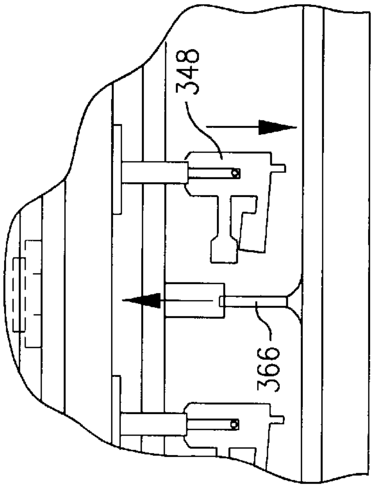

After the first nailing sequence, the suction cups are withdrawn, as is shown in FIG. 55. The suction cups 366 are shown fully withdrawn in FIG. 56. The nailing guns also slightly retract and move to the next location, described further below. At this next location, the suction cups continue to remain upward, as is shown in FIG. 56, even as the automatic nailers 348 are lowered.

Operation of the Nailing Carriage

Figure 57:
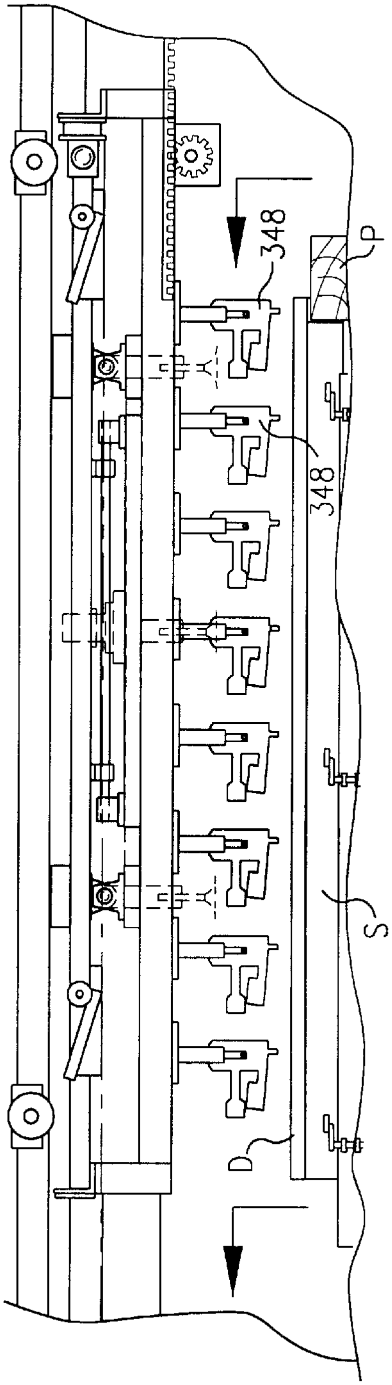
Figure 58:
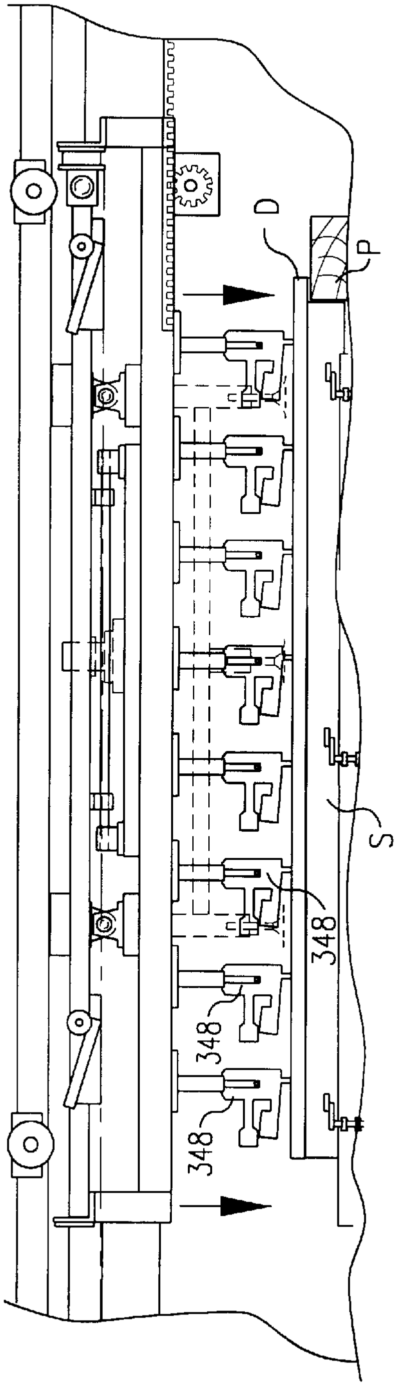

After the first nails have been driven into the diaphragm by the automatic nailers 348, the automatic nailers may be indexed to nail another series of nails. The position where the automatic nailers is indexed depends upon the number of nailers and the desired spacing of the nails. In one example, the nailing carriage 352 includes five rows of nine automatic nailers each. The automatic nailers 348 in a single row may be spaced, for example, a foot from one another. If such an embodiment is used, after the initial nailing, the automatic nailers 348 may retract (FIG. 57), and index half the distance toward the adjacent automatic nailer's original location (e.g., 6 inches, as shown in FIG. 58).

The automatic nailers 348 then drop and nail another pattern of nails. The nailers may also move perpendicular to the subpurlins S so that additional nails may be driven into the purlin P through the diaphragm D.

Figure 59:
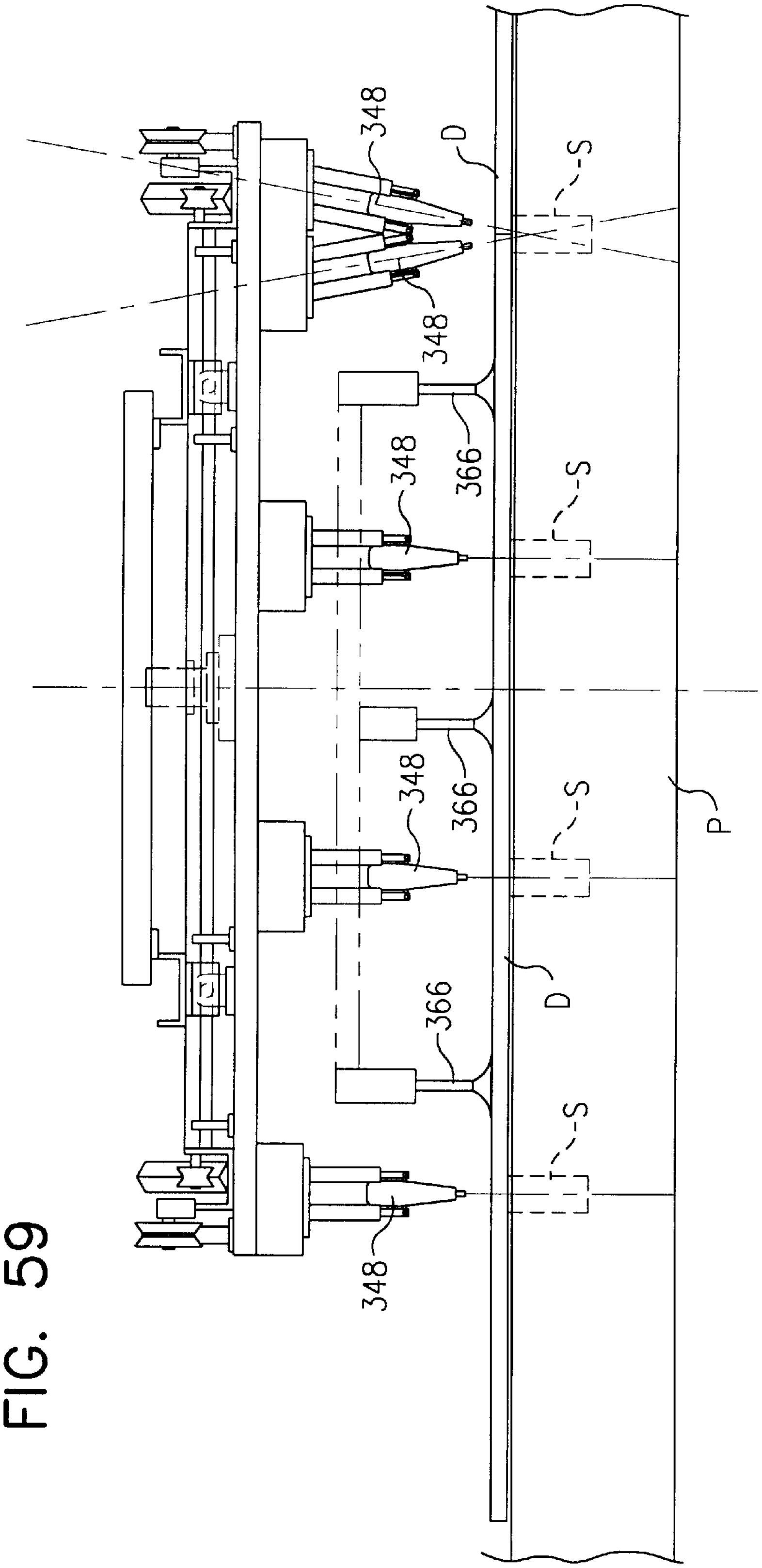
FIG. 59 is an end view of the nailing carriage of FIGS. 53–58.

An example of the arrangement of the five rows of automatic nailers 348 is shown in FIG. 59. As can be seen, two rows (i.e., the rows to the right in the figure) of the automatic nailers 348 are adjacent to one another. This space corresponds to the edge of a diaphragm D of the leading subpurlin S. At this location, the trailing edge of the adjacent diaphragm D is nailed into the leading subpurlin, as well as the forward end of the diaphragm that has just been placed. If the diaphragm just placed is the first diaphragm that has been placed, then the automatic nailers 348 that would nail into the trailing end of the adjacent diaphragm do not fire. The remaining rows align with the subpurlins S.

Figure 60:
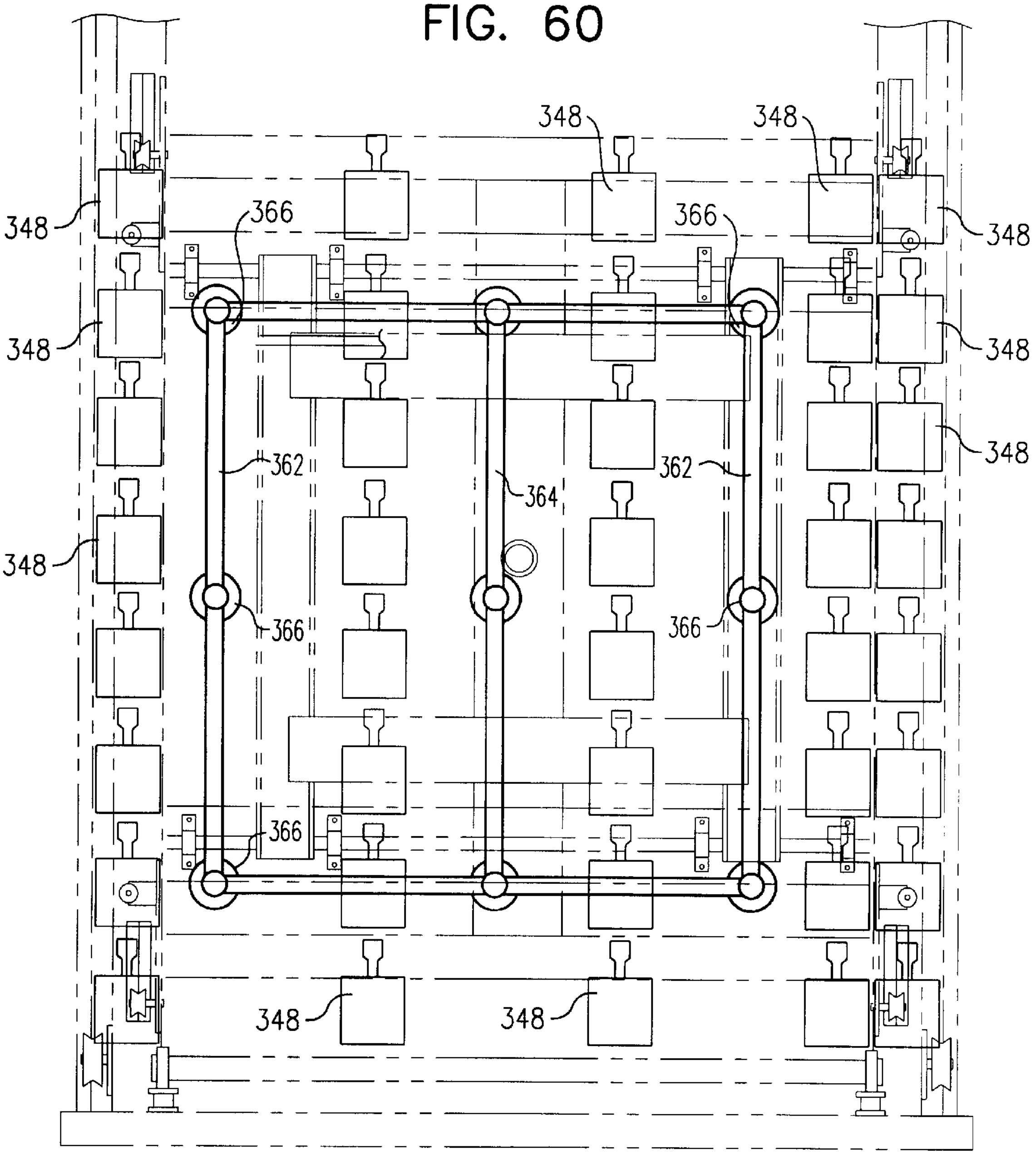
FIG. 60 is a diagrammatic view of automatic nailers for the nailing carriage of FIG. 59, shown relative to a portion of the lifting carriage.
Figure 61:
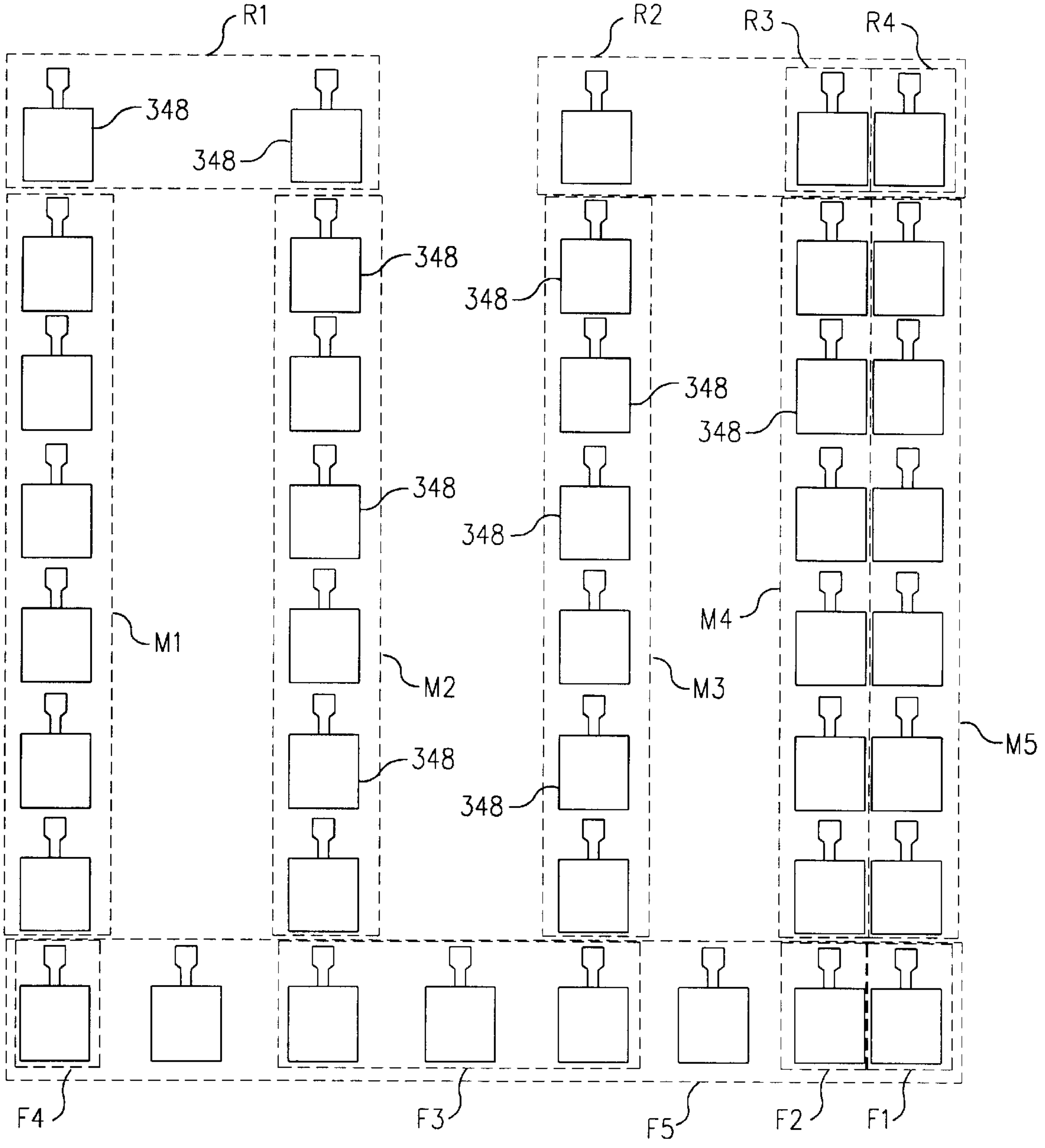
FIG. 61 is a diagrammatic view of nailing stations for the automatic nailers of FIG. 60.

The embodiment of the five rows of automatic nailers 348 may be used for a variety of different roof panel structures A. Different automatic nailers 348 fire depending upon the location along the purlin, the length of the subpurlins S and the diaphragms D, and the position of the nailers relative to the subpurlins, the diaphragms, and the purlin. FIG. 60 shows the relation of the position of the automatic nailers 348 and the suction cups 366, and FIG. 61 shows possible zones for the automatic nailers 348. The representation in FIG. 60 includes additional automatic nailers 348 that align with the purlin. These additional automatic nailers permit the purlin to be attached with additional nails without having to index the nailers perpendicularly relative to the subpurlins. The zones represent automatic nailers 348 that may fire at the same time. Different zones are used based upon the above-listed factors.

In FIG. 61, fourteen different zones are shown. When the diaphragm feeder 108 is in the assembly station 110, the F zones are at the purlin end of the assembly station 110, and the R zones are at the opposite end of the assembly station. The guns within a zone fire in unison when so instructed by the computer 128. The zones shown are but one way to separate the guns, but the particular zones shown permit a wide variety of nailing patterns for different sizes of diaphragms and different nailing locations on the diaphragms. As one example, for the initial nailing of a diaphragm that is ten feet in length and eight feet wide, and which has been placed behind another diaphragm (e.g., is not the first diaphragm on the purlin P), all of the automatic nailers 348 for all of the stations would fire. However, if a diaphragm D was the first diaphragm to be attached to the purlin P, then the stations F1, M5, and R4 would not fire, because there would not be another, adjacent diaphragm in which to nail.

If, on the other hand, a diaphragm D that is being attached is only eight feet in length, then none of the R zones would fire on the initial nailing. As the nailing carriage 352 indexes down the rows, such as is shown in FIG. 58, then the F and M zones continue to fire as appropriate.

If, however, the nailing carriage 352 indexes sideways so as to drive additional nails through the diaphragm D into the purlin P, then the stations F1 and F4 may be turned off and the other F stations fire as the nailing carriage is indexed.

A variety of other nailing combinations may be used so as to appropriately attach the diaphragm D to the subpurlins and purlin. As can be understood, these nailing patterns may change according to the number of subpurlins S used, the length of the subpurlins and the diaphragms D, the number of nails desired in the nailing pattern, the position of the subpurlins S and diaphragms D relative to the purlin P, and other factors.

Operation of the Roof Panel Structure Assembly Mechanism

Figure 62:
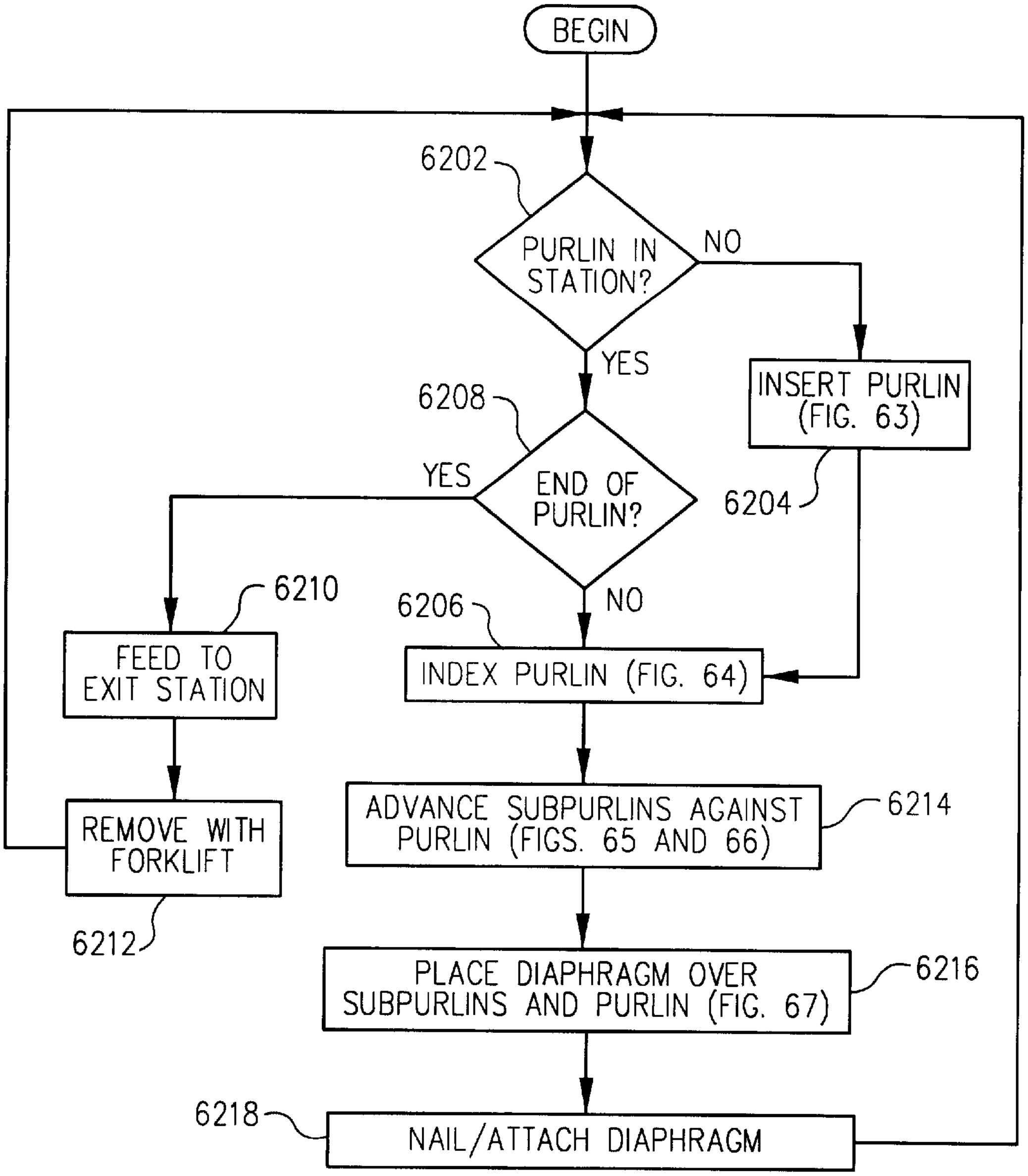
FIG. 62 is a flow diagram generally representing exemplary steps for automatically producing a roof panel structure in accordance with an aspect of the present invention.

FIG. 62 is a flow diagram generally representing steps for automatically producing a roof panel structure A in accordance with one aspect of the present invention. Beginning at step 6202, a check is made to determine whether a purlin P is in the assembly station 110. If not, step 6202 branches to step 6204 where a purlin P is inserted into the assembly station. This operation is described in more detail with the discussion of FIG. 63. After the purlin is inserted, step 6204 branches to step 6206, where the purlin P is indexed the appropriate amount into the assembly station 110. This process is described with FIG. 64, below.

If a purlin is in the assembly station 110, step 6202 branches to step 6208, where a determination is made whether the end of the purlin has been reached. That is, a determination is made whether any more subpurlins S or diaphragms D will be added to the purlin P. If the end has been reached, step 6208 branches to step 6210, where the remainder of the purlin P is fed into the exit station 112. The assembled roof panel structure A is then removed, e.g., with the forklift F (step 6212). If the end of the purlin has not been reached, then step 6208 branches to step 6206, where the purlin is indexed the appropriate amount (e.g., the width of one diaphragm D).

In step 6214, the subpurlins S are advanced against a purlin P that is in the assembly station 110. The steps for this process are discussed with FIGS. 65 and 66, below. In step 6216, a diaphragm D is placed over the subpurlins S and the purlin P. This step is discussed with FIG. 67 below.

The process then proceeds to step 6218, where the diaphragm D is nailed or otherwise attached to the subpurlin S and purlin P. This process is performed by the nailing carriage 352, was described above, and is further described with FIGS. 68–73 below.

The general overview of the process is but one way to perform some of the features of the present invention, and, has been described above, different orders may be used, as well as different structures for performing the functions described herein. As one nonlimiting example, the assembly station 110 may receive two diaphragms at one time for attachment by the nailing carriage 352. As another example, subpurlins may be added one at a time. Also, diaphragms may be placed upside down, and subpurlins may be added over the diaphragms. Other variations are within the scope of the present invention.

Inserting a Purlin into the Assembly Station

Figure 63:
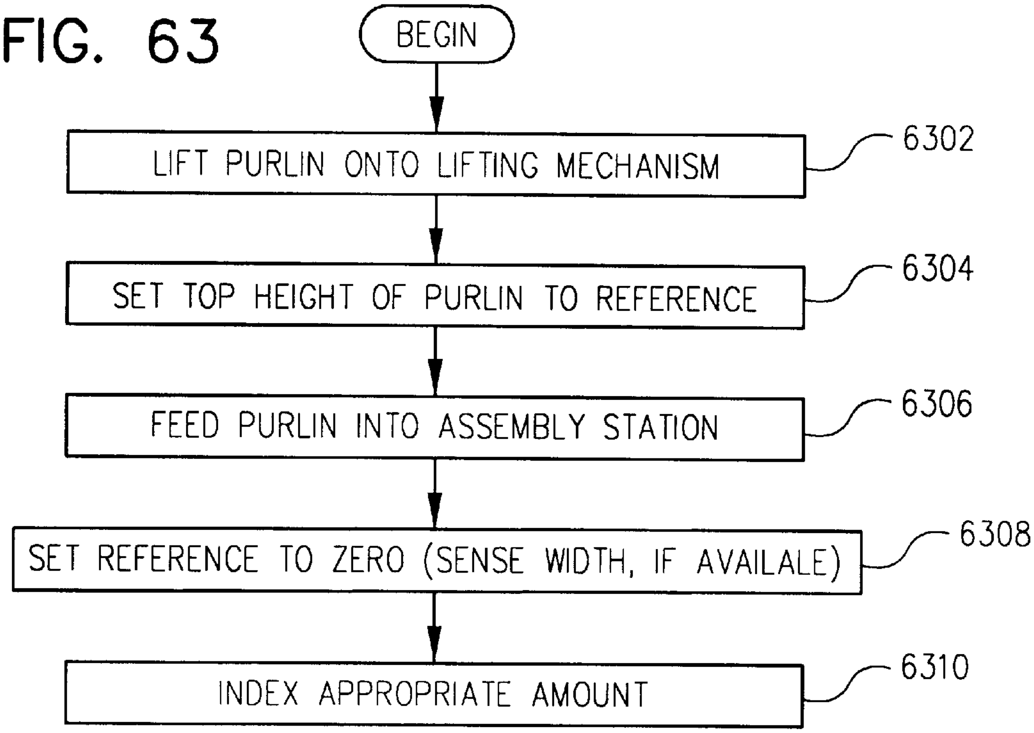
FIG. 63 is a flow diagram generally representing steps for inserting a purlin into the assembly station in accordance with an aspect of the present invention.

FIG. 63 is a flow diagram generally representing steps for inserting a purlin P into the assembly station 110 in accordance with one aspect of the present invention. Beginning in step 6302, a purlin P is lifted onto the lifting mechanisms 132 (e.g., by the hoist 130). The lifting mechanisms 132 then lift the purlin P or lower the purlin P to the appropriate height, for example by rotating the shaft 156 (step 6304).

In step 6306, the purlin P is fed into the assembly station 110. This may be done manually, for example by pushing the purlin P until it engages and is caught by the toothed driven roller 180.

Once the purlin P begins to enter the assembly station 110, the computer 128 sets the reference for the purlin to zero at step 6308. In this manner, using the absolute feedback servo motors that are associated with the toothed driven roller 180 and the belt 184, the exact amount the purlin P has been advanced into the assembly station 110 may be tracked. If desired, the width of the purlin P may also be sensed, for example by sensing the amount that the biased idler roller 182 is moved as the purlin is inserted into the assembly station 110.

At step 6310, the purlin P is indexed an appropriate amount into the assembly station 110. This amount might be, for example, an appropriate lead for the end of the purlin P, plus the distance of one diaphragm width. After the purlin P has been indexed the appropriate amount, it is ready for attachment of the subpurlin S and diaphragm D.

Indexing the Purlin Through the Assembly Station

Figure 64:
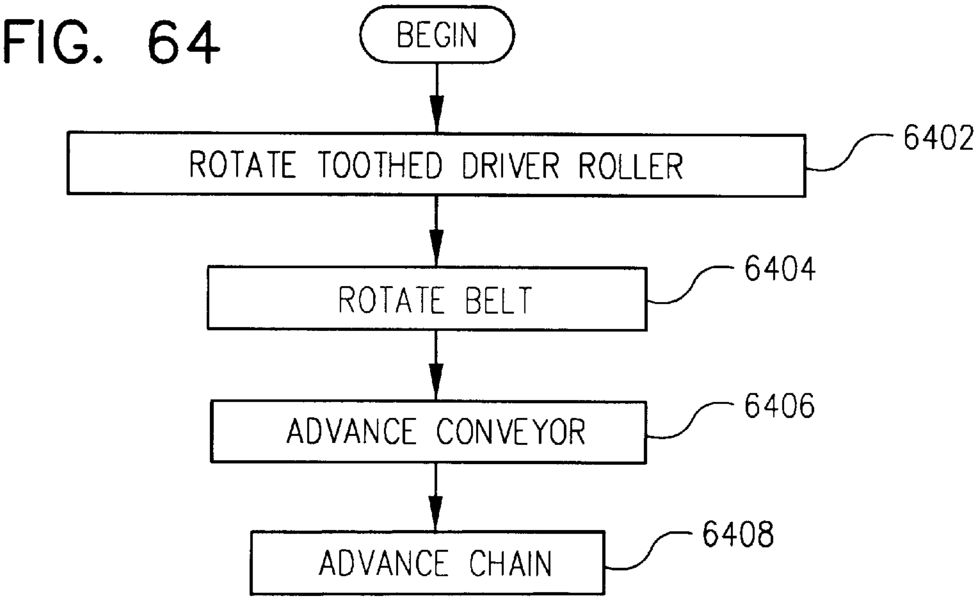
FIG. 64 is a flow diagram generally representing steps for indexing a purlin through the assembly station as subpurlins and diaphragms are added to the purlin in accordance with an aspect of the present invention.

FIG. 64 is a flow diagram generally representing steps for indexing a purlin P through the assembly station 110 as subpurlins S and diaphragms D are added to the purlin. Beginning at step 6402, the toothed driven roller 180 is rotated. Simultaneous with this rotation, the belt 184 is rotated (step 6404). Also simultaneous with movement of the toothed driven roller 180, the conveyor 196 is advanced. Each of these components engages a portion of the purlin P as it is indexed through the assembly station 110. Preferably, their movements are synchronized by the computer 128 so that none of the components is working against the others.

In addition to the toothed driven roller 180, the belt 184, and the conveyor 196, the chain 202 advances as a purlin P is advanced through the assembly station 110 (step 6408). It is also desired that the computer 128 synchronizes the advancement of the chain 202 with the movement of the other components.

Operation of the Subpurlin Feeder

Figure 65:
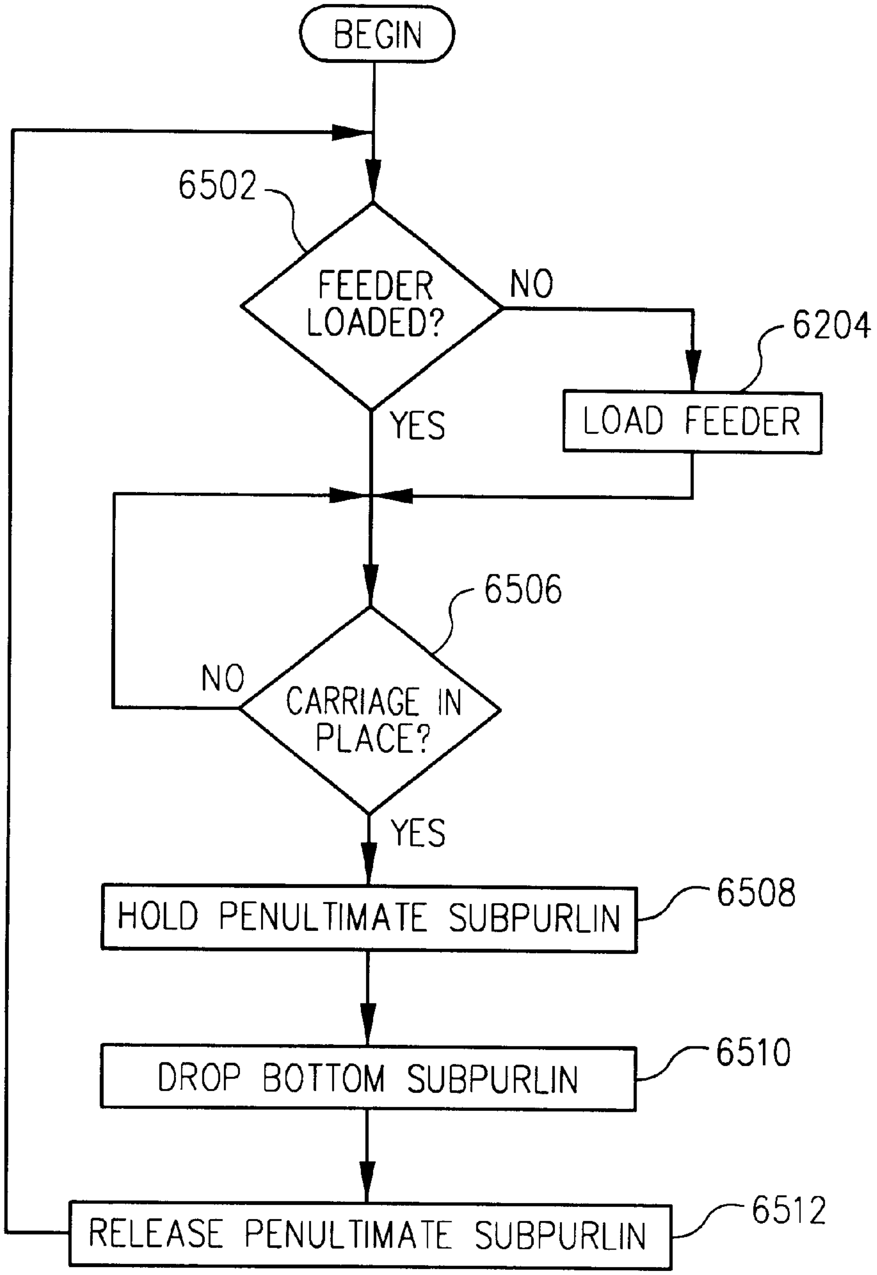
FIG. 65 is a flow diagram generally representing steps for loading a subpurlin into the subpurlin clamping mechanisms in accordance with an aspect of the present invention.

FIG. 65 is a flow diagram generally representing steps for loading a subpurlin S into the subpurlin clamping mechanisms 106 in accordance with one aspect of the present invention. Beginning at 6502, a query is made as to whether the subpurlin feeders 104 are loaded. This may be done, for example, by a sensor or another suitable detection device. Alternatively, the step may be conducted by a user, e.g., via visual inspection. The step may involve determining whether any subpurlins S are in the subpurlin feeder 104, or may involve a determination whether a certain amount of subpurlins S are within the subpurlin feeder (e.g., 6). If a determination is made that the feeder is not loaded properly, then step 6502 branches to step 6504, where the subpurlin feeder 104 is loaded. This step may be conducted automatically, or manually by an operator.

In either event, at step 6506, a determination is made whether the clamping mechanism carriage 220 is in place under the feeders. If not, then the process continues to loop around until the clamping mechanism carriage 220 is in place. If the clamping mechanism carriage 220 is in place, then step 6506 branches to step 6508, where the penultimate subpurlin S within the subpurlin feeders 104 is held (e.g., by the plungers 240).

At step 6510, the bottom subpurlin S is released, e.g., by the arms 242. After the subpurlins S have been released and have dropped into the subpurlin clamping mechanisms 106, the arms 242 are closed, and the penultimate subpurlin is released at step 6512. The process then loops back to step 6502.

Advancement of the Subpurlin Clamping Mechanisms

Figure 66:
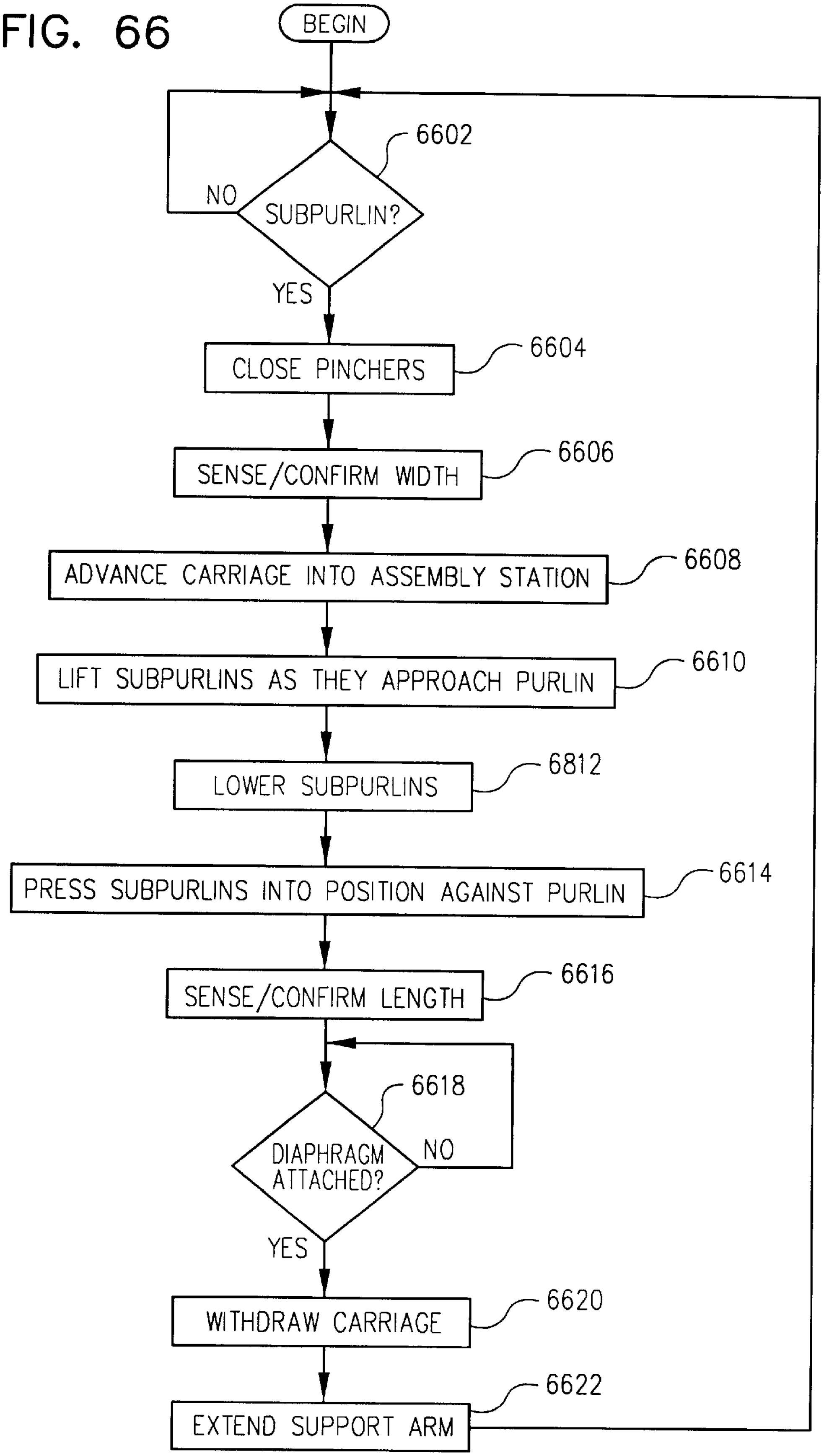
FIG. 66 is a flow diagram generally representing steps for advancing a subpurlin via the subpurlin clamping mechanisms into the assembly station in accordance with an aspect of the present invention.

FIG. 66 is a flow diagram generally representing steps for advancing a subpurlin S via a subpurlin clamping mechanism 106 into the assembly station 110. Beginning at step 6602, a determination is made whether a subpurlin S is present within the subpurlin clamping mechanism 106. If not, the process continually loops back until a subpurlin S is present. If a subpurlin S is present, then step 6602 branches to step 6604, where the pinching mechanisms 270 are closed. At step 6606, the width of the subpurlin S is sensed or confirmed, e.g., by the sensor/counter 282.

At step 6608, the subpurlin clamping mechanisms 106 are advanced into the assembly station 110. The front ends of the subpurlins are lifted as they approach the purlin at step 6610. As described above, this step permits the brackets B to clear the purlin P as the subpurlin S enters the assembly station. Lifting of the subpurlins S may be provided, for example, by the inflatable bags 330.

As the subpurlins S engage the purlin P, in step 6612 the front ends of the subpurlins are lowered so that the bracket B rests on top of the purlin P. The subpurlins S are then pressed against the purlin P in step 6614. This step may be performed, for example, by the cylinders 286. As the cylinders 286 press the subpurlin into place against the purlin, the sensors 296 detect the stroke of the cylinders 286, so as to sense or confirm the length of the subpurlins S (step 6616).

The subpurlins S are then lowered. It is possible that the brackets B may stick on the purlin P during this lowering process. To handle such a situation, the subpurlin carriage 220 may backup slightly (e.g., ¼ inch) to prevent hanging of the brackets, and then may advance again after the lowering. These steps may be easily added to the programming of the movements for the subpurlin carriage 220, particularly where an absolute feedback motor is used to direct its movements.

At step 6618, the process waits until a diaphragm D is attached to the subpurlins and purlin P (i.e., the nailing process is completed). The process continually loops back until the diaphragm D is attached. Once the diaphragm D is attached, step 6618 branches to step 6620, where the clamping mechanism carriage 220 is withdrawn. This process may occur, for example, after the diaphragm D has been initially nailed with the first nailing pattern, and while the suction cups 366 still hold the diaphragm and subpurlin S in place. Alternatively, the clamping mechanism carriage 220 may be withdrawn after all nailing has been done. In any event, as the clamping mechanism carriage 220 is withdrawn, the support arm 312 is extended. As described above, the support arm 312 extends out at the same rate that the clamping mechanism carriage 220 retracts, and thus the support arm 312 appears to be stationary during retraction of the clamping mechanism carriage 220.

Advancing the Diaphragms Into the Assembly Station

Figure 67:
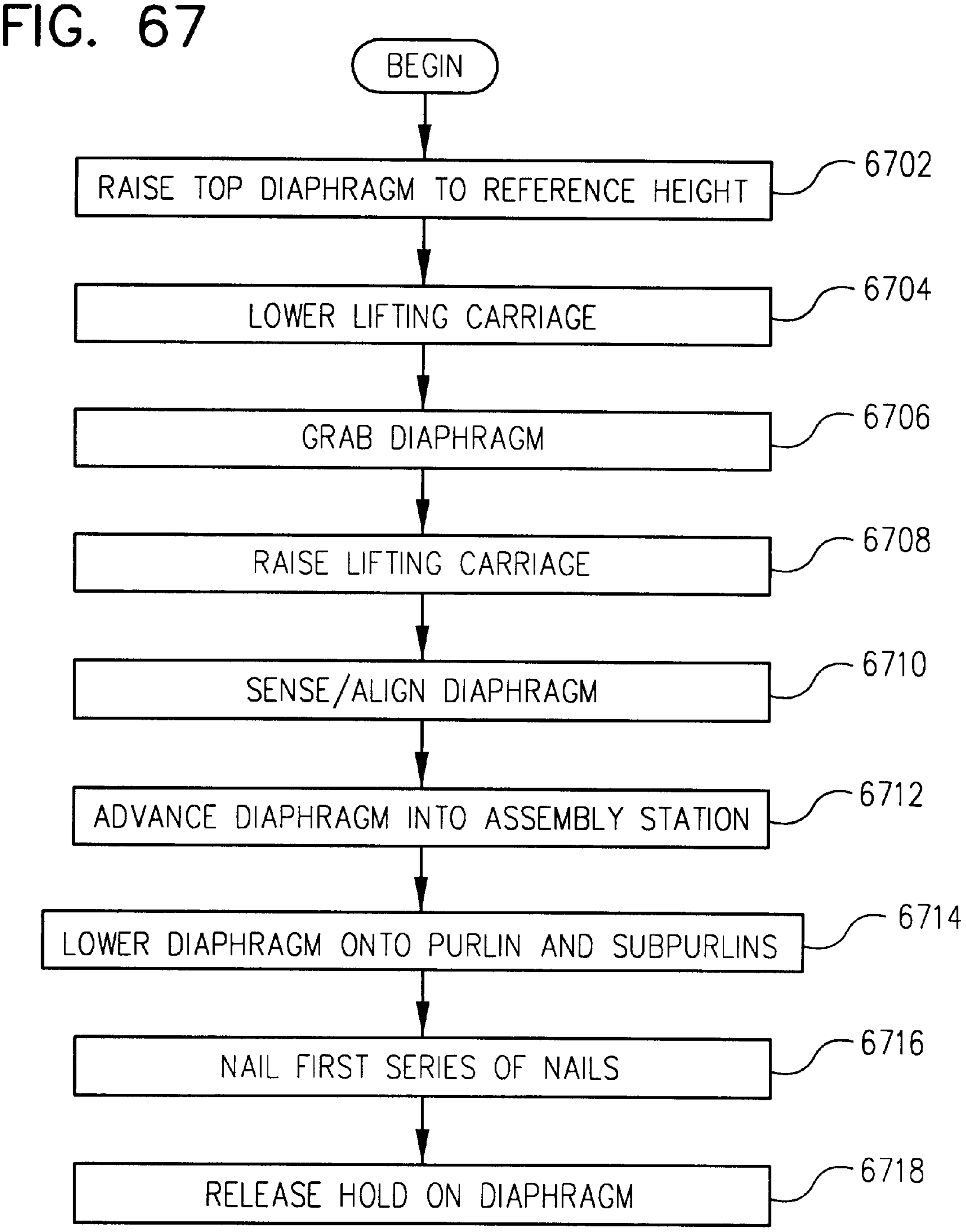
FIG. 67 is a flow diagram generally representing steps for advancing a diaphragm into the assembly station in accordance with an aspect of the present invention.

FIG. 67 is a flow diagram generally representing steps for advancing a diaphragm D into the assembly station 110 in accordance with one aspect of the present invention. Beginning at step 6702, the diaphragm lift 340 raises the top diaphragm D to a reference height, e.g., spaced just below the lifting carriage 350. The lifting carriage 350 is then lowered at step 6704, for example, by moving the wedges 390 from underneath the wheels 392.

At step 6706, the diaphragm D is grabbed by the lifting carriage 350, e.g., by the suction cups 366. The lifting carriage 350 is then raised at step 6708. Again, this may be done by driving the wedges 390 under the wheels 392, or in another suitable manner. At step 6710, the diaphragm D is aligned, for example by using the sensors 410, 412, and 414.

At step 6712, the diaphragm D is advanced into the assembly station 110. This is done, for example, by rotating the gear 384 so that it moves along the rack 386, and moves the diaphragm carriage 346 into the assembly station 110. The diaphragm D is then lowered onto the purlin P and subpurlins S at step 6714. This may be done, for example, by moving the wedges 390 out from under the wheels 392. At step 6716, the first series of nails is driven by the nailing carriage 352. After these nails have been driven, the suction cups 366 release the diaphragm D in step 6718.

Assembly Example

An example of steps of assembly of a roof panel structure A is shown in FIGS. 68–73. As is described further below, the steps taken by the roof panel structure assembly mechanism 100 are different depending upon the size of the diaphragms and the location of the purlin P relative to the assembly station 110 (i.e., how far it has been inserted). For example, one to four subpurlin clamping mechanisms 106 may be used, depending on the width of the diaphragm, and the position of the purlin P in the assembly station 110.

An example of steps of assembly for a four-foot-wide diaphragm D is shown in FIGS. 68–73. The subpurlins S are spaced two feet on center. Thus, for an assembled roof panel structure A, there are three subpurlins S that engage each diaphragm D. Two of the subpurlins are along the edges of the diaphragms D, and one subpurlin is intermediate the two subpurlins S on the edges.

Figure 68:
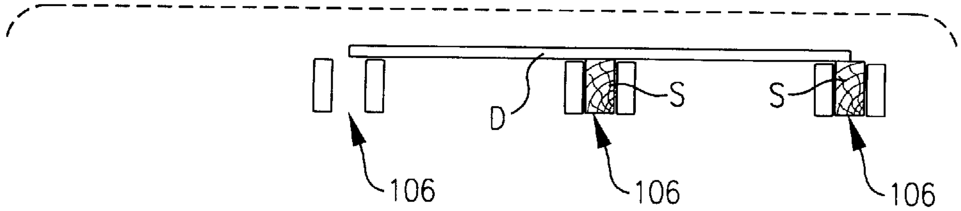
FIGS. 68–73 are diagrammatic representations of a nailing sequence that may be performed by roof panel structure assembly mechanism in accordance with one aspect of the present invention.

To begin assembly, two subpurlins S are inserted into the two leading subpurlin clamping mechanisms 106, as is shown in FIG. 68. A diaphragm D is lowered onto the two subpurlins S so that it extends halfway over the first subpurlin and approximately two feet beyond the second subpurlin and over a third subpurlin clamping mechanism 106 that does not include a subpurlin therein.

Figure 69:
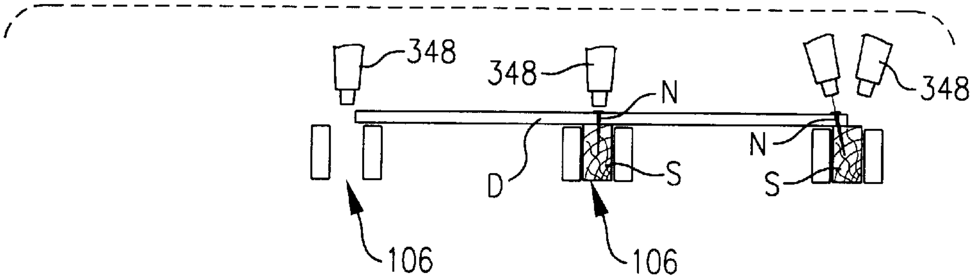

The automatic nailers 348 lower, as is shown in FIG. 69. Two nailing guns fire in this sequence: The inside row of automatic nailers 348 at the first subpurlin S, and the automatic nailers at the second subpurlin. The outside row of automatic nailers 348 at the first subpurlin S do not fire, because there is not a diaphragm D on that side of the first subpurlin.

Figure 70:
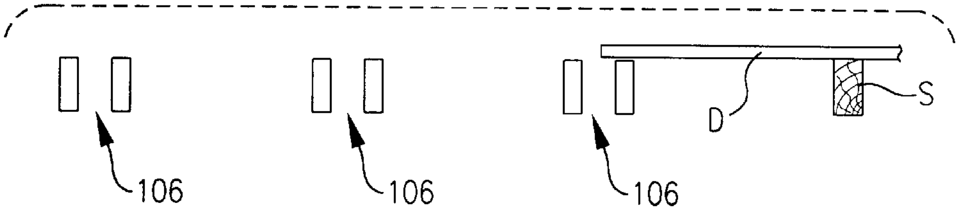

The purlin P, the diaphragm D, and the assembled subpurlins S are then indexed down so that the rear edge of the diaphragm D is aligned over the center of the first subpurlin clamping mechanism 106, as is shown in FIG. 70. The amount of the diaphragm D that is hanging rearwardly from the previously attached subpurlin S is approximately two feet in the embodiment shown in the drawings. This amount permits the end of the diaphragm D to be flexible, so that it may bend upward. This flexibility is needed when the subpurlins S are raised upward at the end of their movement toward the purlin P, for example by the air bags 330. This movement upward of the subpurlins S and the resultant bending of the rear portion of the diaphragm are shown in FIG. 71.

Figure 71:
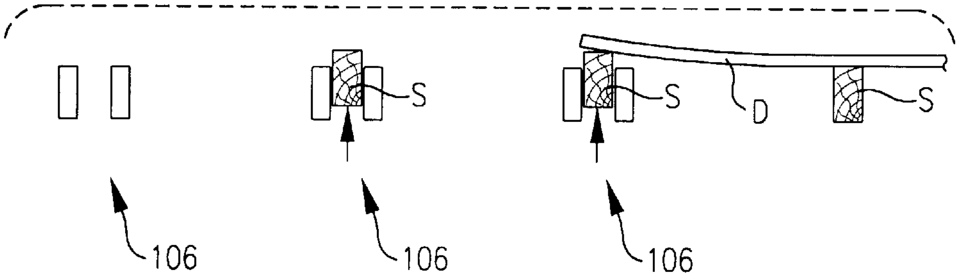
Figure 72:
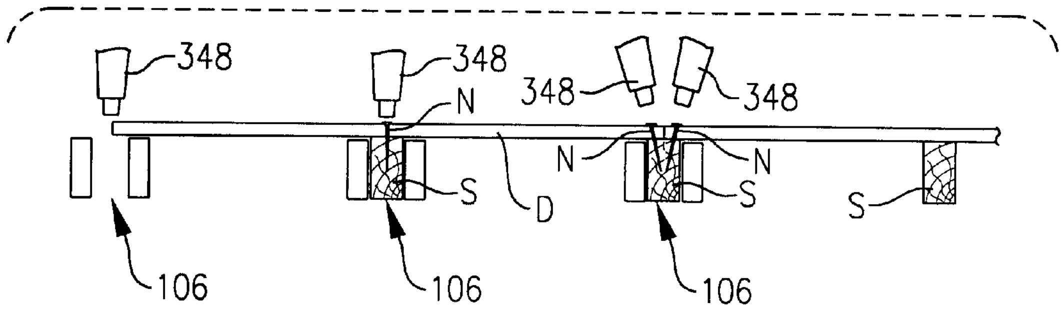

After the two subpurlins S in FIG. 71 have been lowered into position against the purlin P, another diaphragm D is lowered against the top these two subpurlins and is aligned against the back of the adjacent diaphragm. This positioning of the second diaphragm is shown in FIG. 72. The automatic nailers 348 then lower and nails are driven through the back end of the leading diaphragm into a subpurlin in the first subpurlin clamping mechanism 106, and through the front edge of the trailing diaphragm into the same subpurlin, and also into the second subpurlin. The purlin P and the attached subpurlins S and diaphragms D then are advanced.

Figure 73:
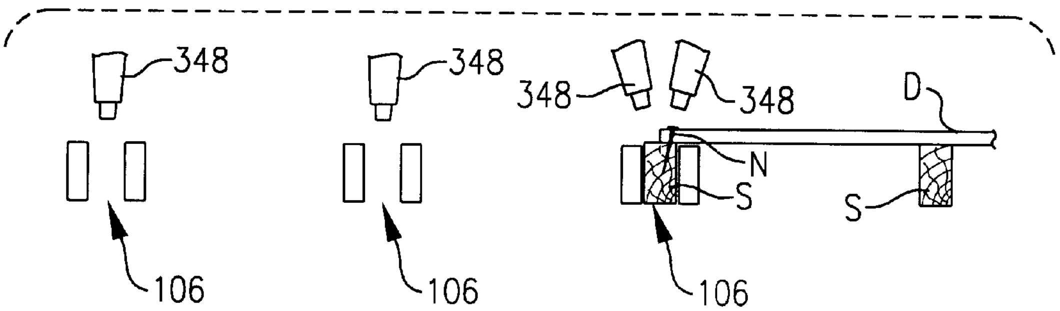

The process above is continued until the end of the purlin P is reached. At this point, the last diaphragm D that has been attached has a trailing end that extends two feet beyond the last attached subpurlin S. The subpurlin feeders 104 then drop only one subpurlin S into the first subpurlin clamping mechanism 106. A single subpurlin S shown in the first subpurlin clamping mechanisms 106 is shown in FIG. 73. After the single subpurlin S has been inserted, the automatic nailers 348 are lowered and only the first row of guns, i.e., the outermost of the two adjacent sets of rows fires, driving the nails in through the end of the last diaphragm D into the single subpurlin S.

The assembled roof panel structure A is then ready for removal from the assembly station 110. It can be understood that the assembly process will be different than described above if the diaphragm D is wider than four feet. For example, if an eight-foot-wide diaphragm is used, then all four subpurlin clamping mechanisms 106 are filled with subpurlins S, and the diaphragm extends two feet beyond the last subpurlin clamping mechanism 106. Nailing guns fire according to the subpurlins S that are present within the subpurlin clamping mechanisms 106.

The roof panel structure assembly mechanism 100 of the present invention provides fully automated assembly of roof panel structures A. The purlins are indexed and fed using an automated system, the subpurlins are fed into the subpurlin clamping mechanisms 106 by an automated system and are advanced into the assembly station via another automated system, and the diaphragms are advanced into the assembly station via yet another automated system. These automated systems do not require user input once started. In many locations, a sensor or sensors sense or confirm the width or length of the purlin P or subpurlin S, and the automated system aligns the subpurlins S or the diaphragm D in the appropriate location due to the sensed width or length. Many of the automated movements of the components of the roof panel structure assembly mechanism 100 are operated by absolute feedback motors, such as absolute feedback servo motors. As such, the location of the components of the subpurlin carriage and the speeds of the operation may be easily and accurately set by the computer 128. For example, operation may be altered automatically due to sensor or operator input. As such, the roof panel structure assembly mechanism 100 can save many costs and much labor involved in normal construction of roof panel structures A.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. An apparatus for use in assembling a roof panel structure, comprising:

a carriage;

an assembly station;

a lifting mechanism mounted on the carriage and configured to raise a diaphragm from a first position and hold the diaphragm;

an attachment carriage mounted on the carriage and configured to attach a diaphragm held by the lifting mechanism to an item in the assembly station;

the carriage being movable between the first position and the assembly station.

2. The apparatus of claim 1, wherein the lifting mechanism is configured for three dimensional movement relative to the carriage.

3. The apparatus of claim 2, wherein the lifting mechanism is configured for rotational movement relative to the carriage.

4. The apparatus of claim 1, wherein the lifting mechanism is configured for rotational movement relative to the carriage.

5. The apparatus of claim 1, wherein the attachment carriage is configured for lateral movement relative to the carriage.

6. The apparatus of claim 1, wherein the attachment carriage comprises automatic nailers.

7. The apparatus of claim 1, wherein the attachment carriage is configured for vertical movement relative to the carriage.

8. The apparatus of claim 1, further comprising means for aligning a diaphragm held by the lifting mechanism.

9. The apparatus of claim 1, further comprising a diaphragm feeder, mounted under the carriage, and configured to present diaphragms to the lifting mechanism.

10. An apparatus for use in assembling a roof panel structure, comprising:

a carriage;

an assembly station;

a plurality of slots mounted on the carriage, each of the slots being configured to receive a subpurlin and comprising at least one pinching mechanism configured to close around a subpurlin in the slot; and a plurality of magazines corresponding to the slots, each magazine being configured to deposit a subpurlin in the slot;

the carriage being movable between the plurality of magazines and the assembly station.

11. The apparatus of claim 10, wherein at least one of the pinching mechanisms comprises a sensor configured to sense the amount the pinchers close and thereby sense a width of a subpurlin in the respective slot.

12. The apparatus of claim 10, wherein each of the magazines comprises:

a slot for receiving a plurality of subpurlins;

a clamping mechanism configured to support a subpurlin that is in the slot and that is second from the bottom; and a release mechanism configured to release the bottom subpurlin while the clamping mechanism supports the second from bottom subpurlin.

13. An apparatus for use in assembling a roof panel structure, comprising:

a carriage;

an assembly station;

a plurality of slots mounted on the carriage, each of the slots being configured to receive a subpurlin and comprising a push bar to urge a subpurlin forward in the slot; and a plurality of magazines corresponding to the slots, each magazine being configured to deposit a subpurlin in the slot;

the carriage being movable between the plurality of magazines and the assembly station.

14. The apparatus of claim 13, wherein the push bar includes a sensor configured to sense the amount the push bar urges a subpurlin forward in the slot.

15. An apparatus for use in assembling a roof panel structure, comprising:

a carriage;

an assembly station;

a plurality of slots mounted on the carriage, each of the slots being configured to receive a subpurlin;

a plurality of magazines corresponding to the slots, each magazine being configured to deposit a subpurlin in the slot; and means on the carriage for supporting subpurlins that remain in the assembly station after the carriage is moved to the plurality of magazines;

the carriage being movable between the plurality of magazines and the assembly station.

16. An apparatus for use in assembling a roof panel structure, comprising:

a carriage;

an assembly station;

a holding mechanism mounted on the carriage and configured to grasp a diaphragm at a first location and to hold the diaphragm;

an attachment carriage mounted on the carriage and configured to attach a diaphragm held by the holding mechanism to an item in the assembly station;

the carriage being movable between the first position and the assembly station.

17. The apparatus of claim 16, wherein the holding mechanism is configured for three dimensional movement relative to the carriage.

18. The apparatus of claim 17, wherein the holding mechanism is configured for rotational movement relative to the carriage.

19. The apparatus of claim 16, wherein the holding mechanism is configured for rotational movement relative to the carriage.

20. The apparatus of claim 16, wherein the attachment carriage is configured for lateral movement relative to the carriage.

21. The apparatus of claim 16, wherein the attachment carriage comprises automatic nailers.

22. The apparatus of claim 16, wherein the attachment carriage is configured for vertical movement relative to the carriage.

23. The apparatus of claim 16, further comprising means for aligning a diaphragm held by the holding mechanism.

24. The apparatus of claim 16, further comprising a diaphragm feeder, mounted under the carriage, and configured to present diaphragms to the holding mechanism.

* * * * *